US011358611B2

(12) United States Patent
Yemelyanov

(10) Patent No.: US 11,358,611 B2
(45) Date of Patent: Jun. 14, 2022

(54) EXPRESS DECISION

(71) Applicant: Alexander Yemelyanov, Americus, GA (US)

(72) Inventor: Alexander Yemelyanov, Americus, GA (US)

(*) Notice: Subject to any disclaimer, the term of this patent is extended or adjusted under 35 U.S.C. 154(b) by 0 days.

(21) Appl. No.: 17/335,456

(22) Filed: Jun. 1, 2021

(65) Prior Publication Data

US 2021/0370965 A1    Dec. 2, 2021

Related U.S. Application Data

(60) Provisional application No. 63/031,723, filed on May 29, 2020.

(51) Int. Cl.
*H04N 5/44* (2011.01)
*B60W 50/14* (2020.01)
*G06N 5/04* (2006.01)

(52) U.S. Cl.
CPC ............ *B60W 50/14* (2013.01); *G06N 5/045* (2013.01); *B60W 2050/146* (2013.01)

(58) Field of Classification Search
CPC ............ B60W 50/14; B60W 2050/146; G06N 5/045; G06F 40/30
See application file for complete search history.

(56) References Cited

U.S. PATENT DOCUMENTS 7,676,446 B2 * 3/2010 Zangwill .................. G06N 5/04 706/60
2006/0115802 A1 * 6/2006 Reynolds ................ G09B 5/00 434/323

2017/0098162 A1 * 4/2017 Ellenbogen ............ G06N 7/005
2017/0309073 A1 * 10/2017 SanGiovanni .......... G06F 3/012
2019/0318408 A1 * 10/2019 Chao ...................... H04W 4/80
2021/0241290 A1 * 8/2021 Cohen ................... G06T 11/206
2021/0275911 A1 * 9/2021 Padmanabhan ......... G06F 40/30

(Continued)

OTHER PUBLICATIONS

Instrumental and Value Rationality of the Self-Regulation Model of Decision-Making, Alexander Yemelyanov, publ in , Advances in Neuroergonomics and Cognitive Eng'g, publ. in Proc. of the AHFE 2020 Int'l Conf. on Neuroergonomics and Cognitive Eng'g, Jul. 16, 2020, pp. 199-206 (9 pages).

(Continued)

*Primary Examiner* — Munear T Akki
(74) *Attorney, Agent, or Firm* — The Juhasz Law Firm

(57) ABSTRACT

A system includes a processor to: receive a description of a current decision that includes selecting an option; repeatedly display the description; for each option, receive an indication of selection of scale text specifying a degree of intensity or intensity for achieving or avoiding a possible outcome of the option, and derive an overall motivation based on the at least one selection; identify a best option based on the overall motivations; display the best option; compare the overall motivation of the best option to a threshold; in response to being less than the threshold, display a warning and a prompt for the operator to further consider the current decision; compare the overall motivation of the best option to the others; and in response to not exceeding all other overall motivations, by at least a threshold of difference, present a proximity warning and the prompt.

20 Claims, 35 Drawing Sheets

(56) References Cited

U.S. PATENT DOCUMENTS

2021/0343084 A1* 11/2021 Fred .................... A61B 5/6822

OTHER PUBLICATIONS

Performance Evaluation Process and Express Decision, Alexander Yemelyanov and Alla Yemelyanov, Advances in Neuroergonomics and Cognitive Eng'g, publ. in Proc. of the AHFE 2019 Int'l Conf. on Neuroergonomics and Cognitive Eng'g, Jul. 24, 2019, Washington, D.C., pp. 279-287 (10 pages).
Evaluation of the Factor of Significance in Human Performance (Applied Activity Theory Approach), Alexander Yemelyanov and Alina Yemelyanov, publ. in Applied and Systemic-Structural Activity Theory, Advances in Studies of Human Perf., edited by Gregory Bedny et al., 2019 pp. 145-175 (32 pages).
The Model of the Factor of Significance of Goal-Directed Decision Making, Alexander Yemelyanov, Advances in Neuroergonomics and Cognitive Eng'g, publ. in Proc. of the AHFE 2017 Int'l Conf. on Neuroergonomics and Cognitive Eng'g, Jul. 17, 2017, Los Angeles, Calif., pp. 319-330, (13 pages).
Express Decision—Mobile Application for Quick Decisions: An Overview of Implementations, Alexander Yemelyanov et al., Advances in Neuroergonomics and Cognitive Eng'g, publ. in Proc. of the AHFE 2018 Int'l Conf. on Neuroergonomics and Cognitive Eng'g, Jul. 21, 2018, Orlando, Fla., pp. 255-264, (11 pages).
Self-regulation Model of Decision-Making, Alexander Yemelyanov, Advances in Neuroergonomics and Cognitive Eng'g, publ. in Proc. of the AHFE 2019 Int'l Conf, on Neuroergonomics and Cognitive Eng'g, Jul. 24, 2019, Washington, D C., pp. 245-255, (12 pages).
Modeling and Mobile Device Support of Goal-Directed Decision-Making under Risk and Uncertainty, Alexander Yemelyanov, publ. in Applied and Systemic-Structural Activity Theory, Advances in Studies of Human Perf., edited by Gregory Bedny et al., Sep. 2019, pp. 69-103 (36 pages).
Applying SSAT in Computer-Based Analysis and Investigation of Operator Errors, Alexander Yemelyanov and Alla Yemelyanov, Advances in Neuroergonomics and Cognitive Eng'g, publ. in Proc. of the AHFE 2017 Int'l Conf. on Neuroergonomics and Cognitive Eng'g, Jul. 17, 2017, Los Angeles, Calif., pp. 331-339, (10 pages).
Decision Support of Mental Model Formation in the Self-Regulation Process of Goal-Directed Decision-Making Under Risk and Uncertainty, Alexander Yemelyanov, Advances in Neuroergonomics and Cognitive Eng'g, publ. in Proc. of the AHFE 2018 Int'l Conf, on Neuroergonomics and Cognitive Eng'g, Jul. 21, 2018, Orlando Fla, pp. 225-236, (13 pages).
A Systemic Approach to Implementing Psychological Factors in Management, Fred Voskoboynikov, Advances in Neuroergonomics and Cognitive Eng'g, publ. in Proc. of the AHFE 2018 Int'l Conf, on Neuroergonomics and Cognitive Eng'g, Jul. 21, 2018, Orlando Fla, pp. 237-246, (10 pages).
Approach to Safety Analysis in the Framework of the Systemic-Structural Activity Theory, Gregory Bedny and Inna Bedny, Advances in Neuroergonomics and Cognitive Eng'g, publ. in Proc. of the AHFE 2018 Int'l Conf. on Neuroergonomics and Cognitive Eng'g, Jul. 21, 2018, Orlando Fla, pp. 247-254, (8 pages).
Analysis of Influencing Factors in the Model of Erroneous Action: Computer-based Method and Algorithms, Alexander Yemelyanov, publ. in 2011 IEEE Int'l Conf. on Systems, Man and Cybernetics, Anchorage, Alaska, Oct. 2, 2011, pp. 2107-2112 (6 pages).
Decision Support and Error Analysis of Difficult Decisions in Clinical Medicine, Alexander Yemelyanov et al., Advances in Neuroergonomics and Cognitive Eng'g, publ. in Proc. of the AHFE 2020 Int'l Conf. on Neuroergonomics and Cognitive Eng'g, Jul. 16, 2020, pp. 214-221 (9 pages).
Applying Web-based Application ExpressDecision2 in Patient-Centered Care, Alexander Yemelyanov et al., Advances in Neuroergonomics and Cognitive Eng'g (Advances in Intelligent Systems and Computing), Springer Int.Publishing, (accepted for publication in Jul. 2021 (9 pages).
Self-Regulation Approach for Setting Goals in Problem-Solving, Alexander Yemelyanov and Inna Bedny, Advances in Neuroergonomics and Cognitive Eng'g (Advances in Intelligent Systems and Computing), Springer Int..Publishing (accepted for publication in Jul. 2021 (7 pages).

* cited by examiner

544d

544a

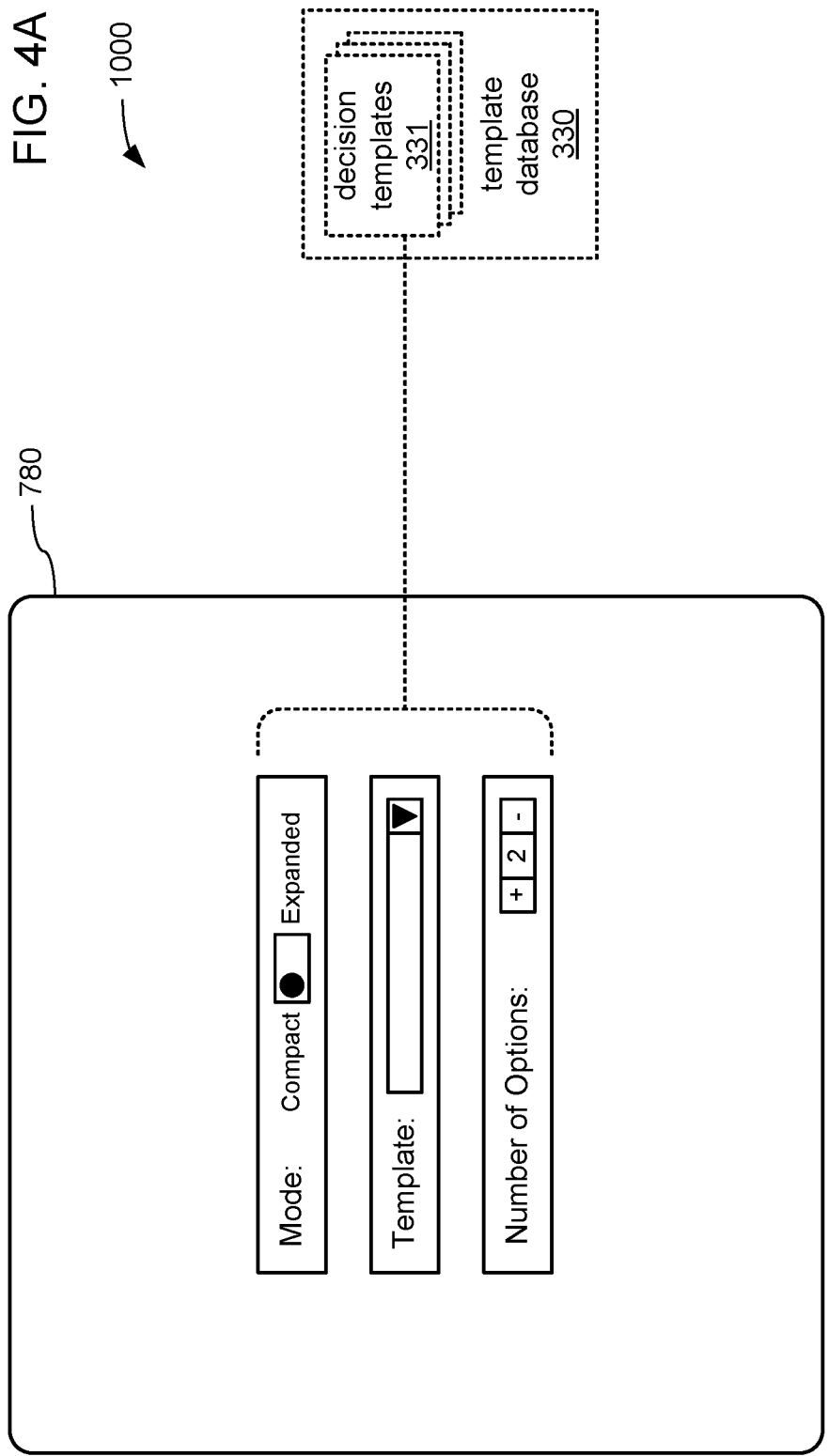

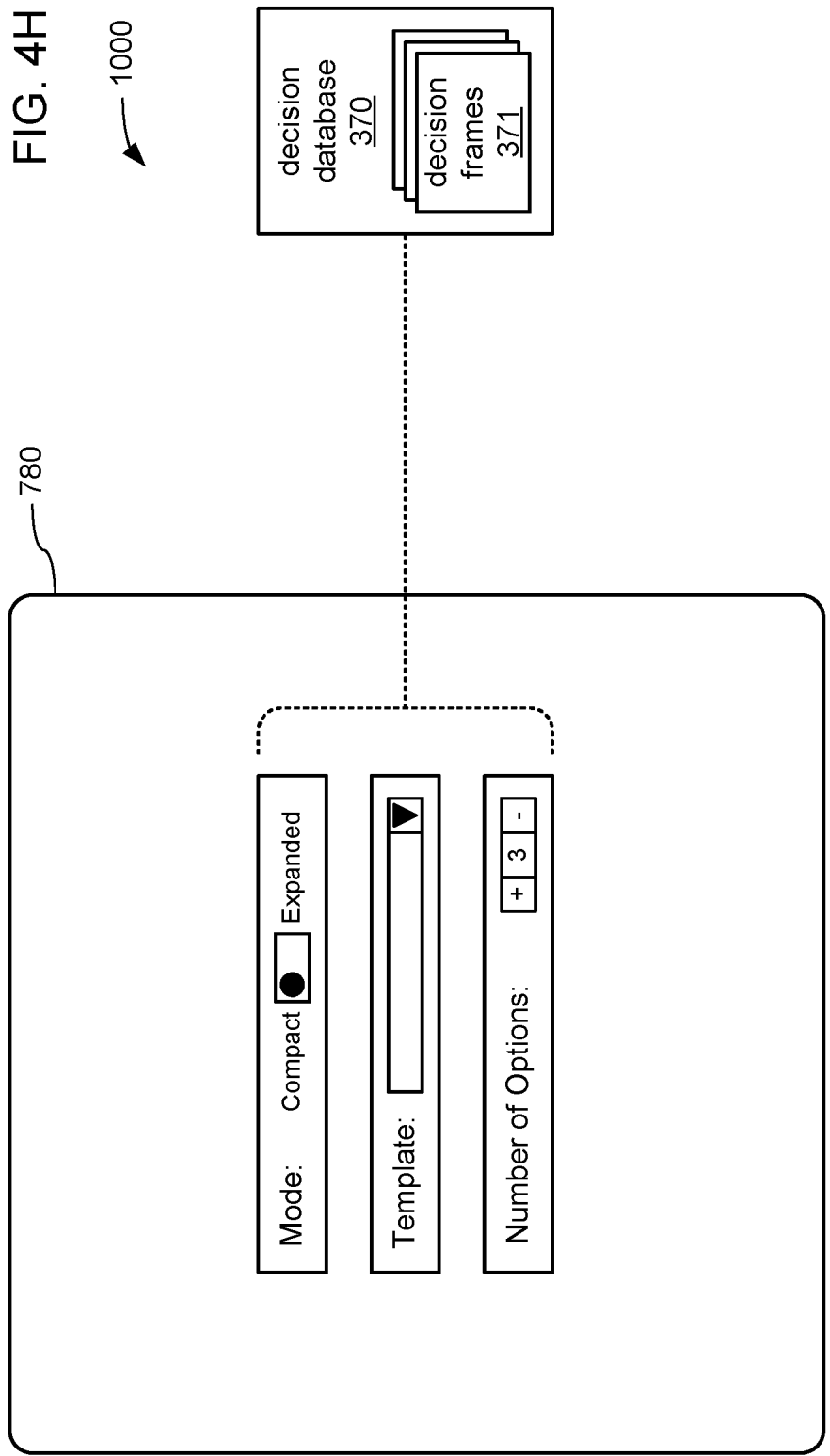

EXPRESS DECISION

RELATED APPLICATIONS

This application claims the benefit of the priority date of U.S. Provisional Application 63/031,723 filed May 29, 2020 by Alexander Yemelyanov, and entitled EXPRESS DECISION, the disclosure of which is also incorporated herein by reference for all purposes.

BACKGROUND OF THE INVENTION

1. Field of the Invention

The present invention relates to the field of employing an experimentally developed understanding of the decision-making functions of the human brain to provide apparatus and method of assisting the brain of a decision maker in making a decision in which a choice must be made from among multiple options. More particularly, the capacity of the faster short term memory of the brain of the decision maker is augmented to enable retention of more details concerning each of option. Also, for each of those options, the decision maker is prompted through providing input concerning those details in a manner that elicits and is indicative of both instrumental and value rationality. Such inputs are then used to derives degrees of motivation for the multiple options, and to identify a best option from among the multiple options. Such degrees of motivation are also used to determine whether still more consideration of the decision is needed, including reconsideration of details for each option and/or a re-framing of the decision. Such reconsideration and/or re-framing may entail the addition of more options and/or an explicit statement of goal(s).

2. Description of the Related Art

The question of how the human brain works, including how the human brain makes decisions, has been a subject of study and speculation for centuries. For much of that time, there have been few accepted concepts of how the human brain works that have been truly based on objective observation. Instead, many of such accepted concepts have tended to be more reflective of cultural aspects of the societies in which they originated. In more recent decades, advances in medical knowledge have increasingly shaped accepted concepts of how the human brain works, including encouraging an increased reliance on objective observation. However, societal factors still exert influence, such as recent significant advances in various technologies that have encouraged a tendency to compare the human brain to various forms of machinery. Modernly, a better understanding of the many features of the human brain is seen as potentially leading to a wide variety of useful benefits in a wide variety of areas, such as increasingly automating various tasks.

In recent decades, ever-accelerating advances in microprocessors and other micro-electronic technologies have lead to a temptation to view the human brain as being like a computer system, possibly with various architectural augmentations to the classic Von Neumann computer architecture. This has lead to a corresponding temptation to view it as possible to create an artificial equivalent to the human brain, or at least portions thereof, using such technologies. By way of example, a variety of types of artificial neuron have been devised that combine memory storage components, a trigger function, and a set of inputs and outputs that are at least vaguely inspired by the observed physical structures and electrical behavior of actual neurons. There has been some success in combining such artificial neurons to form neural networks intended to perform sensory input functions such as speech recognition and the visual recognition of objects in a manner that is also inspired by, and intended to mimic, particular portions of the human brain that are widely believed to be responsible for performing such functions (e.g., the Wernicke's area believed to be involved in speech recognition, and the visual cortex believed to be involved in the visual recognition of objects).

Such seeming vindication of such computer-like views of sensory-related aspects of the human brain have helped to reinforce a continuing computer-like view of the manner in which human decision making functions, or at least the view that computer-related technologies could be used to mimic such functionality. Such views have tended to encourage the adoption of various models of human decision making that tend to employ mathematical modeling, and thus, are able to serve as analytical tools with the aid of computing devices. An example of this is Expected Utility Theory (EUT), which has been employed in making and/or evaluating economic and/or business decisions. EUT attempts to determine which one of multiple options that are being considered in a decision is the rational choice based on a quantifiable goal and a quantifiable degree of risk for each option. Unfortunately, while EUT has been successfully utilized for economic and/or business decisions, it has proven far less successful in other areas of decision making. Thus, EUT has proven to be a relatively inaccurate model of human decision making in areas outside of making economic and/or business decisions.

For over a century (well before the advent of current computer-related technologies), it has been argued that there are two basic types of rationality employed by the human brain in making decisions. One of these types is "instrumental rationality" that focuses on whatever means are most efficient/effective in achieving a goal. Thus, instrumental rationality is often information-driven as it is often focused on the details that set forth pros and cons of the different available options for how to reach a goal. The other of these two types is "value rationality" that focuses on the desirability and/or moral/ethical correctness of the goal. Thus, in contrast to instrumental rationality, value rationality is often driven by subjective belief and/or philosophy concerning whether a goal is a good goal, or not. It has been posited that human decision making may employ both types of rationality in differing proportions of influence depending on the nature of a decision being made and/or the conditions under which a decision is being made.

Thus, looking back at EUT, it may be argued that such decision making models are destined to be unsuccessful in areas of decision making outside of economic and/or business decisions, because such decision making models as EUT employ instrumental rationality almost to the exclusion of value rationality. Thus, there is no integration of instrumental and value rationality. This may be argued as logically following from the fact that analyses of relative efficiency/effectiveness in achieving a goal often lend themselves quite well to computational techniques that minimize or maximize a quantity of something (e.g., the computational techniques frequently used in operations research), whereas analyses of the desirability and/or moral/ethical correctness of a goal often do not.

While EUT may be representative of decision making models that may be faulted for excluding value rationality, the variety of decision making that is often seen day to day in the medical field may be faulted for excluding instrumental rationality and/or for employing value rationality based on values other than those of a patient. This has proven to be the case especially in emergency situations in which decisions must be made quickly and/or where the patient is unconscious such that they cannot participate in decision making, at all. However, it has been found that this effectively remains the case even in non-emergency situations where the patient is fully able to participate in decision making concerning their own medical care, and wishes to do so.

In emergency situations in which decisions about providing healthcare to a patient must be made quickly and/or without the ability to consult the patient (e.g., the patient is unconscious), doctors may be left with little more than their professional experience, intuition as to what actions need to be taken, and/or various "fast-and-frugal" decision tools that they may have been trained to use (e.g., the classic "ABC" airway, breathing & circulation first aid prioritization approach for treating an unconscious patient). Thus, in emergency situations, doctors frequently follow well-trodden scripts of approaches to quickly identify what emergency medical problem is in front of them, and to quickly take well-rehearsed steps to address the identified problem. Often, and out of necessity, this results in problem-centered care where there is an immediate goal of addressing the problem, and not much deliberation concerning pros and cons of various options for doing so.

In effect, a decision making process based on a very rough form of value rationality, and little or no instrumental rationality, is often the result. Additionally, the rough form of value rationality that is used is necessarily based on the values of the medical professional making the decisions and/or of whoever trained them. Fortunately, the various well-trodden scripts that are followed and the various well-rehearsed steps to addressing the problems identified from following those well-trodden scripts do, quite often, bring about good results. However, mistakes are still made that might have been prevented with a more complete decision making process that integrates both instrumental rationality and value rationality based on values of the patient.

Unfortunately, even in non-emergency situations in which there is more time to make decisions, and in which the patient is available and actively seeking to participate in making decisions concerning their own care, various factors associated with medical culture and the complexities of medical treatments often conspire to cause the decision making to remain problem-centered, and to continue to fail to incorporate instrumental rationality, or value rationality based on values of the patient.

And yet, it has been observed that younger generations are not as routinely trusting of doctors' decisions as older generations, and have been more willing to question the thinking employed by doctors, as well as the results achieved. There is also an increased willingness in younger generations to engage in litigation against medical professionals in which the decisions of medical professionals are questioned. Thus, doctors are increasingly encountering patients who insist on being more involved in planning their medical care, and who are more likely to feel dissatisfied with the results (even arguably positive results) if they feel somehow prevented from becoming so involved.

In response, various attempts have been made to provide various forms of Shared Decision Making (SDM) in the medical field in which various techniques have been devised for giving patients some amount of teaching concerning their medical conditions and the available treatments therefor, so that they can become "empowered" to participate in making decisions concerning their own medical care. These efforts are often expressed as being intended to provide more "patient-centered care" where a patient's input is taken into account so as to enable some degree of "self-determination" for patients.

Unfortunately, many of such efforts to provide SDM have been generally unsuccessful. The teachings that are provided to patients concerning their medical conditions and available treatments are often through the provision of various "decision aids" that often include leaflets, audio and/or video recordings, and/or various forms of interactive media that are intended to supplement whatever conversations may be had with medical professionals. Unfortunately, despite being intended to better enable patient participation in patient care decision making, such "decision aids" have often paradoxically had the effect of overwhelming patients with information to an extent that they are too lost in the details of possible options to be so enabled. A frequent result is that patients find themselves forced to revert to leaning on the judgment of the medical professionals that they wanted to share the decision making process with such that the decision making process largely reverts back to being made by those medical professionals with little input from the patients.

This unfortunate outcome also receives some degree of reinforcement from a medical culture in which many medical professionals are skeptical of the entire idea of patients becoming involved in making medical decisions. Such medical professionals view their patients as unqualified to make medical decisions, and such medical professionals feel a sense of vindication concerning this opinion from witnessing how overwhelmed patients become under such circumstances. They observe how such overwhelmed patients ultimately put such decision making back in the hands of those medical professionals, which is where those medical professionals believe it should have been all along. In a way, this also serves to encourage medical professionals to revert back to taking a more problem-centered approach to deciding what care to provide, since, in their view, the patient wasn't going to have much to say, anyway.

It may we be that some of the difficulty that patients encounter in trying to participate in decisions concerning their own health care may result from commonplace limitations of the human brain. Studies have shown that the human brain generally has an upper limit of about four "chunks" of information that can be retained in short-term memory where it is more readily available for being considered in making a decision. A "chunk" of information is a set of details concerning a topic that a particular person has learned to associate with each other such that they are able to easily consider those details altogether. The process of learning such associations among such multiple details of a particular topic is often referred to as "chunking" by those who study the human brain. A simple example of "chunking" is the process of learning a new (i.e., unfamiliar) phone number. Initially, each of the individual digits are treated by the human brain as a separate chunk, which is part of the reason why retaining all of the digits of a new phone number in short term memory can be very challenging, at first. However, over time, with repeated use leading to increased familiarity, the human brain may begin to build associations among digits in a subset of the phone number (e.g., the area code) leading to that subset of digits becoming as a single chunk. Eventually, with still more use leading to still more familiarity, the entire phone number begins to be treated as a single chunk, such that, eventually, multiple other chunks of information are able to be retained in short term memory along with that phone number.

Thus, in the case of medical professionals, years of medical training enables the brain of a medical professional to build associations among details associated with medical theories, conditions, diagnoses and treatments. After such training, the brain of a medical professional is able to more easily treat relatively large sets of such details associated with a particular medical condition as a single chunk that fits comfortably within a large continuum of medical topics that have become a familiar background of topics committed to long-term memory where each such topic has a comfortably familiar label and/or shorthand based on a comfortably familiar medical vocabulary that has also been committed to long-term memory. In contrast, the brain of a person who does not have such training has never formed such associations among such details. Thus, each detail of the many details of that same single medical condition becomes a new and unfamiliar subject that is not associated with anything else in either background knowledge or past experience that has been committed to long-term memory. This can cause each such detail of a single medical condition to be treated as a separate chunk for some time until, perhaps, enough medical knowledge has been collected in long-term memory to enable the building of the associations needed for "chunking" to be supported.

As a result, even considering the multiple details of just one option for what to do in response to just a single medical condition can swiftly overwhelm the limitations of short-term memory, thereby leading to a patient being operationally overwhelmed in trying to participate in decisions about their own medical care. This result, and its associated reinforcement of skepticism of patient participation in decision making in medical culture, often conspire to prevent patients from fully participating in medical decisions in a way that might have enabled them to bring their own instrumental rationality, as well as value rationality based on their own values, into the decision making process.

Thus, both for such medical decisions as are described above, and for decisions in other different situations, a need exists for a decision making augmentation tool that better assists the brain of a decision maker in integrating both instrumental and value rationality in making a decision.

SUMMARY OF THE INVENTION

The present invention is a decision making augmentation system of one or more devices that implements a method for both augmenting the short-term memory of the brain of a decision maker, and guiding the decision maker through considering positive and negative aspects ("pros and cons") of each option of a current decision in a manner that integrates both instrumental rationality and value rationality based on the values of the decision maker. Through prompts provided in a user interface, the decision maker is guided through providing input such as the current decision to be made, a shorter and/or longer term goals that the current decision may be associated with, what options are being considered to choose from in making the current decision, pros and cons of each option, degrees of intensity of approval/disapproval associated with each option, and/or degrees of likelihood of occurrence/avoidance associated with each option. From at least the degrees of intensity and likelihood provided as input by the decision maker for each option, degrees of motivation are derived for the multiple options, and are used to identify a best option from among the multiple options. The best option may then be presented to the decision maker along with an indication of degree(s) of motivation associated with the best option. Based on the degrees of motivation derived for the multiple options, determinations may also be made as to whether the decision maker needs to further consider the current decision, and an indication to that effect may also be presented to the decision maker.

The system may be operable in either a compact mode that is better suited for situations in which a current decision is to be made in a relatively short period of time, and an expanded mode for situations in which there is more time to more carefully consider a current decision. Upon commencing the use of the system, the decision maker may be prompted to choose from between these two modes based on time available for making the current decision.

In the compact mode, a decision maker may be prompted to enter descriptive text that describes the current decision to be made, along with descriptive text that describes each option being considered in the current decision. For each option, the decision maker may also be prompted to specify degrees of intensity and/or likelihood associated with each option. More specifically, the decision maker may be prompted to select scale text from among a menu of scale texts, where the scale texts within each such menu define a range of degrees of positive or negative intensity, or a range of degrees of positive or negative likelihood, that is associated with that option.

In the expanded mode, a decision maker may be additionally prompted to enter descriptive text that describes a longer term goal and/or a shorter term goal that is related to the current decision, and that may be affected by which option is selected in making the current decision. Additionally, for each option, the decision maker may be prompted to enter descriptive text that describes both a successful outcome and an unsuccessful outcome that may arise from that option. For each successful outcome of each option, and for each unsuccessful outcome of each option, the decision maker may be further prompted to select scale text from among a menu of scale texts, where the scale texts within each such menu define a range of degrees of positive or negative intensity, or a range of degrees of positive or negative likelihood, that is associated with one of the possible outcomes.

Regardless of whether the compact mode is used or the expanded mode is used, the descriptive text entered by the decision maker to describe the current decision, shorter and/or longer term goals, each of the options, and/or each possible successful and unsuccessful outcome of each option may not actually be used by the system as any form of input to the actual identification of a best option. Instead, such descriptive text may be repeatedly and/or continuously visually presented back to the decision maker in the user interface as a mechanism for aiding the decision maker in keeping clearly in mind what the current decision is, what the shorter and/or longer term goals are, what each option is, and/or what each possible successful and/or unsuccessful outcome of each option is. In other words, the system assists the short-term memory of the decision maker in retaining such information, thereby freeing more of the limited short-term memory of the decision maker for use in retaining other pieces of information pertinent to the current decision. Thus, such repeated presentation of such descriptive text to the decision maker effectively serves to augment the short-term memory of the brain of the decision maker.

Such repeated presentation of such descriptive text to the decision maker also serves to reduce the expenditure of time and effort to repeatedly retrieve descriptions of the current decision, of the longer and/or shorter term goals, of each of the options, and/or of the possible successful and/or unsuccessful outcomes of each option from long-term memory. From experimental observation, it is known that chunks of information stored within short-term memory of the human brain is eventually transferred to the long-term memory. As previously discussed, the retrieval of pieces of information from the long-term memory often entails the use of associations that are learned over time among pieces of information. It has also been observed through experimentation that accessing pieces of information stored in long-term memory tends to take considerably more time and effort than from short-term memory, possibly due to the use of associations in making such accesses. The repeated presentation of such descriptive texts to the decision maker via the user interface obviates the need to use such time and energy to make those accesses.

Also regardless of whether the compact mode or the expanded mode is used, and in contrast to the descriptive texts, the scale text indications of degrees of intensity and likelihood selected by the decision maker for each option, or for each of the successful and unsuccessful outcomes of each option, may be used by the system as inputs to the identification of a best option. More precisely, each of the selections of scale text by a decision maker may be correlated to a corresponding numeric scale value. For each option, those numeric scale values for intensity and likelihood may then be used to derive degrees of positive and negative motivation for that option. The degrees of motivation associated with each of the options may be used to identify a best option based on which option has the highest degree of motivation.

Where the derived degree of motivation of the identified best option is relatively high, overall, and is higher than the degree of motivation of each of the other options by at least a predetermined threshold level, the identified best option may be presented to the decision maker as the best option without any caveats. With such a high degree of motivation for the best option, the decision maker can have confidence that the option identified as the best option correctly reflects the application of both their instrumental and value rationality, presuming the input they provided is truthful.

However, where the degree of motivation for the best option is not relatively high, overall, or is not higher than the degree of motivation of each of the other options by at least the predetermined threshold level, then the identified best option may still be presented to the decision maker as the best option, but with prompting for the decision maker to further consider the current decision, including providing more information concerning the current decision and/or reconsidering the manner in which the decision maker has framed the current decision. Such a lower degree of motivation associated with the best option, either overall or in comparison to one or more of the other options, may be very well be an indication that the decision maker has not considered the current decision well enough and/or long enough. Where the decision maker has used the system in the compact mode, such prompting may include a suggestion that the decision maker switch to using the expanded mode where the decision maker will at least be guided through considering more details of the current decision. Where the decision maker has already used the system in the expanded mode, such prompting may include a suggestion that the decision maker again use the expanded mode, but while also giving thought to re-framing the current decision, and/or the longer and/or shorter term goals associated with it.

As will be explained in greater detail, the system may store the input received from the decision maker concerning a current decision in a tree-like data structure. More specifically, the descriptive text that describes the current decision and/or that describes the longer and/or shorter term goals may be stored in a manner associated with the base of such a tree-like data structure. For each option, a separate branch of such a data structure may be allocated to store the scale text selected by the decision maker to indicate degrees of intensity and likelihood associated with that option, along with the descriptive text that describes that option. Where the expanded mode is used such that there are separate sets of degrees of intensity and likelihood for a possible successful outcome and for a possible unsuccessful outcome for each option, each branch of such a data structure may include a separate sub-branch allocated for each of the successful and unsuccessful possible outcomes at which may be stored the scale text selected by the decision maker to indicate degrees of intensity and likelihood for that outcome, along with the descriptive text that describes that outcome.

Regardless of whether such information concerning a current decision is stored in a tree-like data structure or in some other form, as will be explained in greater detail, various different embodiments of the system may support either or both of local and remote storage thereof to enable a decision maker to save their inputs of information concerning the current decision. This may enable a decision maker to work incrementally with the system through multiple sessions to make a current decision over time, such that they may incrementally provide and/or refine their inputs of information concerning the current decision over time. Alternatively or additionally, it may be that a decision maker seeks to experiment with changing the options being considered in a current decision, and/or the degrees of intensity and/or likelihood associated with each option, to see how doing so may or may not change what is identified as the best option. Also alternatively or additionally, it may be that a decision maker seeks to try re-framing the current decision (possibly after being prompted to do so) such that they may try changing how the current decision is described, and/or adding a longer and/or shorter term goals.

In some of such embodiments, the storage of differing versions of the information for a current decision may be supported. In this way, a decision maker may be provided with the ability to review previous versions of their inputs of information concerning the current decision, and/or to review previously derived best options, as part of considering how their thinking about the current decision may have evolved over time. Alternatively or additionally, in this way, a decision maker may be provided the option to return to an earlier version of their inputs concerning a current decision if they come to the conclusion that a later version of their inputs represents a wrong direction concerning the current decision. Alternatively or additionally, it may be changing circumstances that cause a decision maker to reconsider a current decision such that the decision maker may re-frame it to fit the new circumstances, and/or may alter their inputs concerning the current decision to take one or more factors of the changing circumstances into account. It may be that the decision maker finds it useful to save multiple versions of their inputs to enable further consideration of how those inputs were changed in view of the changing circumstances.

In various embodiments, the ability to store inputs concerning a current decision may be used by a decision maker to share those inputs with an expert in a subject that is touched upon by the current decision as part of asking questions and/or soliciting other input therefrom. Alternatively or additionally, an ability to share inputs concerning a decision may be used to enable shared decision making among multiple decision makers who need to cooperate in making a current decision.

In various embodiments, the system may store a set of templates for various types of decision that may need to be made by a decision maker. It may be that each such template is implemented as a data structure of the same type as is used for storing inputs of information from a decision maker concerning a current decision, but in which just a subset of the inputs may already be provided as default values. By way of example, within such a data structure for a template, storage locations for a pre-determined quantity of branches may be pre-allocated that correspond to the quantity of options to be considered. Also, within such a template, descriptive text that describes the decision to be made, that describes possible shorter and/or longer term goals, that describes each option, and/or that describes possible successful and unsuccessful outcomes for each option may already be stored therein as default values that a decision maker can either except without change or edit. However, within such a template, scale text that indicates degrees of intensity and/or likelihood for each option, or for each possible outcome of each option, may deliberately not be provided to avoid influencing a decision maker.

In some embodiments, the system may be incorporated into a control system of a vehicle (e.g., an airplane, train, ship, etc.) to assist in guiding crewmembers through making decisions concerning actions to take in response to an emergency that may arise (e.g., engine failure, control surface failure, hydraulics failure, compartment flooding, onboard fire, etc.). Such an embodiment of the system may provide decision templates that are each meant to frame a decision that currently needs to be made in a manner that is intended to fit a particular emergency situation, and may include options that are also intended to fit a particular emergency situation. Such templates may also include references to particular portions of manuals that may provide more explanation of onboard systems and/or spell out various emergency procedures. Similarly, in some embodiments, the system may be deployed by emergency agencies of local, state/provincial and/or national governments to assist emergency response personnel in making decisions concerning natural disasters or other situations related to public safety. Again, decision templates may be provided that are each meant to frame a decision that currently needs to be made concerning a particular type of public safety decision in which there may be a need to order evacuations, stay-at-home orders, curfews, closings of transportation routes, etc.

It should also be noted that, in addition to, or in lieu of, using the system to assist in making a current decision, the system may be used to assist in evaluating a past decision that has already been made and acted upon. By way of example, the system may be used in a forensic context (e.g., in a post-accident investigation) to evaluate one or more decisions made by a crewmember of an airplane, train or ship in response to an emergency situation that may have confronted that crewmember. In such situations, there may be no time or opportunity for any such crewmember to use such a system to aid them in making decisions concerning what action to take. However, after the emergency is over, it may be deemed valuable for purposes of an investigation to evaluate each of the decisions made by such a crewmember to determine whether changes should be made to training procedures, normal operating procedures, the design of the jetliner, ship, train, etc.

A decision making augmentation system includes: a manual input device configured to enable entry of text input by an operator of the decision making augmentation system that describes aspects of a current decision comprising a selection of one option from among multiple options; a display configured to visually guide the operator through providing the text input; a storage configured to store indications of the text input, wherein the text input comprises at least one of multiple descriptive texts and multiple selections of scale text; and a processor communicatively coupled to at least the storage. The processor is configured to perform operations including: receive a decision descriptive text of the multiple descriptive texts, wherein the decision descriptive text describes the current decision; and cause repeated presentation of the decision descriptive text on the display. The processor is also configured to, for each option of the multiple options, perform operations including: receive an indication of at least one selection of scale text of the multiple selections of scale text, wherein the at least one selection of scale text specifies either a degree of intensity of seeking to achieve or avoid a possible outcome of the option, or a degree of likelihood of achieving or avoiding the possible outcome of the option; and derive a degree of overall motivation associated with the option based on the at least one selection of scale text. The processor is further configured to: identify a best option from among the multiple options based on the degree of overall motivation associated with each option; cause a presentation of an indication of the best option on the display; and compare the degree of overall motivation associated with the best option to a threshold degree of overall motivation. The processor is still further configured to, in response to the degree of overall motivation associated with the best option being less than the threshold degree of overall motivation, cause a presentation, on the display, of: a warning that the degree of overall motivation associated with the best option is low; and a prompt for the operator to further consider the current decision. The processor is yet further configured to compare the degree of overall motivation associated with the best option to the degree of overall motivation associated with each other option of the multiple options. The processor is also yet further configured to, in response to the degree of overall motivation associated with the best option not exceeding, by at least a threshold degree of difference in overall motivation, the degree of overall motivation associated with at least one other option of the multiple options, cause a presentation, on the display of: a proximity warning that the difference in degree of the overall motivation associated with the best option from the overall motivation associated with at least one other option is low; and the prompt for the operator to further consider the current decision.

A method of decision making augmentation includes: receiving, at a processor of a decision making augmentation system, and via a manual input device configured to enable entry of text input by an operator, a decision descriptive text of multiple descriptive texts, wherein the decision descriptive text describes a current decision comprising a selection of one option from among multiple options; and causing repeated presentation of the decision descriptive text on a display configured to visually guide the operator through providing the text input, wherein the text input comprises at least one of the multiple descriptive texts and multiple selections of scale text. The method also includes, for each option of the multiple options, performing operations including: receiving, at the processor, and via the manual input device, an indication of at least one selection of scale text of the multiple selections of scale text, wherein the at least one selection of scale text specifies either a degree of intensity of seeking to achieve or avoid a possible outcome of the option, or a degree of likelihood of achieving or avoiding the possible outcome of the option; and deriving, by the processor, a degree of overall motivation associated with the option based on the at least one selection of scale text. The method further includes: identifying, by the processor, a best option from among the multiple options based on the degree of overall motivation associated with each option; causing a presentation of an indication of the best option on the display; and comparing, by the processor, the degree of overall motivation associated with the best option to a threshold degree of overall motivation. The method still further includes, in response to the degree of overall motivation associated with the best option being less than the threshold degree of overall motivation, causing a presentation, on the display, of: a warning that the degree of overall motivation associated with the best option is low; and a prompt for the operator to further consider the current decision. The method yet further includes comparing, by the processor, the degree of overall motivation associated with the best option to the degree of overall motivation associated with each other option of the multiple options. The method also yet further includes, in response to the degree of overall motivation associated with the best option not exceeding, by at least a threshold degree of difference in overall motivation, the degree of overall motivation associated with at least one other option of the multiple options, causing a presentation, on the display of: a proximity warning that the difference in degree of the overall motivation associated with the best option from the overall motivation associated with at least one other option is low; and the prompt for the operator to further consider the current decision.

BRIEF DESCRIPTION OF THE DRAWINGS

FIGS. 3A, 3B, 3C, 3D, 3E, 3F, 3G, 3H, 3I, 3J, 3K, 3L and 3M, together, show aspects of an example performance of the decision making augmentation functionality of the decision making augmentation system of either FIG. 1A or 1B.

FIGS. 4A, 4B, 4C, 4D, 4E, 4F, 4G, 4H, 4I, 4J, 4K and 4L, together, show aspects of an example use of the decision making augmentation functionality of the decision making augmentation system of either FIG. 1A or 1B in compact mode.

DETAILED DESCRIPTION OF THE INVENTION

Figure 1A:
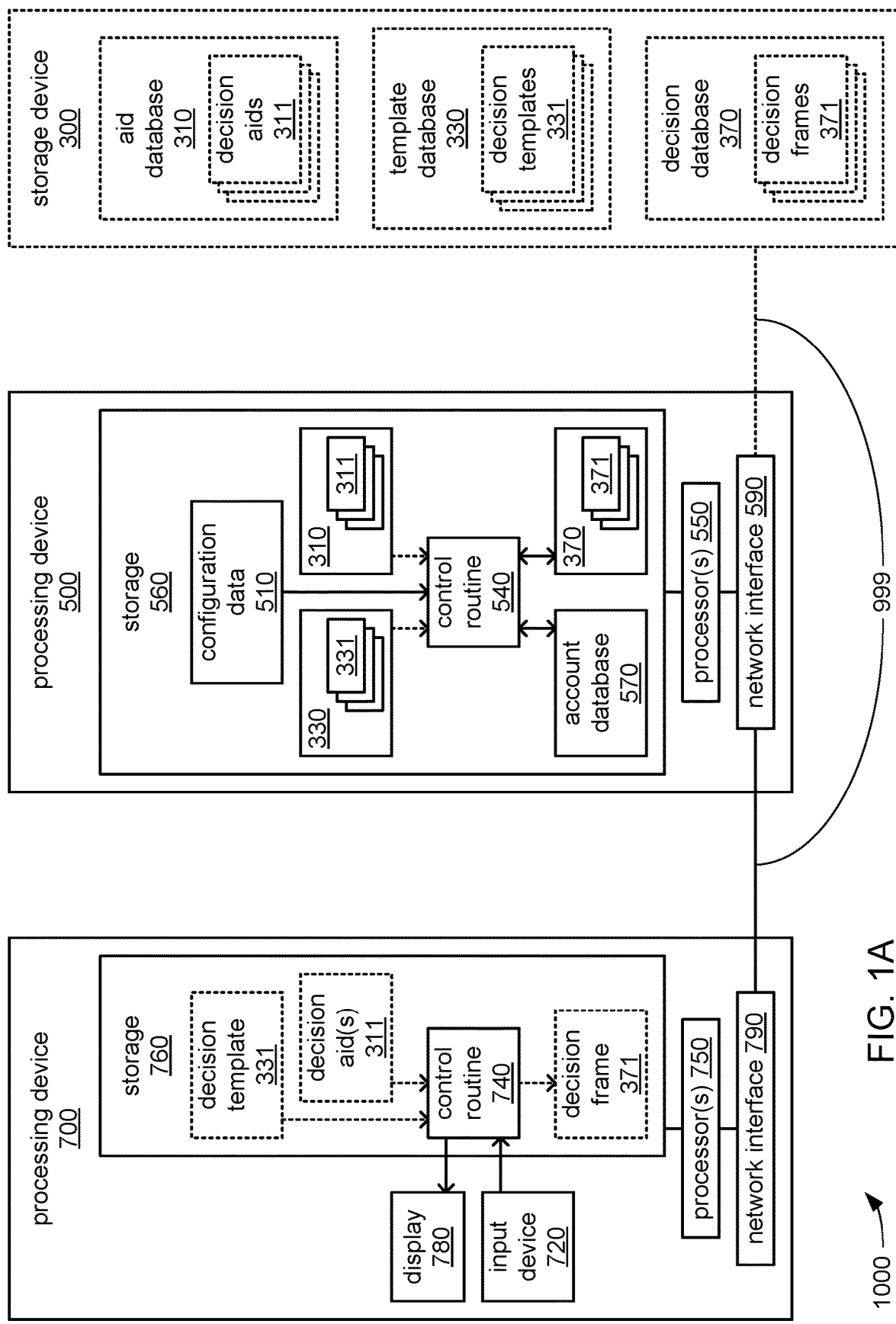
FIGS. 1A and 1B show aspects of alternate example implementations of a decision making augmentation system.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is a decision making augmentation system that implements a method for both augmenting the short term memory of the brain of a decision maker, and guiding the decision maker through considering positive and negative aspects of each option of a current decision in a manner that integrates both instrumental rationality and value rationality based on the values of the decision maker.

A decision making augmentation system includes: a manual input device configured to enable entry of text input by an operator of the decision making augmentation system that describes aspects of a current decision comprising a selection of one option from among multiple options; a display configured to visually guide the operator through providing the text input; a storage configured to store indications of the text input, wherein the text input comprises at least one of multiple descriptive texts and multiple selections of scale text; and a processor communicatively coupled to at least the storage. The processor is configured to perform operations including: receive a decision descriptive text of the multiple descriptive texts, wherein the decision descriptive text describes the current decision; and cause repeated presentation of the decision descriptive text on the display. The processor is also configured to, for each option of the multiple options, perform operations including: receive an indication of at least one selection of scale text of the multiple selections of scale text, wherein the at least one selection of scale text specifies either a degree of intensity of seeking to achieve or avoid a possible outcome of the option, or a degree of likelihood of achieving or avoiding the possible outcome of the option; and derive a degree of overall motivation associated with the option based on the at least one selection of scale text. The processor is further configured to: identify a best option from among the multiple options based on the degree of overall motivation associated with each option; cause a presentation of an indication of the best option on the display; and compare the degree of overall motivation associated with the best option to a threshold degree of overall motivation. The processor is still further configured to, in response to the degree of overall motivation associated with the best option being less than the threshold degree of overall motivation, cause a presentation, on the display, of: a warning that the degree of overall motivation associated with the best option is low; and a prompt for the operator to further consider the current decision. The processor is yet further configured to compare the degree of overall motivation associated with the best option to the degree of overall motivation associated with each other option of the multiple options. The processor is also yet further configured to, in response to the degree of overall motivation associated with the best option not exceeding, by at least a threshold degree of difference in overall motivation, the degree of overall motivation associated with at least one other option of the multiple options, cause a presentation, on the display of: a proximity warning that the difference in degree of the overall motivation associated with the best option from the overall motivation associated with at least one other option is low; and the prompt for the operator to further consider the current decision.

A method of decision making augmentation includes: receiving, at a processor of a decision making augmentation system, and via a manual input device configured to enable entry of text input by an operator, a decision descriptive text of multiple descriptive texts, wherein the decision descriptive text describes a current decision comprising a selection of one option from among multiple options; and causing repeated presentation of the decision descriptive text on a display configured to visually guide the operator through providing the text input, wherein the text input comprises at least one of the multiple descriptive texts and multiple selections of scale text. The method also includes, for each option of the multiple options, performing operations including: receiving, at the processor, and via the manual input device, an indication of at least one selection of scale text of the multiple selections of scale text, wherein the at least one selection of scale text specifies either a degree of intensity of seeking to achieve or avoid a possible outcome of the option, or a degree of likelihood of achieving or avoiding the possible outcome of the option; and deriving, by the processor, a degree of overall motivation associated with the option based on the at least one selection of scale text. The method further includes: identifying, by the processor, a best option from among the multiple options based on the degree of overall motivation associated with each option; causing a presentation of an indication of the best option on the display; and comparing, by the processor, the degree of overall motivation associated with the best option to a threshold degree of overall motivation. The method still further includes, in response to the degree of overall motivation associated with the best option being less than the threshold degree of overall motivation, causing a presentation, on the display, of: a warning that the degree of overall motivation associated with the best option is low; and a prompt for the operator to further consider the current decision. The method yet further includes comparing, by the processor, the degree of overall motivation associated with the best option to the degree of overall motivation associated with each other option of the multiple options. The method also yet further includes, in response to the degree of overall motivation associated with the best option not exceeding, by at least a threshold degree of difference in overall motivation, the degree of overall motivation associated with at least one other option of the multiple options, causing a presentation, on the display of: a proximity warning that the difference in degree of the overall motivation associated with the best option from the overall motivation associated with at least one other option is low; and the prompt for the operator to further consider the current decision.

Figure 1B:
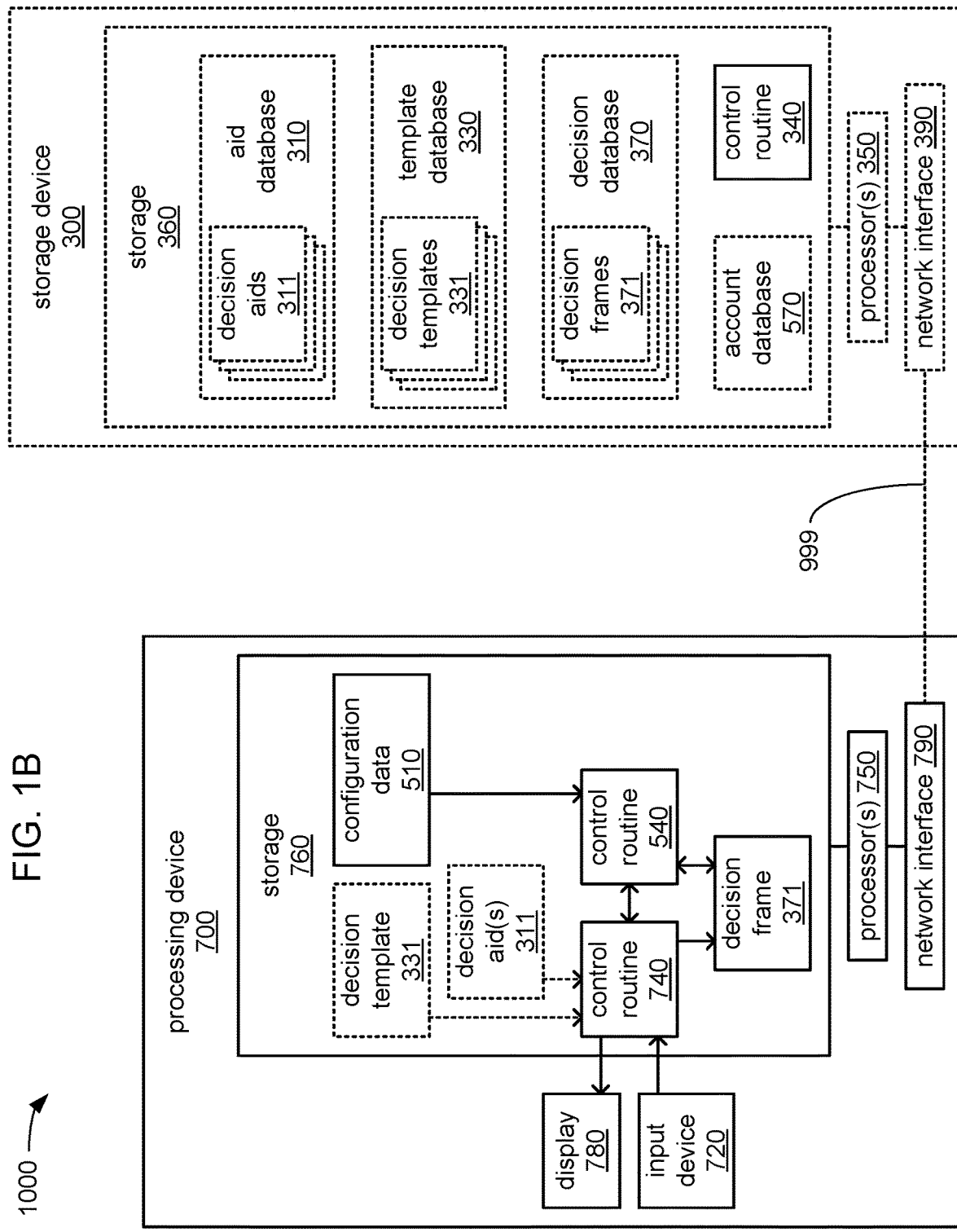

FIGS. 1A and 1B depict aspects of two different example embodiments of a decision making augmentation system 1000 that includes a storage device 300, a processing device 500 and/or a processing device 700 coupled by a network 999 (e.g., cable-based and/or wireless links interconnecting devices). In the decision making augmentation systems 1000 depicted in each of FIGS. 1A and 1B, and as will be explained in greater detail, the devices 300, 500 and/or 700 may cooperate through the network 999 to augment the decision making capabilities of the brain of a decision maker in making a current decision. The processing device 700 may directly interact with a decision maker, providing a user interface including various prompts to guide the decision maker through providing input concerning the current decision in a manner that elicits, and is indicative of, an integrated use of both instrumental and value rationality faculties of the brain of the decision maker. In so doing, the processing device 700 may store such inputs in a decision frame 371, and the processing device 700 may recurringly present portions of those inputs to the decision maker in a manner that effectively augments the short-term memory of the decision maker. The storage device 300 (if present) may provide a set of decision templates 331 from which the decision maker may be prompted to select a decision template 331 that most closely matches aspects of the current decision as part of providing input concerning the current decision. The storage device 300 (if present) may additionally provide a set of decision aids to which references (e.g., links) may be provided within the selected decision template 331. With inputs having been provided by the decision maker, either the processing device 700, or the processing device 500 depicted in FIG. 1A, may employ a subset of the inputs stored in the decision frame 371 to derive degrees of motivation for each of the multiple options being considered in the current decision, and then uses those degrees of motivation to select one of those options as the best option. As will further be explained, the degrees of motivation may also be analyzed to determine whether the decision maker should be prompted to further consider the current decision. Throughout, the decision frame 371 of the current decision may be stored within the processing device 700 to enable the decision maker to return to considering the current decision at a later time, and/or may be stored within the storage device 300 (if present) to additionally enable the decision maker to share aspects of current decision with others.

FIG. 1A depicts aspects of example embodiments of the system 1000 in which there is a division in processing operations between the processing device 700 that interacts directly with a decision maker and the processing device 500 that may be more remotely located. Indeed, and although not specifically depicted, it may be that the single depicted processing device 500 cooperates with multiple ones of the processing device 700 to assist multiple decision makers in the making of multiple decisions.

As depicted, the storage device 300 (if present) may store an aid database 310 of multiple decision aids 311, a template database 330 of multiple decision templates 331, and/or a decision database 370 of multiple decision frames 371. Each decision aid 311 may provide a decision maker with information concerning various aspects of the subject of a current decision, and/or of an option that they may be considering as part of making a current decision. More specifically, each decision aid 311 may present information concerning various advantages and/or disadvantages concerning the subject of at least one option so as to provide a decision maker with information concerning what outcomes may be possible in connection with selecting one or more options. In various embodiments, each of the decision aids may include a text document, still images, a slideshow, an audio/visual presentation, etc.

As previously discussed, each decision frame 371 may store the inputs of a decision maker considering a current decision. In some embodiments, each decision frame 371 may correspond to a single decision to be made. However, and as will be explained in greater detail, it may be that, as a decision maker continues to consider a current decision (presuming they have time to do so), the decision maker may provide multiple versions of their inputs concerning the current decision, and may desire to save each of those multiple versions to accommodate the possibility that an earlier version is later determined to represent a better course in decision making than a later version. Thus, it may be that multiple decision frames 371, taken together as a set of versions, correspond to a single current decision.

As also previously discussed, each decision template 331 may store a set of pre-filled inputs for a type of decision that is to be made. A decision maker may be provided with the option of selecting a decision template 331 from among the template database 330 that most closely resembles the current decision that is to be made. As will be explained in greater detail, the provision of decision templates 331 to decision makers may be deemed desirable as an aid in assisting the framing of a current decision and/or as an approach to providing references to decision aids 311.

As depicted, the processing device 500 includes a storage 560, one or more processor(s) 550, and/or a network interface 590 to interface the processing device 550 with the network 999. The storage 560 stores a control routine 540, configuration data 510, an account database 570, the aid database 310 (or a copy thereof), the template database 330 (or a copy thereof), and/or the decision database 370 (or a copy thereof). The control routine 540 includes executable instructions operable on the processor(s) 550 to cause the processor(s) 550 to perform various operations. As will be explained in greater detail, the configuration data 510 may include various parameters for the performance of those operations such that the processor(s) 550 may be caused by execution of the control routine 540 to retrieve those parameters from the configuration data 510.

Similarly, the processing device 700 includes a storage 760, one or more processor(s) 750, a display 780, at least one input device 720, and/or a network interface 790 to interface the processing device 750 with the network 999. The storage 760 stores a control routine 740, one or more decision aids 311 from the aid database 310, a decision template 331 from the template database 330, and/or one or more decision frames 371 that may be stored within the decision database 370. The control routine 740 includes executable instructions operable on the processor(s) 750 to cause the processor(s) 750 to perform various operations.

In some embodiments, the majority of processing operations by which a user interface is generated, by which a decision maker is guided through providing input, by which an option in a current decision is selected, and by which an analysis of degrees of motivation occurs may be performed by the processor(s) 550 of the processing device 500 as a result of executing the control routine 540. In contrast, the processing operations performed by the processor(s) 750 of the processing device 700 as a result of executing the control routine 740 may be largely limited to what might be called the role of a "dumb terminal" in which processor(s) 750 are largely limited to operating the display 780 and the input device(s) 720 to present that user interface to a decision maker.

An example of such embodiments may be where the processor(s) 550 of the processing device 500 are caused by execution of the control routine 540 to provide a web server accessible via the network 999 to the processing device 700, and where the processor(s) 750 of the processing device 700 are caused by execution of the control routine 740 to implement a web browser in which the display 780 and the input device(s) 720 are operated to enable a decision maker to interact with web pages of web server of the processing device 500 through the processing device 700. In this way, the user interface generated within the processing device 500 is remotely provided to the decision maker through the processing device 700.

In other embodiments, the processing operations by which a user interface is generated, by which a best option in a current decision is identified, and by which an analysis of degrees of motivation occurs, may be more evenly divided between the processor(s) 550 of the processing device 500 and the processor(s) 750 of the processing device 700. More specifically, it may be that the processor(s) 750 of the processing device 700 are caused by execution of the control routine 740 to generate the user interface, to use the user interface to guide a decision maker through providing input concerning a current decision, and to store that input within a decision frame 371. Further, it may be that the processor(s) 550 of the processing device 500 are caused by execution of the control routine 540 to derive degrees of motivation for the options of a current decision, to use the degrees of motivation to identify a best option, and/or to analyze the degrees of motivation to determine whether the decision maker should be prompted to further consider the current decision.

In still other embodiments, a decision maker operating the processing device 700 may be given an option to specify the manner in which the performance of processing operations may be divided between the processing devices 500 and 700. By way of example, the decision maker may be given the option to choose whether processing operations associated with making a current decision are divided between these two devices (e.g., in what may be presented to the decision maker as an "online" mode), or having most (if not all) processing operations performed by the processor(s) 750 of the processing device 700 (e.g., in what may be presented as an "offline" mode) such that an ongoing connection to the processing device 500 through the network 999 is not needed. Such a choice between two such modes may also dictate whether a software routine (e.g., a copy of some or all of the control routine 540) may be provided to and stored within the processing device 700 to enable execution thereof by the processor(s) 750.

Regardless of the exact manner in which the performances of such processing operations are divided between the processing devices 500 and 700, it may be that execution of the control routine 540 additionally causes the processor(s) 550 of the processing device 500 to perform various "gatekeeper" functions. More specifically, the processor(s) 550 may be caused to control access to the aforedescribed functionality for augmenting the decision making capabilities of a decision maker in making a current decision, and/or to control access to the databases 310, 330 and/or 370, in a manner in which such access may be granted to just selected decision makers. Such control over access may entail the storage of security credentials (e.g., passwords, encryption keys, etc.), and/or other details associated with particular decision makers and/or associated with particular devices associated with particular decision makers, within the account database 570. In embodiments in which the sharing of inputs of a decision maker with others is enabled, it may be that the security credentials, and/or other details associated with particular others, and/or associated with particular devices associated with particular others, area also stored within the account database 570.

FIG. 1B depicts aspects of example embodiments of the system 1000 in which the processing device 700 is operated in much more of a standalone configuration, and the system 1000 may not include the processing device 500. Thus, the processing device 700 may directly interact with the storage device 300 (if present).

As depicted, the storage device 300 (if present) may include a storage 360, a processor 350 and/or a network interface 390, and the storage 360 may store the account database 570 and a control routine 340, in addition to storing the aid database 310, the template database 330 and/or the decision database 370. The control routine 340 includes executable instructions operable on the processor(s) 350 to cause the processor(s) 350 to perform various operations. In some embodiments, execution of the control routine 340 may cause the processor(s) 350 of the storage device 300 to take over the "gatekeeper" function that was described above as being performed by the processor(s) 550 of the processing device 500 in FIG. 1A.

In a manner similar to what was depicted in the processing device 700 of FIG. 1A, the processing device 700 of FIB. 1B may also include the storage 760, one or more processor(s) 750, the display 780, at least one input device 720, and/or the network interface 790 to interface the processing device 750 with the network 999. However, in addition to the storage 760 storing the control routine 740, one or more decision aids 311, a decision template 331, and/or one or more decision frames 371, the storage 760 may also store the control routine 540 and/or the configuration 510. Thus, both of the control routines 540 and 740 may include executable instructions operable on the processor(s) 750 to cause the processor(s) 750 to perform various operations.

Referring now to both FIGS. 1A and 1B, each of the storages 360, 560 and 760 may be based on any of a variety of volatile storage technologies, including and are not limited to, random-access memory (RAM), dynamic RAM (DRAM), Double-Data-Rate DRAM (DDR-DRAM), synchronous DRAM (SDRAM), static RAM (SRAM), etc. Alternatively or additionally, the storage 360 may be based on any of a variety of non-volatile storage technologies.

Each of the processors 350, 550 and 750 may include any of a wide variety of processors, microcontrollers, gate-array logic devices, etc. that may be incorporate any of a variety of features to enhance speed and/or efficiency of processing operations. Such features may include and are not limited to, multi-threading support per core component, multiple processing core components, directly integrated memory control functionality, and/or various modes of operation by which speed of throughput and/or level of power consumption may be dynamically altered.

Each of the processors 350, 550 and 750 may be implemented as a single semiconductor die within a single package. Alternatively, each processor 350 may be implemented as multiple semiconductor dies incorporated into a single package, such as a multi-chip semiconductor package (e.g., a system-on-a-chip, or SOC) in which the multiple semiconductor dies may be interconnected in any of a variety of ways, including and not limited to, conductive wires extending between adjacent semiconductor dies, and/or a substrate formed from multiple layers of conductors separated by intervening layers of insulating material (e.g., a printed circuit board, or PCB) onto which the multiple semiconductor dies may be soldered.

Each of the network interfaces 390, 590 and 790 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, each of the network interfaces 390, 590 and 790 may be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2A:
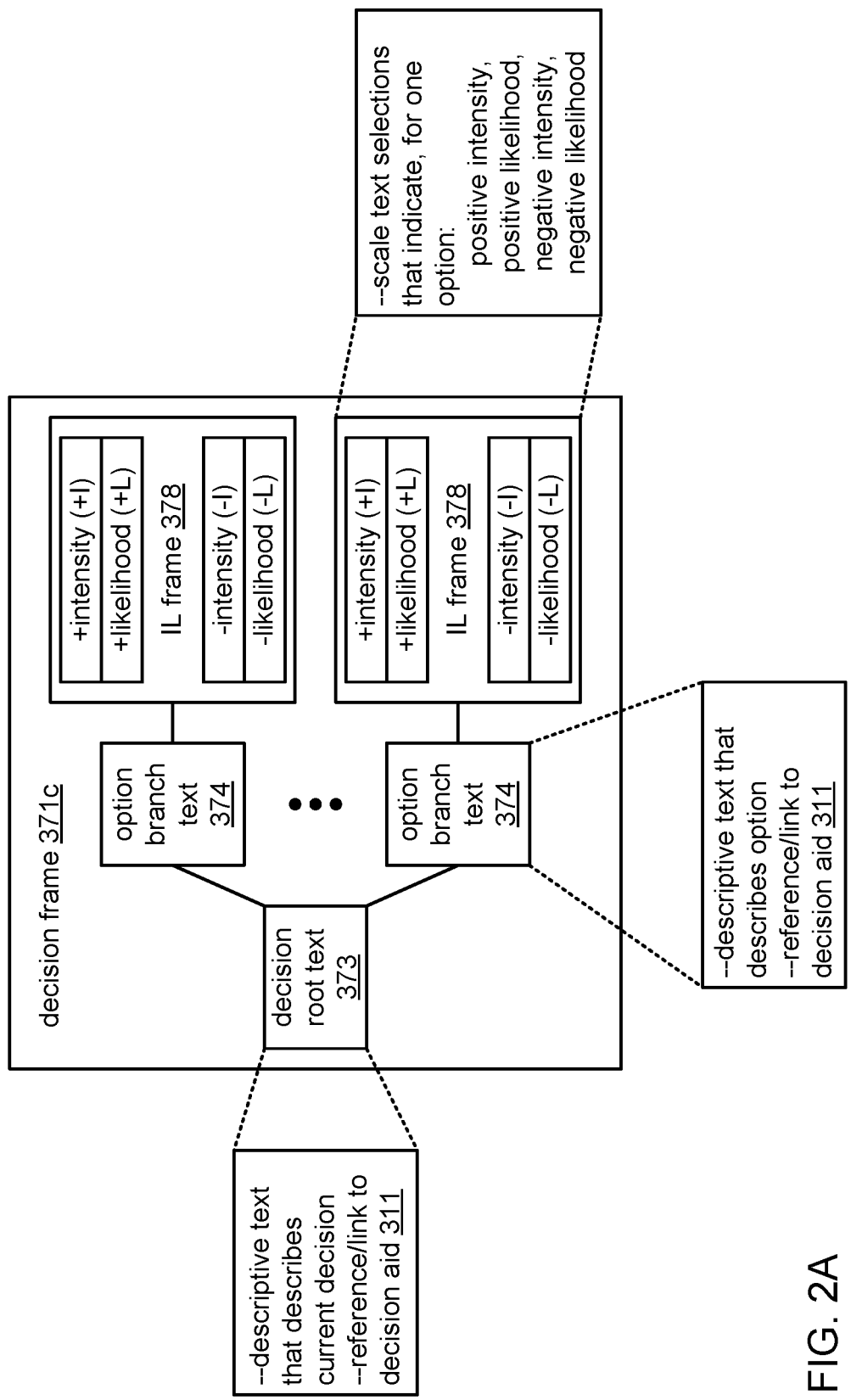
FIGS. 2A, 2B and 2C, together, show aspects of example data structures used in the decision making augmentation system of either FIG. 1A or 1B.
Figure 2B:
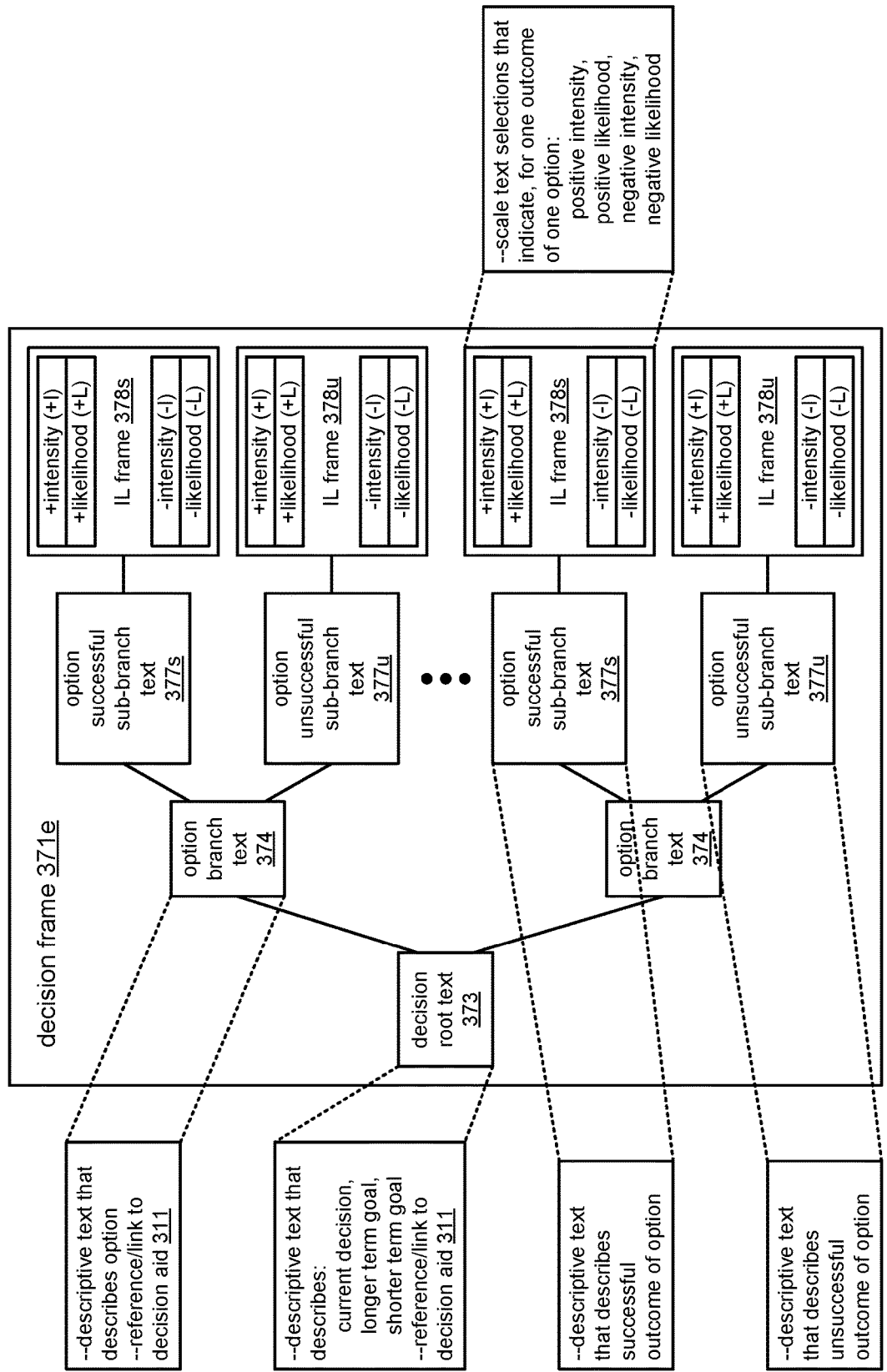
Figure 2C:
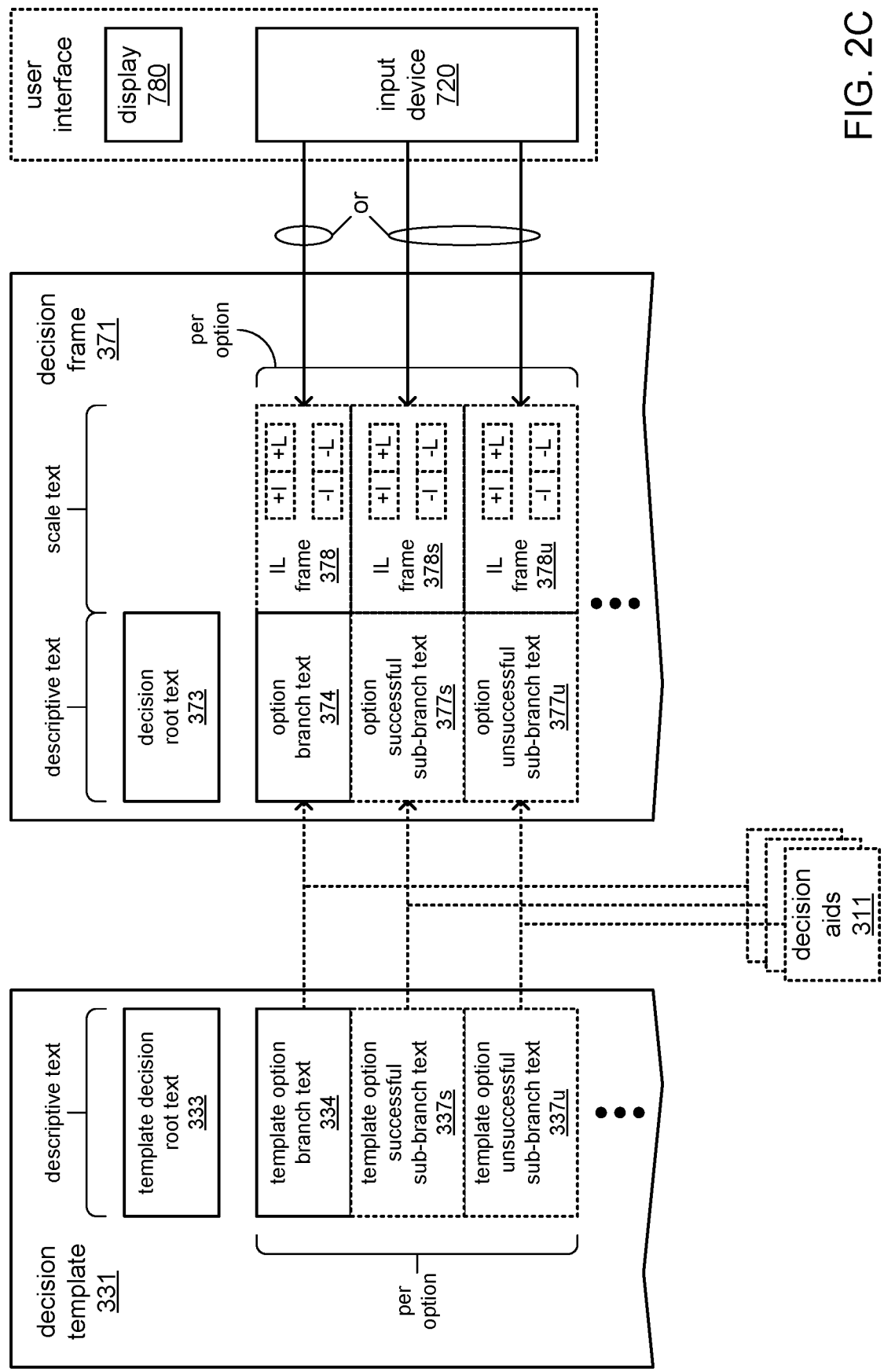

FIGS. 2A, 2B and 2C, together, depict aspects of example embodiments of data structures employed by various embodiments of the decision making augmentation system 1000 of either of FIG. 1A or 1B. More specifically, FIGS. 2A and 2B depict aspects of two different embodiments of the decision frame 371 associated with the operation of system 1000 in either of the compact mode (i.e., a decision frame 371c) or the expanded mode (i.e., a decision frame 371e). FIG. 2C depicts aspects of the manner in which a decision template 331 may be used as a basis for the generation of a decision frame 371 (associated with either of the compact or expanded modes), along with other inputs provided by a decision maker.

Turning to FIGS. 2A-B, as previously discussed, the system 1000 may be operated in either of a compact mode or an expanded mode. Again, as previously discussed, the compact mode may be better suited for situations in which a current decision must be made in a relatively short period of time such that a decision maker is guided through providing a reduced set of inputs about the current decision. As also previously discussed, the expanded mode may be better suited for situations in which there is more time to more carefully consider a current decision such that a decision maker is guided through providing a larger set of inputs about the current decision, including shorter and/or longer term goals.

FIG. 2A depicts aspects of the contents and organization of an example decision frame 371c generated during operation of the system 1000 in the compact mode. As depicted, the decision frame 371c may be a data structure with a tree-like organization of items of data therein, where the tree-like organization is meant to correspond to various aspects of a decision that is to be made. More specifically, a separate branch may be allocated directly off the root of the tree for each option of the multiple options that are being considered as part of making the decision. It should be noted that there is a presumption that each decision for which the system 1000 is used will essentially be a choice from among at least two options.

While the system 1000 is operated in the compact mode, a decision maker may be guided through entering descriptive text (e.g., via the user interface provided using the input device(s) 720 and the display 780) that describes the current decision, and that describes each of the options that is being considered. The descriptive text that describes the current decision may be stored within the decision frame 371c as the decision root text 373, and the descriptive text that describes each one of the options may be stored as the option branch text 374 of the branch that corresponds to that option.

As will be explained in greater detail, the descriptive text that is stored as the decision root text 373 and as each of the option branch texts 374 may not be used, at all, in the derivation of degrees of motivation, in identifying a best option based on the degrees of motivation, or in analyzing the degrees of motivation to determine whether to the decision maker is to be prompted to further consider the current decision. Instead, the descriptive text that is stored as the decision root text 373, and as each of the option branch texts 374, may be repeatedly visually presented to the decision maker through the user interface that is provided using the display 780 and the input devices 720 as part of an approach to augmenting the limited capacity of the short-term memory, and to reducing the need for accesses to long-term memory. Stated differently, such text may be repeatedly visually presented to the decision maker to better enable use of the short-term term memory of the decision maker's brain to retain other information that is pertinent to making the current decision.

In addition to the decision maker being guided through entering such descriptive text, the decision maker may also be guided through selecting scale texts from menus as an approach to providing input that is indicative of degrees of intensity (I) and likelihood (L) that are associated by the decision maker with each option. Indications of the selections of scale texts made by the decision maker for each option may be stored as an IL frame 378. As will be explained in greater detail, for the decision frame 371c, it may be the indications stored in the IL frames 378 of selections of scale text indicative of degrees of intensity and likelihood for each option that are used to derive degrees of motivation for the options, which are then used to identify one of the options as the best option, and which are also analyzed to determine whether a decision maker should be prompted to further consider the current decision.

FIG. 2B depicts aspects of the contents and organization of an example decision frame 371e generated during operation of the system 1000 in the expanded mode. As depicted, and like the decision frame 371c of FIG. 2A associated with the compact mode, the decision frame 371e of FIG. 2B associated with the expanded mode may also be a data structure with a tree-like organization of items of data therein, where the tree-like organization is again meant to correspond to various aspects of a current decision. Indeed, as will be discussed in greater detail, a decision frame 371c generated during the compact mode may be converted into a decision frame 371e as part of a change from use of the compact mode for a current decision to use of the expanded mode for that same current decision. Again, a separate branch of the tree-like organization may be allocated directly off the root of the tree for each option that is being considered in a current decision. However, unlike the tree-like organization of the decision frame 371c, each branch in the tree-like organization of the decision frame 371e that is associated with an option includes a pair of sub-branches, where one sub-branch is associated with a possible successful outcome of the option and the other sub-branch is associated with a possible unsuccessful outcome of the option. Also unlike the tree-like organization of the decision frame 371c in which a single separate IL-frame 378 is associated with each branch for an option, in the tree-like organization of the decision frame 371e, separate IL-frames 378s and 378u are associated with the sub-branches for successful and unsuccessful outcomes, respectively, for each option.

While the system 1000 is operated in the expanded mode, in addition to being guided through entering descriptive text that describes the current decision and each of the options (as is the case in the compact mode), the decision maker is also guided through entering descriptive text that describes shorter and/or longer term goal(s) associated with the current decision, and that describes each possible successful and unsuccessful outcome associated with each option. Somewhat similar to the decision frame 371c, in the decision frame 371e, the descriptive text that describes the shorter and/or longer term goal(s) may be stored, along with the descriptive text the describes the current decision, as the decision root text 373. Also, as was the case with the decision frame 371c, in the decision frame 371e, the descriptive text that describes each one of the options may be stored as the option branch text 374 of the branch that corresponds to that option. However, in the decision frame 371e, additionally for each option, the descriptive text that describes each possible successful and unsuccessful outcome of each option may be stored as the option successful sub-branch text 377s and the option unsuccessful sub-branch text 377u, respectively.

Instead of the decision maker being guided through selecting scale texts from menus that are indicative of degrees of intensity (I) and likelihood (L) that are associated by the decision maker with positive and negative aspects of each option, as was the case in compact mode, in expanded mode, the decision maker may be guided through selecting scale texts from menus that are indicative of degrees of intensity (I) and likelihood (L) that are separately associated by the decision maker with positive and negative aspects of each of the possible successful and unsuccessful outcomes associated with each option. Indications of such selections of scale text made by the decision maker for the successful outcomes of each option may be stored as the IL frame 378s for each option, while the indications of such selections of scale text made by the decision maker for the unsuccessful outcomes of each option may be stored as the IL frame 378u for each option. As will be explained in greater detail, for the decision frame 371e, it may be the indications of selections of scale text that are indicative of degrees of intensity and likelihood stored as the IL selections 378s and 378u for each option that are used to derive degrees of motivation for each option, which are then used to identify a best option, and which are analyzed to determine whether the decision maker should be prompted to further consider the current decision.

FIG. 2C depicts aspects of the manner in which a decision frame 371 (of either of the types 371c or 371e associated with the compact or expanded modes, respectively) may be partially generated from a decision template 331. As previously discussed, in embodiments of the decision making augmentation system 1000 that include the ability to provide decision templates 331, a decision maker may at least be given the option of selecting a decision template 331 having options and/or other features of a decision that match the current decision.

As depicted, the decision template 331 may have just a subset of the contents of the decision frame 371 that is to be generated from the decision template 331. More specifically, the decision template 331 may include just descriptive text that would otherwise be directly entered by a decision maker to describe various aspects of a current decision, and may not include any indication of any selection of scale text that would indicate a degree of intensity or likelihood for any option or any possible outcome of any option. Such a lack of provision of selections of scale text in the decision template(s) 331 may be deemed desirable to avoid any possibility of influencing a decision maker in specifying any degree of intensity or likelihood. In other words, it may be deemed desirable to require that a decision maker select scale texts indicating degrees of likelihood and intensity without any hint or suggestion of selections in a decision template 331.

As depicted, any descriptive text that may be stored as the template decision root text 333 within the decision template 331 (i.e., descriptive text that may describe a decision, and/or shorter and/or longer term goals) may become the default descriptive text that is stored as the decision root text 373 within a decision frame 371. Similarly, for each option, any descriptive text that may be stored as the corresponding template option branch text 334 (i.e., descriptive text that may describe that option) may become the default descriptive text that is stored as the corresponding option branch text 374 for that option within the decision frame 371. Also similarly, for each successful or unsuccessful outcome for an option, any descriptive text that may be stored as the corresponding template option successful sub-branch text 337*s* or template option unsuccessful sub-branch text 337*u* (i.e., descriptive text that may describe that outcome) may become the default descriptive text that is stored as the corresponding option successful sub-branch text 377*s* or option unsuccessful sub-branch text 377*u*, respectively, for that outcome within the decision frame 371.

Again, it should be noted that such descriptive texts as may be stored within the decision template 331 stored as texts 333, 334, 337*s* and/or 337*u* are intended to serve merely as default descriptive texts for storage within the decision frame 371 as texts 373, 374, 377*s* and/or 377*u*, respectively. Thus, after being so stored within the decision frame 371, a decision maker may be guided through a series of opportunities to edit such default descriptive texts to better reflect wording that may be more familiar to the decision maker and/or as part of re-framing the current decision in a manner that differs from how it was framed in the decision template 331.

As also depicted, one or more of such descriptive texts associated with the current decision, with each option, and/or with each possible outcome of each option, that is stored within a decision template 331 may include references to one or more decision aids 311. In this way, in addition to providing a decision maker with a default descriptive texts, the decision maker may also be provided with suggestions for what decision aids 311 to consult as part of gathering information needed to consider the options of the current decision. In some embodiments, such references may be implemented as selectable links implemented as uniform resource locators (URLs) that enable access to decision aids 311 that may be made accessible at web pages.

It should be noted that, in depicting a decision frame 371 in FIG. 2C to encompass either the decision frame 371*c* introduced in FIG. 2A and associated with the compact mode or the decision frame 373*e* introduced in FIG. 2B and associated with the expanded mode, both the single IL frame 378 of the compact mode and the pair of IL frames 378*s* and 378*u* are depicted. It is not envisioned that a decision frame 371 would ever include both the single IL frame 378 associated with each option, and the pair of IL frames 378*s* and 378*u* associated with the pair of both a successful outcome and an unsuccessful outcome of an option. Instead, it is envisioned that, for each option of a current decision, the corresponding decision frame 371 would include either the single IL frame 378 or the pair of IL frames 378*s* and 378*u*.

Figure 3A:
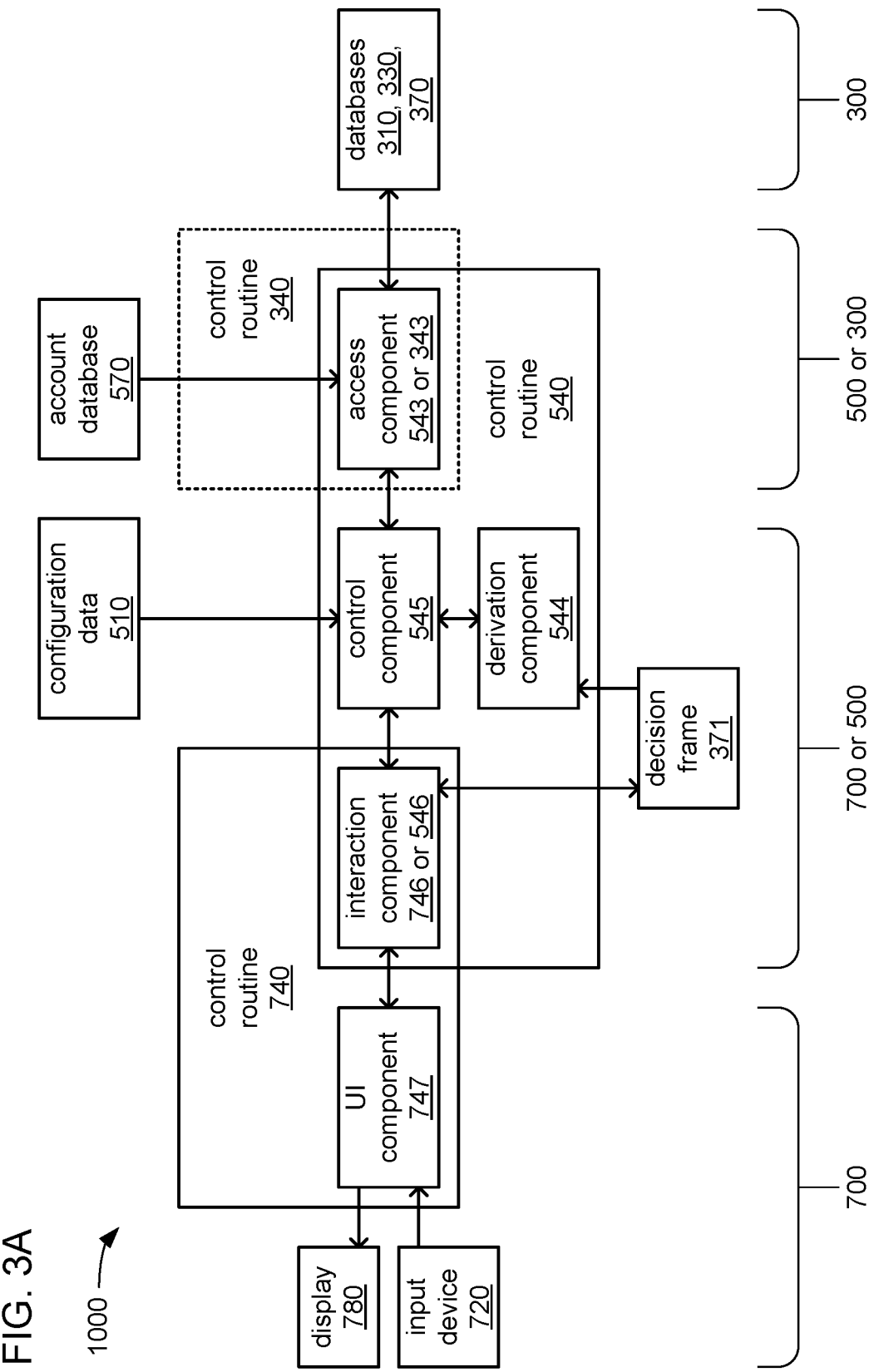

FIGS. 3A through 3M, together, depict aspects of an example performance of the decision making augmentation function of embodiments of the decision making augmentation system 1000 of either of FIG. 1A or 1B. More specifically, FIG. 3A depicts aspects of the allocation of portions of the decision making augmentation function among devices 300, 500 and/or 700 of the system 1000. FIGS. 3B-F, together, depict aspects of the system 1000 guiding a decision maker through providing inputs concerning a current decision. FIGS. 3G-M, together, depict aspects of the system 1000 deriving degrees of motivation for multiple options of a current decision, identifying a best option from among the multiple options, and/or presenting the decision maker with indications of the best option and/or of a need to further consider the current decision.

Turning to FIG. 3A, as previously discussed in reference to FIGS. 1A-B, there is a wide variety of ways in which portions of the functionality of the system 1000 may be allocated among the devices 300, 500 and/or 700. Accordingly, there is a wide variety of ways in which the devices 300, 500 and/or 700 may cooperate to augment the decision making functionality of the brain of a decision maker operating the processing device 700. And accordingly, there is a wide variety of ways in which particular components of executable instructions may be allocated among the control routines 340, 540 and/or 740.

As depicted, the control routine 740 may incorporate a UI component 747 that is executable by the processor(s) 750 of the processing device 700 to cause the processor(s) 750 to operate the display 780 and the input device 720 together to provide a user interface. It may be that the control routine 740 also incorporates an interaction component 746 that is executable by the processor(s) 750 to cause the processor(s) 750 to generate the visual prompts that may be presented to a decision maker through the user interface to provide such guidance, and to cause the processor(s) 750 to store the inputs received through that user interface as portions of a decision frame 371.

Alternatively, it may also be that the control routine 540 incorporates an interaction component 546 that is executable by the processor(s) 550 of the processing device 500 to cause the processor(s) 550 to generate the visual prompts that may be presented to a decision maker through the user interface to guide the decision maker through providing input concerning a current decision, and to cause the processor(s) 550 to store the inputs received through that user interface as portions of a decision frame 371.

As depicted, the control routine 540 may incorporate a derivation component 544 that is executable by the processor(s) 550 of the processing device 500 to cause the processor(s) 550 to use input indications of degrees of intensity and likelihood associated with each option of a current decision to derive degrees of motivation for each option, to use the degrees of motivation to identify a best option from among multiple options of a current decision, and/or to use the degrees of motivation to determine whether a decision maker should be prompted to further consider the current decision. The control routine 540 may also incorporate a control component 545 that is executable by the processor(s) 550 to control the performance of the decision making augmentation function of the other components of the control routines 340, 540 and/or 740 of the system 1000. It may be that the control routine 540 also incorporates an access component 543 that is executable by the processor(s) 550 to cause the processor(s) 550 to control access to the databases 310, 330 and/or 370, and/or to control access to the decision making augmentation functionality of the system 1000.

Alternatively, it may also be that the control routine 340 incorporates an access component 343 that is executable by the processor(s) 350 of the storage device 300 to cause the processor(s) 350 to control access to the databases 310, 330 and/or 370, and/or to control access to the decision making augmentation functionality of the system 1000.

It should be noted that, as previously discussed in reference to FIGS. 1A-B, it may be that the control routine 540 is caused to be executed by processor(s) 750 of the processing device 700, instead of by processor(s) 550 of the processing device 500. Thus, in some embodiments, it may be that the processor(s) 750 of the processing device 700 are caused to execute the components of both of the control routines 740 and 540.

Figure 3B:
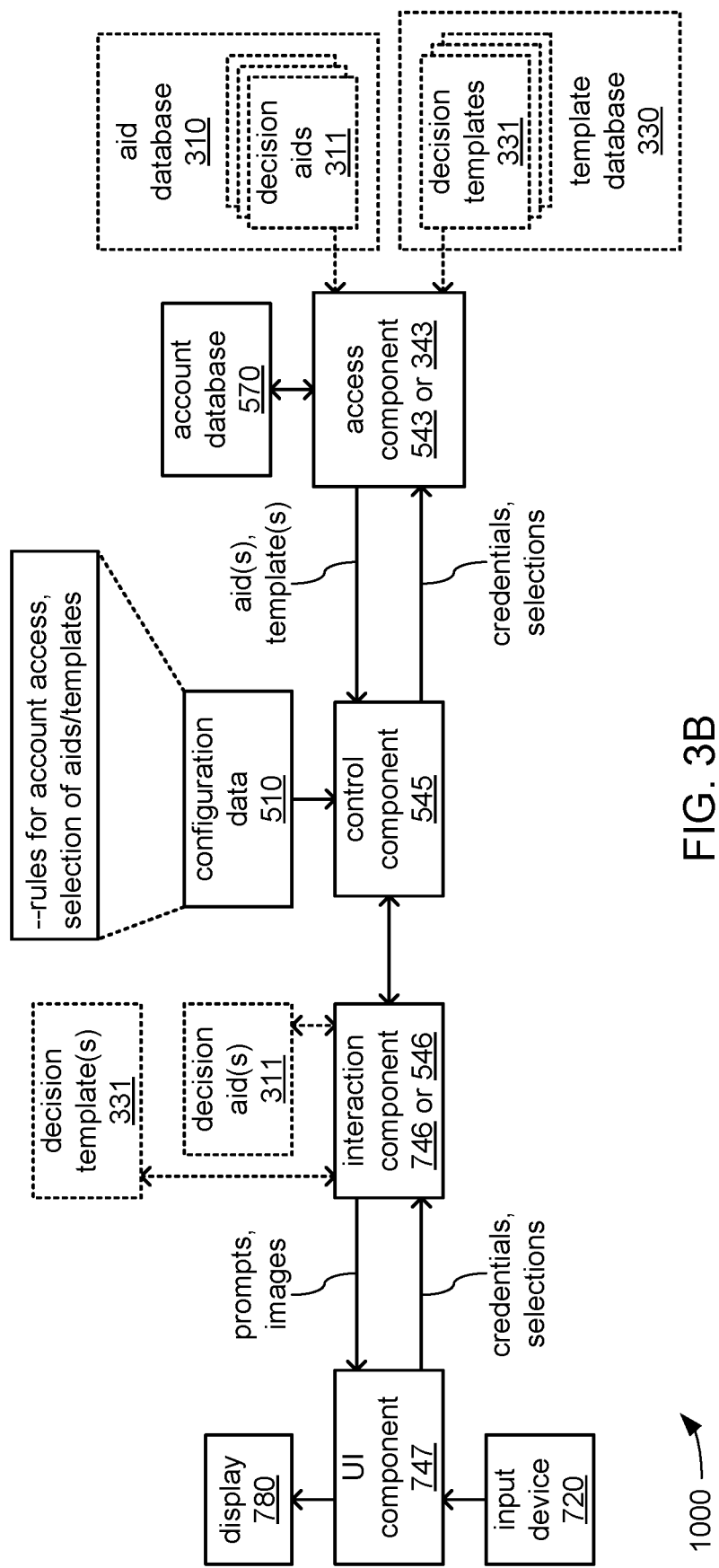

Turning to FIG. 3B, execution of the control component 545 by the processor(s) 550 or 750 to control the performance of the decision making functionality may cause commencement thereof to begin with the authentication of a decision maker, selection of a decision template 331, and/or selection of decision aids 311. Thus, in executing the access component 543 or 343, the processor(s) 550 or 350, respectively, may be caused to enforce security by employing security credentials (e.g., password, fingerprint, voiceprint, etc.) provided by a decision maker to selectively allow access to the databases 310, 330 and/or 370. In support of such enforcement of security, the processor(s) 750 or 550 may be caused by execution of the interaction component 746 or 546, respectively, to generate one or more prompts for being presented to the decision maker to provide such security credentials. In executing the UI component 747, those one or more prompts may be caused to be so presented by the processor(s) 750 as part of operating the display 780 and the input device 720 to present a user interface to the decision maker.

As previously discussed in reference to FIG. 2C, it may be that one or more decision templates 331 are made available for being selected by the decision maker as an approach to assisting the decision maker in framing a current decision by providing default versions of descriptive text that the decision maker may use without modification and/or may edit. More specifically, such default versions of descriptive text may provide a default framing of what the current decision is, what the shorter and/or longer term goals are (if shorter and/or longer term goals are to be explicitly specified), what each of the options are, and/or what the possible successful and unsuccessful outcomes are for each of the options are (if the possible outcomes are to be explicitly specified). In support of making available one or more decision templates 331 for being selected by the decision maker (if decision templates 331 are to be made available), the processor(s) 750 or 550 may be caused by execution of the interaction component 746 or 546, respectively, to generate one or more prompts for being presented to the decision maker via the UI to guide the decision maker through selecting a decision template 331.

In some embodiments, as part of prompting the decision maker to provide security credentials and/or to select a decision template 331, the decision maker may also be prompted to specify whether to use the decision making augmentation system 1000 in one of the previously discussed compact mode or expanded mode based on the decision maker's assessment of the amount of time that the decision maker has available in which to consider the current decision. As has been discussed (at least in reference to FIGS. 2A-B), use of the expanded mode may be deemed advantageous as the decision maker is then prompted through providing more detailed input (and/or to edit more detailed default input provided in a decision template 331) to thereby explicitly specify more aspects of the current decision, thereby causing the decision maker to more carefully consider the best way in which to frame the decision and/or the options thereof. However, as has also been discussed, the decision maker may not have sufficient time available in which to make the current decision, in which case the less detailed approach of the compact mode may prove sufficient in support of considering the current decision.

As has been discussed, in some embodiments, a selected decision template 331 may include references to one or more decision aids 311 as part of making available, to the decision maker, decision aids 311 that may contain information concerning one or more subjects associated with the current decision, and/or associated with a particular option of the current decision. Again, such references may be included in the default descriptive text provided in the decision template 331 for the decision as a whole and/or for one or more of the options. Also again, such references may include selectable links that trigger the provision and presentation of images of the decision aids 311 (e.g., URLs to web pages). In this way, the decision maker may be guided through learning aspects of such subjects as the decision maker considers the current decision as a whole, and/or as the decision maker is guided through considering each option, individually.

Figure 3C:
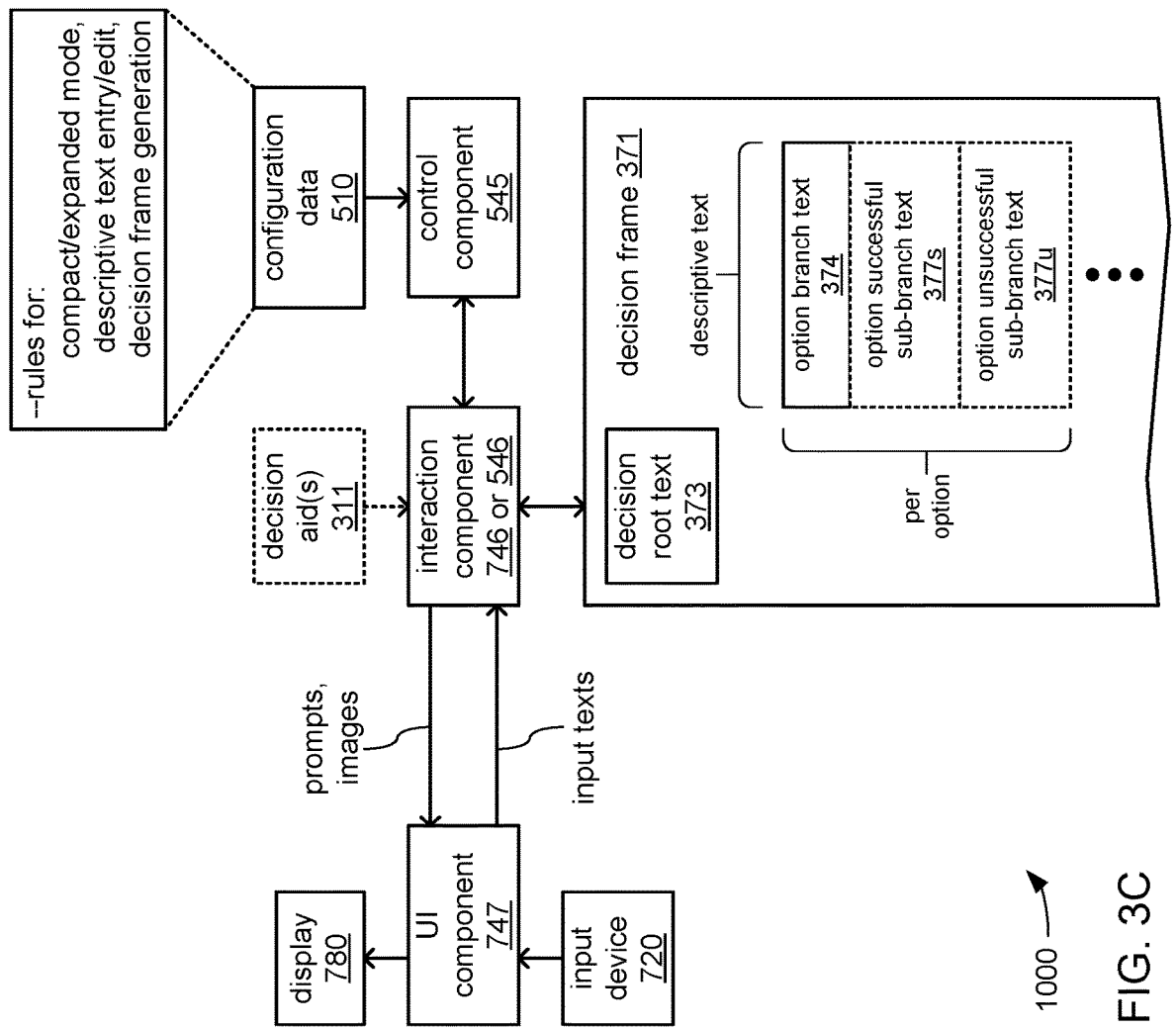

Turning to FIG. 3C, continued execution of the control component 545 may cause the performance of the decision making functionality of the system 1000 to continue with the decision maker being prompted to enter and/or edit descriptive text, and for the descriptive text to be stored as part of a decision frame 371 generated for current decision. Thus, in executing the interaction component 546 or 746, the processor(s) 550 or 750, respectively, may be caused to generate one or more prompts for being presented via the user interface to the decision maker to enter descriptive text, and/or to edit descriptive text, that explicitly describes the current decision, and/or shorter and/or longer term goals (in the expanded mode). Following the provision of such descriptive text (either through direct entry or through selection of a decision template 331) by the decision maker, such descriptive text that describes the current decision, and/or shorter and/or longer term goals may be stored within the depicted decision frame 371 as the decision root text 373.

Similarly, in continuing to execute the interaction component 546 or 746, the processor(s) 550 or 750, respectively, may be caused to generate one or more prompts for being presented to the decision maker to enter and/or edit descriptive text, that describes each of the multiple options of the current decision and/or that describes the possible successful and unsuccessful outcomes of each option (in the expanded mode). Following the provision of such descriptive text (again, either through direct entry or through selection of a decision template 331) by the decision maker, the descriptive text that describes each option may be stored as a corresponding instance of the option branch text 374. Similarly, in the expanded mode, the descriptive text that describes each possible successful outcome of each option may be stored as a corresponding instance of the option successful sub-branch text 377*s*, and the descriptive text that describes each possible unsuccessful outcome of each option may be stored as a corresponding instance of the option unsuccessful sub-branch text 377*u*.

Following the input and storage of such descriptive texts, continued execution of the interaction component 546 or 746 may cause the processor(s) 550 or 750, respectively, to generate visual presentations of at least a subset of those descriptive texts stored within the decision frame 371. Such visual presentations of descriptive texts may be repeatedly presented on the display 780 as part of the user interface provided by the UI component 747. As has been discussed, such a repeated presentation of descriptive texts on the display 780 may be part of an approach to effectively augmenting the short-term memory of the brain of the decision maker. Stated differently, having guided the decision maker through entering such descriptive text, which would have engaged use of short term memory, the repeated visual presentation of those descriptive texts on the display 780 may make such descriptive texts readily available for re-reading to enough of a degree that the need to continue to retain them in short-term memory is at least reduced, if not obviated.

As also previously discussed, chunks of new information that are retained in the short term memory of the human brain may also be subsequently retained in longer term memory as part of beginning to build associations between such new information and other information already previously retained in the long-term memory. As will also be familiar to those skilled in the art, accessing information retained in long-term memory tends to require more time and effort than information retained in short-term memory. The amount of time and effort to access information retained in long-term memory does tend to be reduced if more associations are made that connect that information to other information such that there are more pathways of association in place for enabling such association-based access. However, the repeated visual presentation of at least some of the descriptive texts on the display 780 also frees the brain of the decision maker from having to expend the time and effort to access that information, which may be sufficiently new as to have been retained in long-term memory with relatively few associations yet in place.

With the brain of the decision maker having been freed from continuing to use short-term memory to retain the descriptive texts, and with the brain of the decision maker having been freed of the necessity of taking the time and effort to access the descriptive texts in long-term memory, the short-term memory and other resources of the brain of the decision maker are made more readily available to better enable consideration of other aspects of the current decision, such as new information that may be provided by one or more decision aids. Additionally, the brain of the decision maker is able to more easily transition to being guided through considering the advantages and disadvantages of each of the multiple options of the current decision, as will shortly be explained.

Figure 3D:
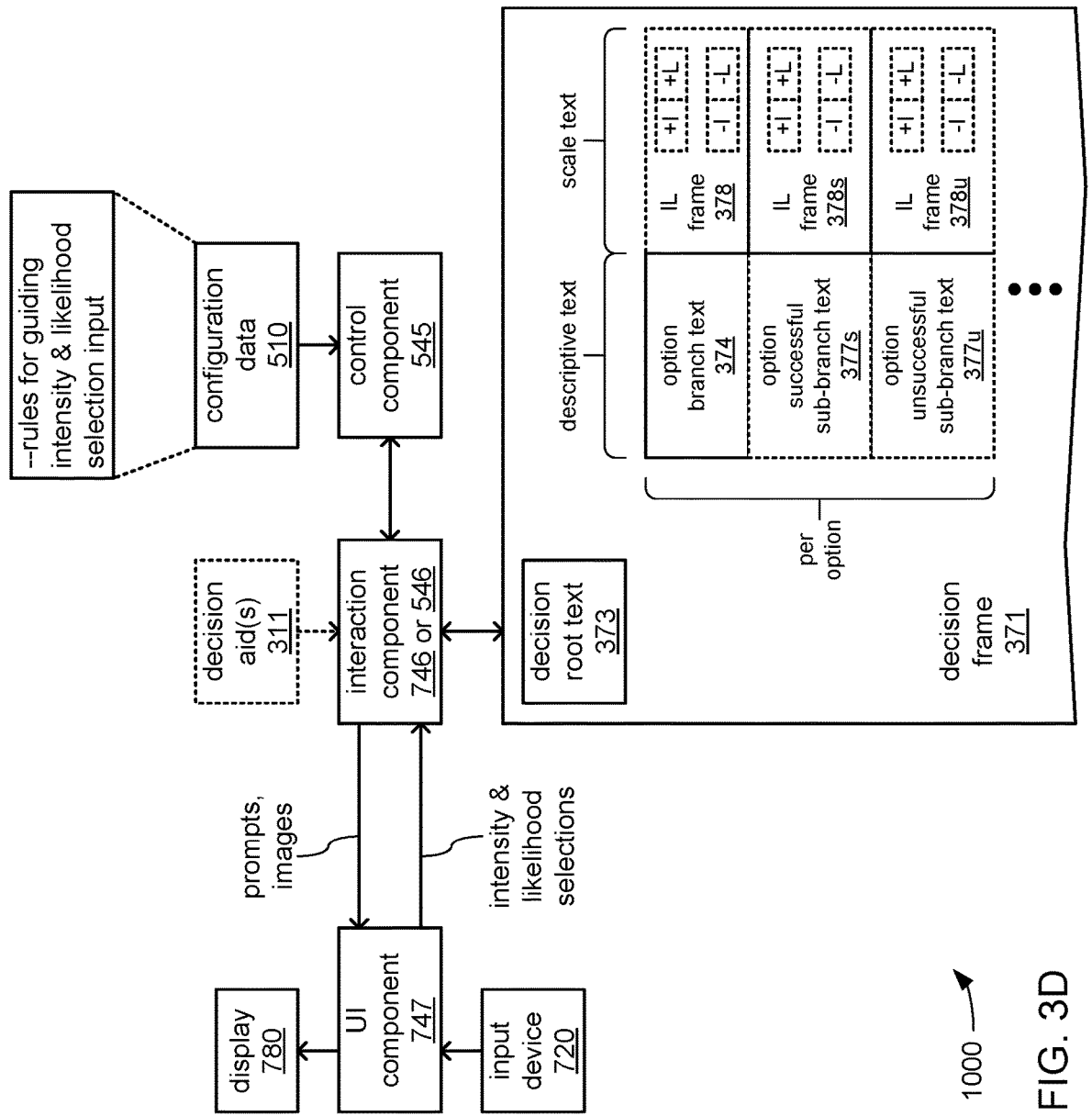

Turning to FIG. 3D, continued execution of the control component 545 may cause the performance of the decision making functionality of the system 1000 to continue with the decision maker being prompted to select scale texts from menus of multiple scale texts that are each textually descriptive of degrees of intensity and likelihood, and for indications of those scale text selections to be stored as part of the depicted decision frame 371 generated for the current decision. Thus, in executing the interaction component 546 or 746, the processor(s) 550 or 750, respectively, may be caused to generate prompts and corresponding images of menus of scale texts for being presented via the user interface to the decision maker. As the decision maker makes selections of scale texts from such menus, indications of such selections for each option may be stored within a single IL frame 378 allocated for each option in the compact mode, or indications of such selections for the possible successful outcome and for the possible unsuccessful outcome of each option may be stored in separate corresponding IL frames 378s and 378u, respectively.

Figure 3E:
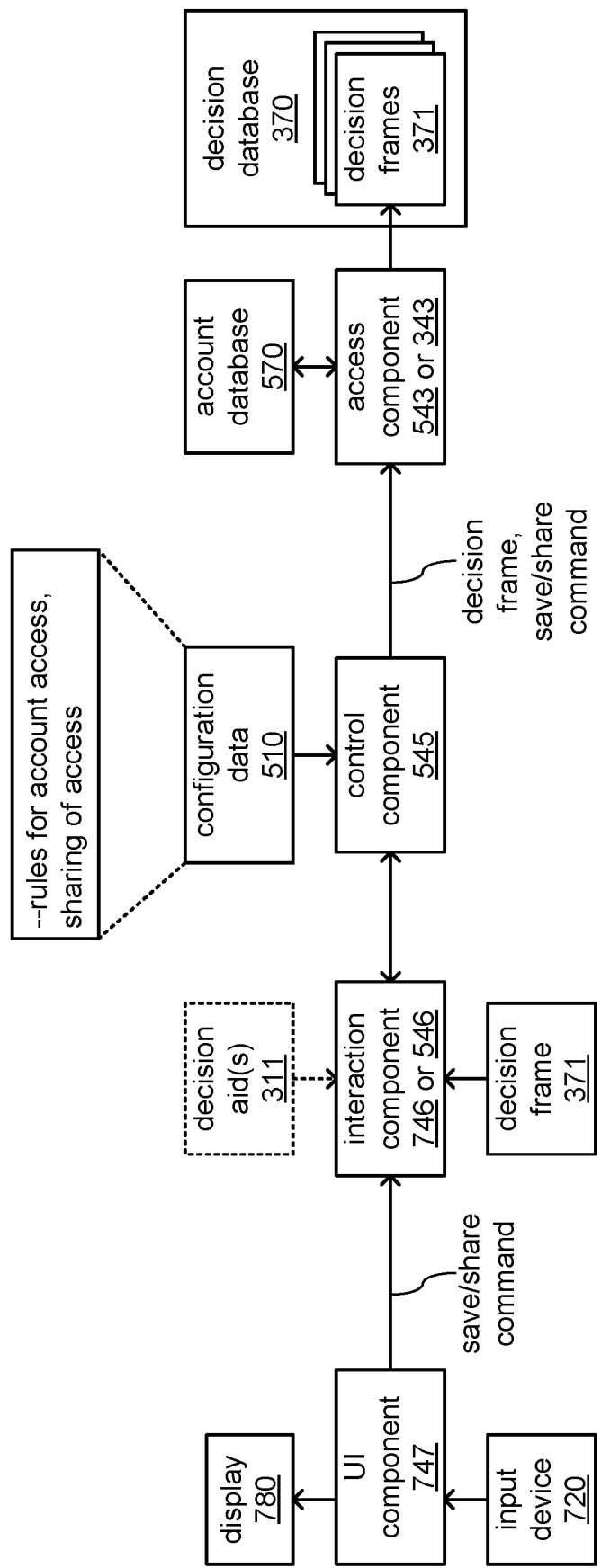

Turning to FIG. 3E, continued execution of the control component 545 may cause the provision, throughout the performance of the decision making augmentation functionality of the system 1000, of the option to save the contents of the decision frame 371 in persistent storage within the decision database 370 and/or to share the contents of the decision frame 371 with others. As previously discussed, a decision maker may interact with the system 1000 concerning a current decision in multiple separate sessions over a period of time, especially where the decision maker does have the time to more carefully consider the current decision. Thus, between such separated sessions, the decision maker may use the user interface to provide a command to save (persistently store) the decision frame 371 so that the decision maker may subsequently retrieve it from persistent storage when ready to return to considering the current decision. Such a command may be conveyed, along with the decision frame 371, itself, to where the decision database 370 may be stored within the processing device 500 and/or the storage device 300.

As also previously discussed, a decision maker may so save the decision frame 371 in such persistent storage as part of sharing the contents thereof with one or more others. Again, it may be that the current decision is meant to be a shared decision where there is meant to be more one decision maker involved, or at least one or more others who are meant to contribute information and/or opinions concerning the current decision to the decision maker. Alternatively or additionally, the decision maker may share the contents of the decision frame 371 with one or more others who have expertise in a subject associated with the current decision so as to elicit information and/or opinions therefrom. In some embodiments, additional storage space (not shown) within the decision frame 371 may be allocated to store text and/or other types of information that may be stored therein by such others for the purpose of being considered by the decision maker. Alternatively or additionally, such others may be permitted to at least augment the descriptive text provided by the decision maker with references to one or more decision aids 311 for the benefit of the decision maker. Thus, where others are aware of decision aids 311 that may be of benefit to the decision maker in considering the current decision as a whole, and/or in considering aspects of one or more particular options thereof, such others may be permitted to augment the descriptive text that describes the current decision, and/or that describes one or more particular options, with references to such decision aids 311.

Where the decision frame 371 is persistently stored as part of enabling it to be shared, it may be that the command to do so that is provided by the decision maker includes identifiers of the one or more others with which the contents of the decision frame 371 are to be shared. In some embodiments, continued execution of the access component 343 or 543 by the processor(s) 350 or 550, respectively, may cause the contents of the account database 570 that are associated with the decision maker to be updated with such identifiers of the one or more others to enable those access to the decision frame 371 to be granted to those one or more others.

Figure 3F:
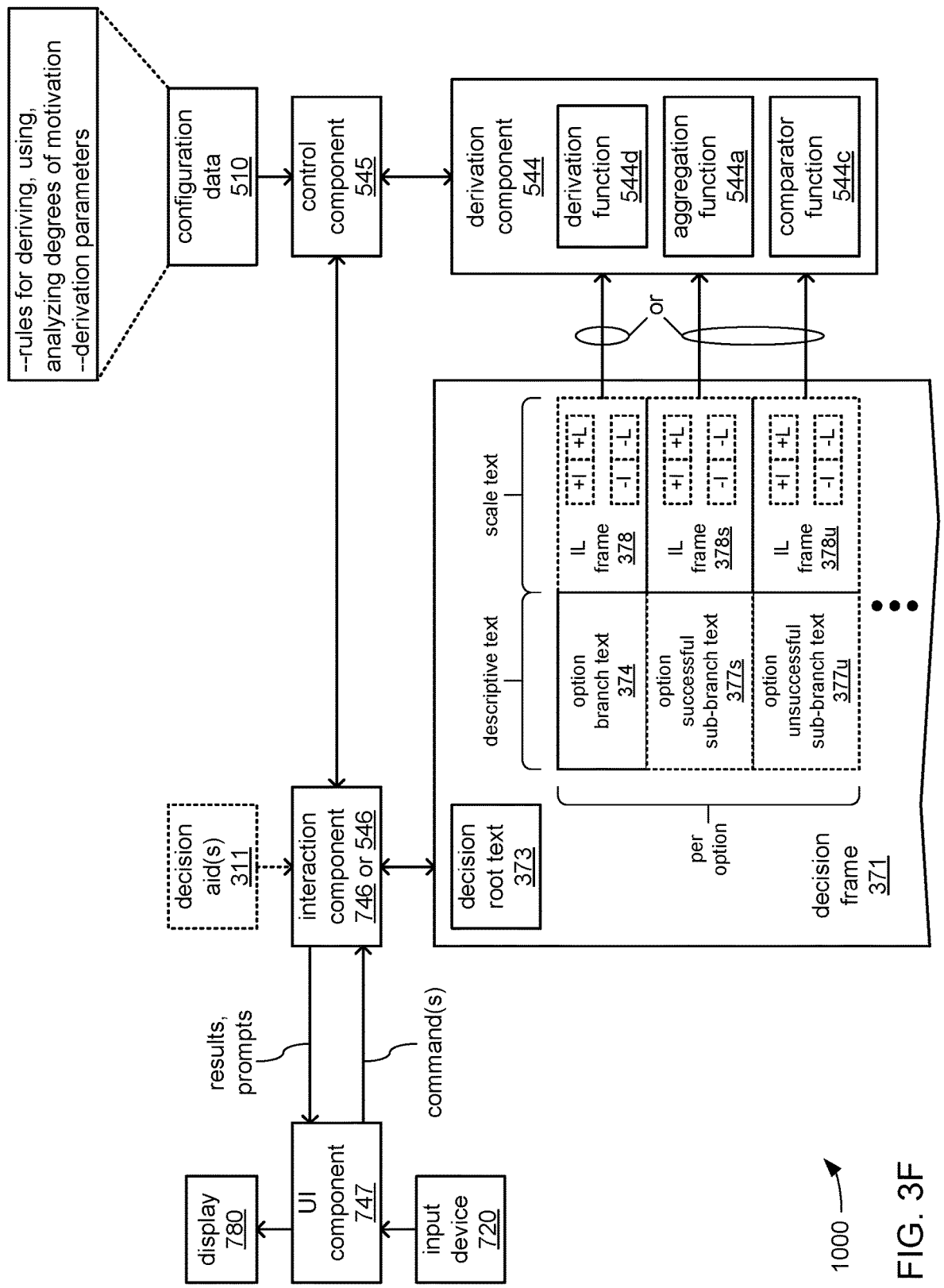

Turning to FIG. 3F, regardless of whether a decision maker has persistently stored and/or shared the decision frame 371 of a current decision with others, and regardless of whether the decision maker completes the entry/editing of descriptive texts and/or completes the selection of scale texts indicative of intensity and likelihood in a single session or across multiple sessions of interacting with the system 1000, the decision maker may use the user interface to provide a command to the system 1000 to use their inputs to at least derive degrees of motivation for one or more of the options, if not also use the derived degrees of motivation to identify a best option. Further execution of the control component 545 may cause execution of the derivation component 544 by the processor(s) 550 or 750 in response to such a command. More specifically, and as depicted, the derivation component may incorporate executable instructions for the performance of a derivation function 544d to generate degrees of motivation from degrees of intensity and likelihood, an aggregation function 544a to integrate multiple degrees of motivation associated with a single option, and/or a comparator function 544c to compare degrees of motivation associated with the multiple options to identify a best option.

Figure 3G:
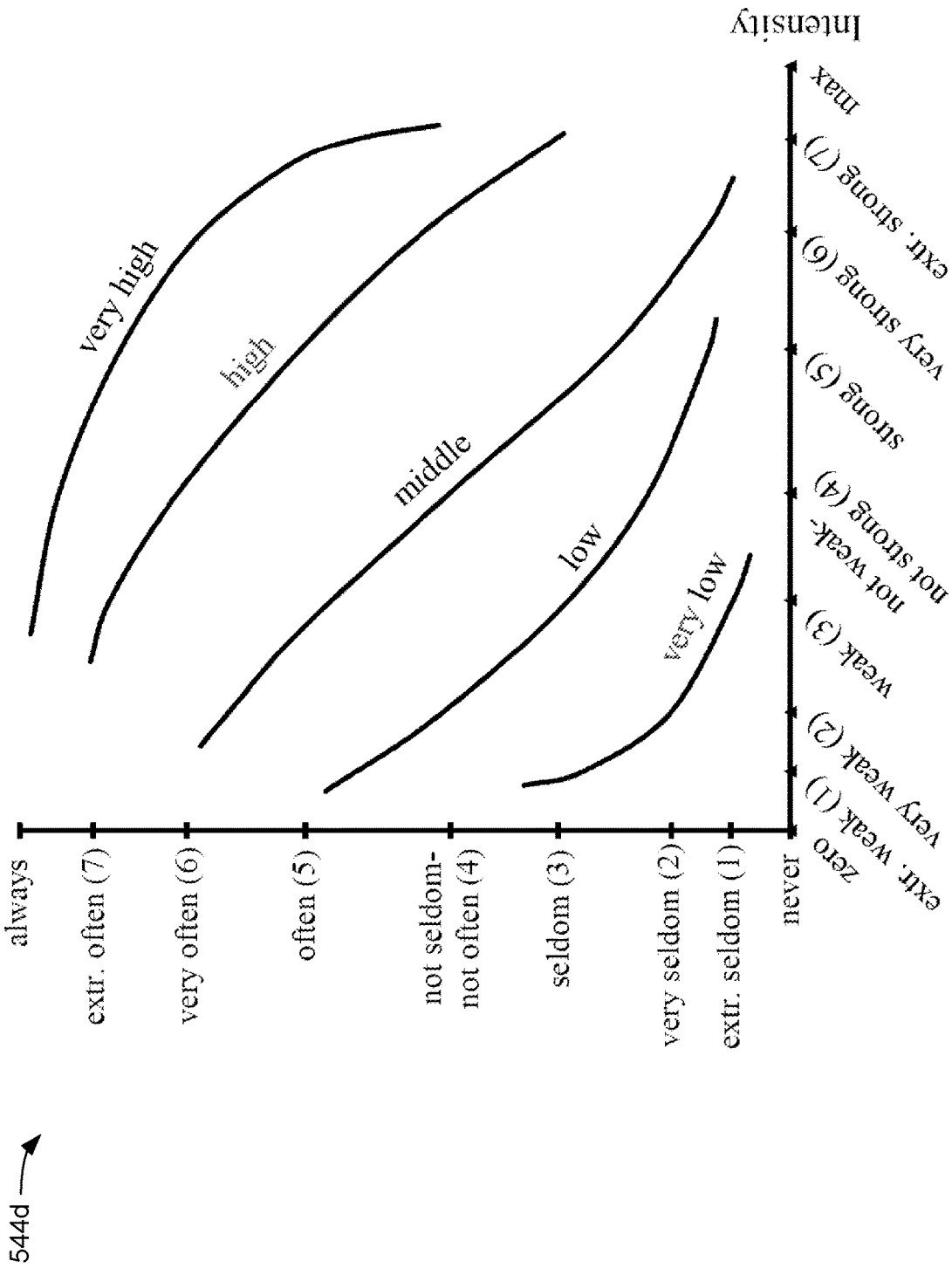
Figure 3H:
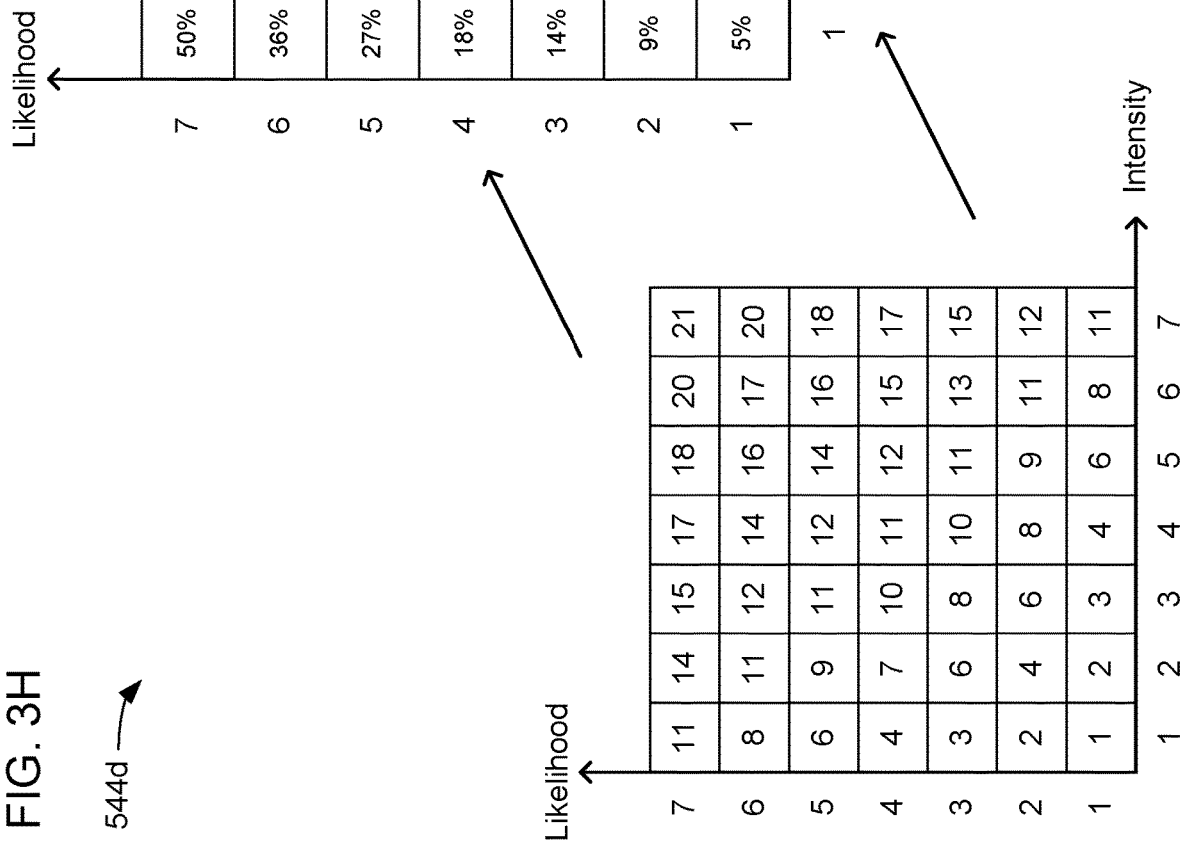
Figure 31:
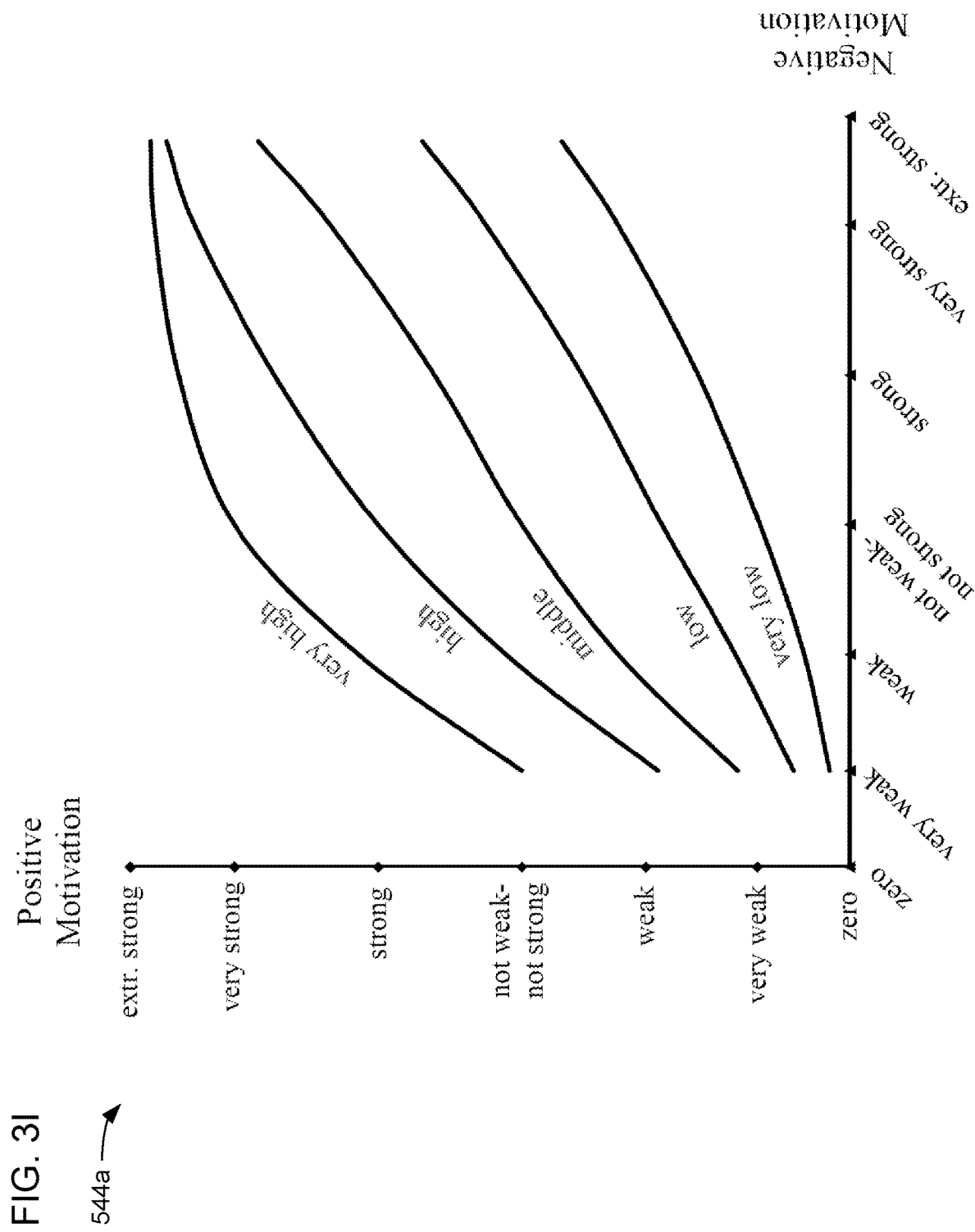

FIGS. 3G-H, together, depict various aspects of the derivation function 544d. Through a series of experiments conducted over many years by Mikhail Kotik (the father of the inventor, Alexander Yemelyanov, of the present application) with individuals involved in making decisions across a wide variety of industries, a number of insights were gained into the manner in which the human brain makes decisions. At first, such experiments were conducted in a manner focusing on the potential negative outcomes of decisions in industries where those outcomes could easily include injury or death (e.g., pilots, police officers, construction workers, etc.). Later experiments were conducted to also include potential positive outcomes in industries and other areas where there was more of a balance in potential positive and negative outcomes of decisions. The insights gained from such experiments include the identification of what questions to ask and how to ask those questions to elicit the information needed to further develop an understanding of the manner in which the human brain considers aspects of a choice from among multiple options as part of making a decision.

Among the questions that were found to be the most useful to ask were questions concerning degrees of intensity and likelihood. Intensity refers to the intensity with which a decision maker seeks to achieve a particular positive outcome, or the intensity with which a decision maker seeks to avoid a particular negative outcome. Regarding a positive outcome, likelihood refers to the perception that a decision maker has of how likely it is that the positive outcome can be achieved, taking into account difficulties that may need to be overcome vs. the ability and/or willingness of the decision maker to make an effort to overcome those obstacles. Regarding a negative outcome, likelihood refers to the perception that a decision maker has of how likely it is that the negative outcome can be avoided, taking into account obstacles that may need to be overcome vs. the ability and/or willingness of the decision maker to make an effort to overcome those obstacles.

Regarding how to ask such questions, Kotik determined that asking for a numeric characterization (e.g., asking that a number on a scale of 1 to 10 be specified) of either intensity or likelihood did not yield answers that proved to be as accurate or consistent as asking that a degree be specified by selecting scale text from among a selection of scale texts that, together, define a scale of degrees of intensity or a scale of degrees of likelihood without the use of numbers. By way of example, and as depicted, a degree of intensity may be specified by selecting from among pieces of text such as: "extremely weak", "very weak", "weak", "not weak—not strong", "strong", "very strong" and "extremely strong". More specifically, from such experimentation, it was discovered that, when a decision maker was required to specify such a degree by selecting scale text from a selection of scale texts, there was a stronger tendency toward achieving better scaling.

Extrapolating from other studies about which portions of the brain tend to be used in thinking about a subject expressed in different ways (e.g., with a picture vs. words vs. numbers), it appears that different portions of the brain are engaged when an aspect of a subject is to be expressed using words vs. using numbers. Advantageously, the requirement to express a degree of something with words, instead of with numbers, generally resulted in more consistent expressions of degree referenced to a scale. In particular, a form of cross-contamination seems to be triggered by the use of numbers in which there is a tendency to attribute a unit of measure to the numbers (e.g., a measure of an amount of money, weight, distance, time, etc.) that would disrupt the ability to conceive of degrees of intensity or likelihood as being referenced to a given numeric scale such that the resulting answers concerning degrees of intensity or likelihood would be effectively contaminated by the external influence of a unit of measure. Stated differently, eliciting indications of degrees of intensity or likelihood from decision makers using a scale expressed with numbers tended to result in the brain slipping into a form of "counting mode" that invited such contamination of thought, instead of leading the brain into a form of "measuring mode" that proved significantly less susceptible to such contamination. In effect, the use of words encouraged the brains of decision makers to reliably engage in measuring within the scale that was provided to them, and to avoid slipping into counting in a manner that ignored any given scale.

From analyzing the results of his experiments to identify correlations, Kotik determined that there was a reliably repeatable relationship among degrees of intensity, likelihood and motivation that could be graphically plotted, as shown in FIG. 3G. Each of the depicted non-linear gradations (i.e., each of the depicted curving lines) of "very high", "high", "middle", "low" and "very low" describes a degree of motivation. Motivation refers to the motivation of a decision maker to make the effort to do what must be done to overcome obstacles to achieve a particular positive outcome, or the motivation of a decision maker to make the effort to do what must be done to overcome obstacles to avoid a particular negative outcome. From analyzing the results of his experiments, Kotik also determined that the same relationship among degrees of intensity, likelihood and motivation applies regardless of whether the outcome is a positive outcome or a negative outcome, and regardless of whether physical, social or material nature of the positive outcome or the negative outcome, such that the graphical plot of this relationship shown in FIG. 3G applies to either positive or negative outcomes.

As is also shown in FIG. 3G, although asking decision makers to specify either a degree of intensity or a degree of likelihood using numbers referenced to a numeric scale proved problematic, as described just above, the selections of words that the decision makers were required to use (i.e., the selections of scale texts presented in menus) are able to be subsequently correlated to numeric values on corresponding numeric scales (e.g., the depicted ranges of numeric values 1-7 correlated, as shown, to the scale texts along the horizontal and vertical axes). In this way, the degrees of intensity and likelihood expressed by decision makers through the selections of scale texts from menus are able to be used as inputs to derive degrees of motivation.

Beyond revealing a reliable relationship among degrees of intensity, likelihood and motivation, the increased reliability and consistency of results achieved through such use of words (i.e., scale texts) to express degrees of intensity and likelihood also enable an understanding of the manner in which perception of information on the part of a decision maker influences the degrees of intensity and likelihood. While information concerning subject(s) associated with a decision is clearly an input to decision making, it has been found that it is actually the perception of that information on the part of the decision maker that is the actual input, and not the information in its pure form. The perception of information on the part of a decision maker is necessarily influenced by the values of the decision maker, and by the past experiences of a decision maker, since it is the values and past experiences of the decision maker that dictate how a decision maker reacts to any piece of information (e.g., whether a piece of information describes something good or bad, and to what degree of goodness and badness). Thus, the perception of information of a decision maker may weave together internal information of the decision maker (e.g., past experiences) and new information provided to the decision maker from an external source (e.g., current circumstances in which a decision is to be made).

Thus, a degree of intensity ascribed by a decision maker to an outcome of an option is necessarily driven by the decision maker's perception of information associated with how an option could lead to that outcome. Correspondingly, a degree of likelihood in achieving or avoiding that outcome is necessarily driven by the decision maker's perception of the obstacles to be overcome in doing so vs. the ability/willingness of the decision maker to do what must be done to achieve or avoid that outcome. The perception that a decision maker has of various obstacles is necessarily influenced, at least in part, by their past experiences, including past experiences in overcoming obstacles.

It is in this way that asking a decision maker to express degrees of intensity and likelihood actually elicit indications of both the instrumental and value rationality of the decision maker that enable degrees of motivation to be derived. The indications of degrees of intensity and likelihood that the decision maker is asked to provide are products of combinations of new external knowledge (e.g., current events), earlier learned internal knowledge (e.g., past experiences), and value judgments based on the values of the decision maker.

The fact that being asked to specify a degree of intensity leads to consideration of how a possible outcome is perceived, and the fact that being asked to specify a degree of likelihood in achieving or avoiding that outcome leads to consideration of what the decision maker is able and/or willing to do to achieve or avoid that outcome, also serves to trigger a form of what is sometimes referred to as "self regulation." More precisely, by being asked to specify a degree of intensity, a decision maker is caused to evaluate how desirable or undesirable an outcome is according to their values. And then, by being asked to specify a degree of likelihood in achieving or avoiding that outcome, the decision maker is caused to consider whether the outcome can be achieved or avoided, what would be required to do so, and whether they are willing to do what must be done (if anything can be done) to so achieve or avoid that outcome, thereby being caused to consider, in multiple ways, what is realistically possible given their own abilities, in addition to what is more broadly possible based on other circumstances not under their control.

FIG. 3H depicts an approach to implementing the relationship among degrees of intensity, likelihood and motivation within the system 1000 in a simpler, two-dimensional tabular form that may be more efficiently utilized by the processor(s) 550 or 750. Initially, the 1-7 scales for degrees of intensity and likelihood are plotted along the axes, and then numeric values in a range of 1-21 are used to fill the resulting 7×7 table in a manner that functionally re-creates this relationship within the table. As also depicted in FIG. 3H, division of all 49 of the numeric values within the 7×7 table may then be used to derive a proportionate set of percentage values within the 7×7 table. As will be explained in greater detail, such proportionate percentage values arranged in such a table may then be used to implement the derivation function 544*d* within the system 1000.

Referring back to FIGS. 3G and 3H, as depicted, the correlations of numeric values to scale texts for both intensity and likelihood do not include correlations for an intensity or likelihood of "never" or "zero", respectively, or for "always" or "max", respectively. This may correspond to a lack of inclusion of such scale texts to a decision maker as options to choose in specifying intensity or likelihood. As will be explained further, part of the purpose in eliciting input from a decision maker that is descriptive of degrees of both positive and negative intensity and likelihood is to more methodically guide the decision maker through considering both positive and negative aspects of an outcome, or of a pair of possible successful and unsuccessful outcomes. Thus, if the option of specifying a degree of intensity of "zero" or a likelihood of "never" were made available to be selected by a decision maker, such a selection would provide a way by which the decision maker could choose to effectively "opt out" of considering a degree of intensity or likelihood. By not providing such options to a decision maker, the decision maker is forced to grapple each option or each outcome of each option having both positive and negative aspects that need to be considered.

Figure 3J:
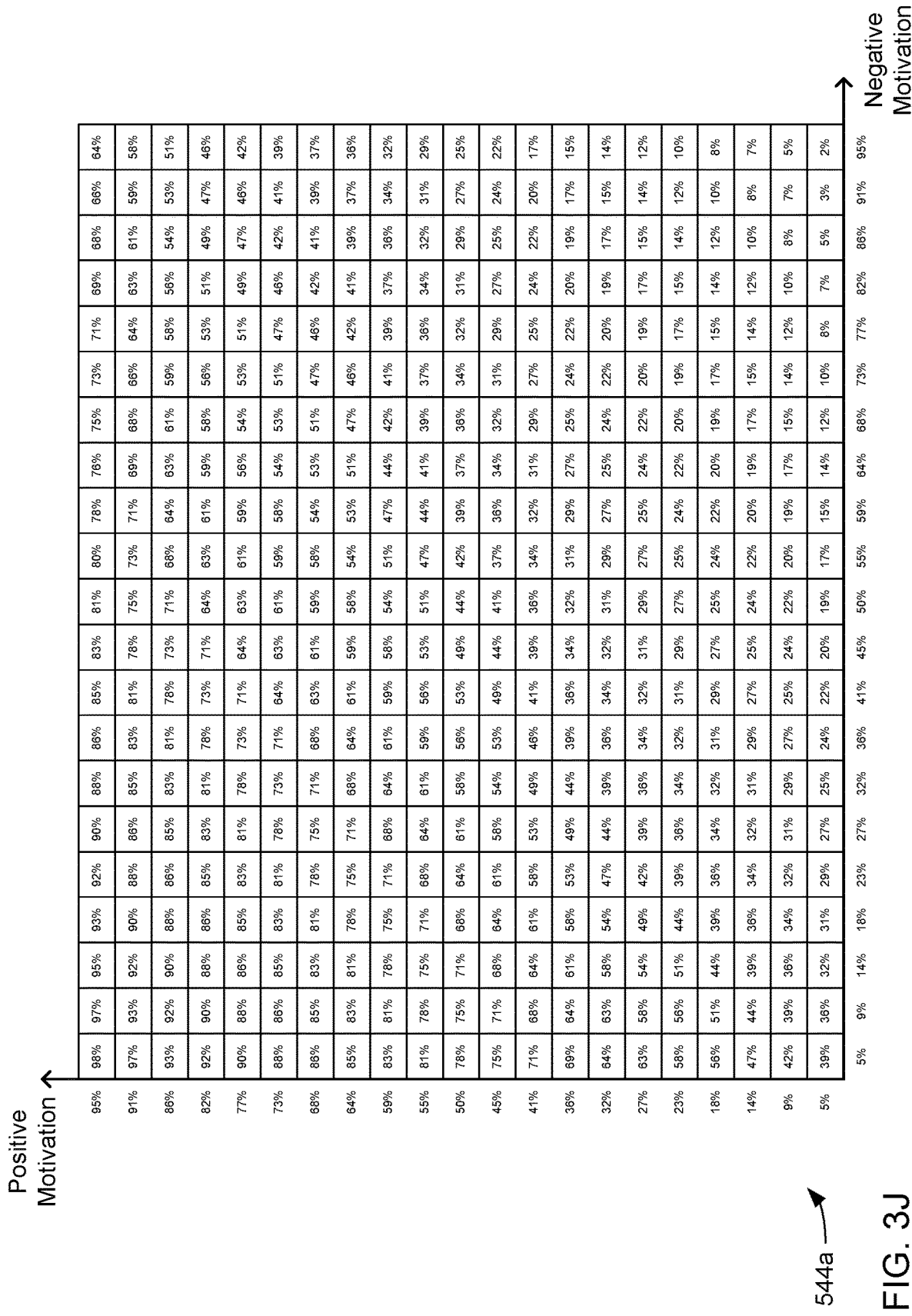

FIGS. 3I-J, together, depict various aspects of the aggregation function 544*a*. Through further experimentation beyond the aforedescribed experiments originally conducted by Mikhail Kotik, a relationship among degrees of positive motivation associated with a possible positive outcome of an option of a decision, negative motivation associated with a possible negative outcome of the same option, and an overall integrated motivation was derived. FIG. 3I provides a graphical plot of this relationship among degrees of motivation for an option, where each of the depicted non-linear gradations of "very high", "high", "middle", "low" and "very low" describes a degree of the integrated motivation for an option. FIG. 3J depicts an embodiment of a 21×21 table derived from such a graphical plot of a relationship among degrees of motivation (e.g., the graphical plot of FIG. 3I) in a manner similar to the derivation of the 7×7 tables of FIG. 3H from the graphical plot of FIG. 3G. Like the 7×7 tables of FIG. 3H, the 21×21 table of FIG. 3J may be more efficiently utilized by the processor(s) 550 or 750. Thus, and as will shortly be explained, such a 21×21 table as is depicted in FIG. 3H may be used to implement the aggregation function 544*a* with the system 1000.

Figure 3K:
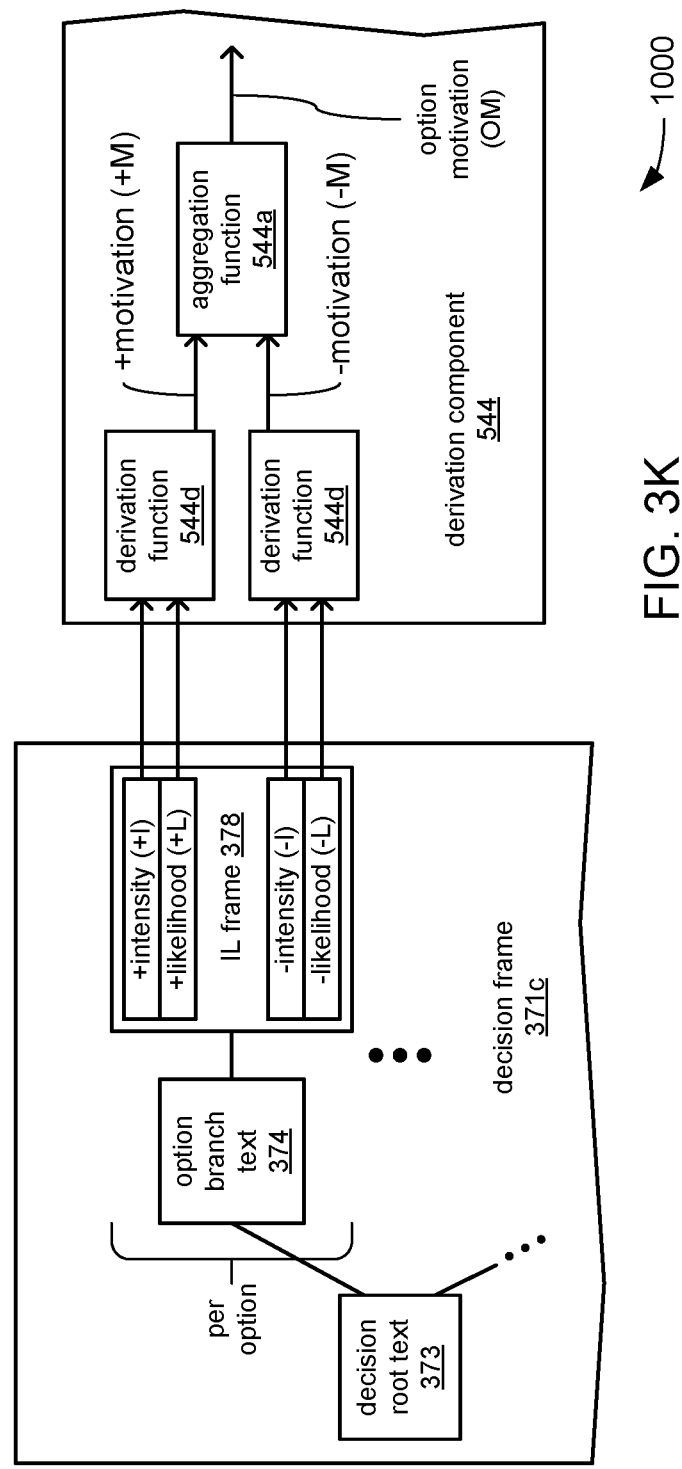

FIG. 3K depicts various aspects of an example of using the derivation function 544*d* and the aggregation function 544*a* in combination to derive an overall degree of motivation for one option being considered in a current decision based on indications of degrees of intensity and likelihood associated by a decision maker with that option. As depicted, the indications of degrees of intensity and likelihood are stored in a decision frame 371*c*, which as discussed in reference to FIG. 2A, may be a version of decision frame 371 associated with operation of the system 1000 in the compact mode. As a result, the decision maker may have been prompted to provide a single set of indications of degrees of positive intensity and likelihood, and of degrees of negative intensity and likelihood. Indications of the selections of scale text made by the decision maker to provide these four inputs may then be stored as the depicted single IL frame 378 for the option.

As previously discussed in reference to FIGS. 3D and 3G, a decision maker may be guided through providing each indication of a degree of intensity by being prompted to select a scale text from among a selection of scale texts that each specify a different degree of intensity, and that together, define a range of degrees of intensity. Thus, in being guided through providing an indication of degree of intensity, a decision maker may be prompted to select one of the scale texts indicating a degree of intensity from a menu of scale texts that may include: "extremely weak", "very weak", "weak", "not weak—not strong", "strong", "very strong" and "extremely strong" (as earlier depicted in FIG. 3G).

Similarly, the decision maker may be guided through providing each indication of a degree of likelihood by being prompted to select a scale text from among another selection of scale texts that each specify a different degree of likelihood, and that together, define a range of degrees of likelihood. Thus, in being guided through providing an indication of a degree of likelihood, a decision maker may be prompted to select a textual one of the scale texts indicating a degree of likelihood from a menu of scale texts that may include: "extremely seldom", "very seldom", "seldom", "not seldom—no often", "often", "very often" and "extremely often" (as also earlier depicted in FIG. 3G).

As previously discussed in reference to FIG. 3G, the fact of the use of selections of scale texts in the input of degrees of intensity and likelihood to the system 1000 may necessitate first correlating each such selection of a scale text to a corresponding numeric indication of degree. Again, in some embodiments, such correlations may be implemented as shown in FIG. 3G in which each of the available selections of scale text is correlated to a numeric value on a numeric scale of 1 to 7. As those skilled in the art will readily recognize, at least in part due to this approach of obtaining numeric indications of degree of likelihood (as well as degree of intensity) from a decision maker, the numeric values for likelihood to which the selected scale texts are correlated are non-probabilistic in nature.

With such correlations made, the numeric indications of degrees of positive intensity (+I) and positive likelihood (+L) from the single IL frame 378 may then be provided as inputs to one instance of the derivation function 544d to derive a degree of positive motivation (+M) for the option. Similarly, the numeric indications of degrees of negative intensity (−I) and negative likelihood (−L) may then be provided as inputs to another instance of the derivation function 544d to derive a degree of negative motivation (−M) for the option. As previously discussed in reference to FIG. 3H, the derivation function 544d may be implemented with a table not unlike the one depicted in FIG. 3H in which the degree of motivation that is derived therefrom is expressed as a percentage.

With the degrees of positive motivation (+M) and negative motivation (−M) so derived for the depicted option, both of these degrees of motivation may be provided as inputs to an instance of the aggregation function 544a to derive an overall degree of motivation for the option (OM). As previously discussed in reference to FIG. 3J, the aggregation function 544a may be implemented with a table not unlike the one depicted in FIG. 3J. In such embodiments, the percent value expressions for degree of positive motivation (+M) and for degree of negative motivation (−M) generated by the two depicted instances of the derivation function 544d may be plotted along corresponding ones of the axes for positive and negative motivation to arrive at an aggregate degree of motivation for the option (OM) that may also be expressed as a percentage.

Continuing with FIG. 3K, it should be noted that further experimentation has shown that requiring a decision maker to provide indications of degrees of both positive and negative intensity, and to provide indications of degrees of both positive and negative likelihoods causes a decision maker to more fully and consistently consider both positive and negative aspects of an option. Stated differently, imposing such a requirement results in the decision maker being caused to give separate consideration to both of the positive and negative aspects, so that consideration of one does not overshadow and/or prevent consideration of the other. The eliciting of these separate degrees of intensity and likelihood also enables their relative strengths to be taken into account through there separate treatment and use in deriving the degree of overall motivation (OM) for the option.

Figure 3L:
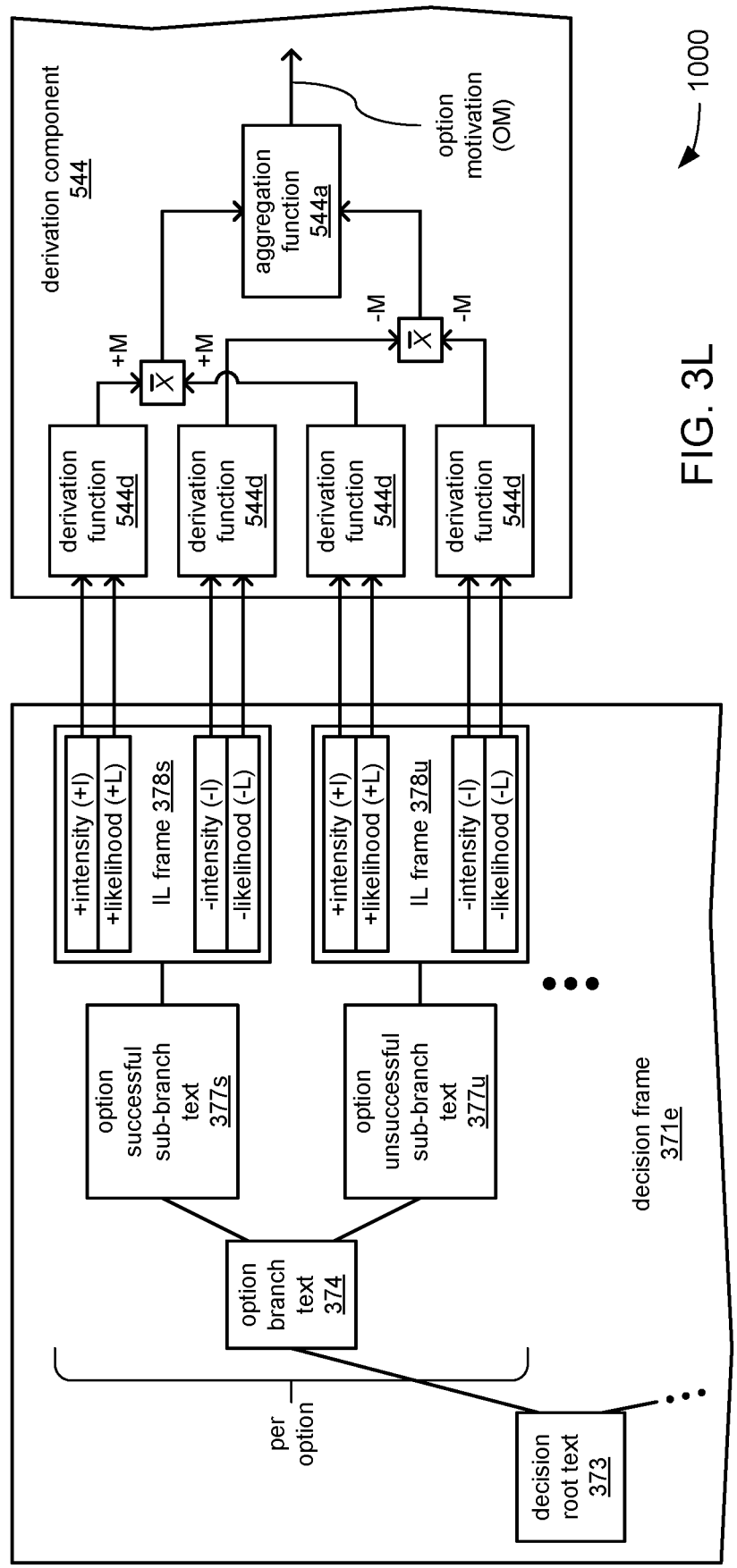

FIG. 3L depicts various aspects of another example of using the derivation function 544d and the aggregation function 544a in combination to derive an overall degree of motivation for one option being considered in a current decision based on indications of degrees of intensity and likelihood associated by a decision maker with that option. As depicted, the indications of degrees of intensity and likelihood are stored in a decision frame 371e, which as discussed in reference to FIG. 2B, may be a version of decision frame 371 associated with operation of the system 1000 in the expanded mode. As a result, the decision maker may have been prompted to provide two separate sets of indications of degrees of positive intensity and likelihood, and of degrees of negative intensity and likelihood, with one set associated with a possible successful outcome of the option and the other set associated with a possible unsuccessful outcome of the option. Each of these two sets of indications of degrees may then be stored in a separate IL frame, specifically an IL frame 378s associated with the possible successful outcome, and an IL frame 378u associated with the possible unsuccessful outcome.

Again, a decision maker may be guided through providing each indication of a degree of intensity by being prompted to select a scale text from among a selection of scale texts that each specify a different degree of intensity, and that together, define a range of degrees of intensity. Similarly, the decision maker may be guided through providing each indication of a degree of likelihood by being prompted to select a scale text from among another selection of scale texts that each specify a different degree of likelihood, and that together, define a range of degrees of likelihood. Also again, the fact of the use of selections of scale texts in the input of degrees of intensity and likelihood to the system 1000 may necessitate first correlating each such selection of a scale text to a corresponding numeric indication of degree.

With such correlations made, such numeric indications of positive intensity (+I) and positive likelihood (+L) from the IL frame 378s for the possible successful outcome may then be provided as inputs to a first instance of the derivation function 544d to derive a degree of positive motivation (+M) for the possible successful outcome. Similarly, such numeric indications of negative intensity (−I) and negative likelihood (−L) from the IL frame 378s for the possible successful outcome may then be provided as inputs to a second instance of the derivation function 544d to derive a degree of negative motivation (−M) for the possible successful outcome. Also similarly, such numeric indications of positive intensity (+I) and positive likelihood (+L) from the IL frame 378u for the possible unsuccessful outcome may then be provided as inputs to a third instance of the derivation function 544d to derive a degree of positive motivation (+M) for the possible unsuccessful outcome. And also similarly, such numeric indications of negative intensity (−I) and negative likelihood (−L) from the IL frame 378u for the possible unsuccessful outcome may then be provided as inputs to a fourth instance of the derivation function 544d to derive a degree of negative motivation (−M) for the possible unsuccessful outcome. Again, each of these instances of the derivation function 544*d* may be implemented with a table not unlike the one depicted in FIG. 3H in which the degree of motivation that is derived therefrom is expressed as a percentage.

With the degrees of positive motivation (+M) so derived for both of the possible successful and unsuccessful outcomes, these two degrees of positive motivation may be averaged together. Similarly, with the degrees of negative motivation (−M) derived for both of the possible successful and unsuccessful outcomes, these two degrees of negative motivation may also be averaged together. The two resulting averaged degrees of motivation, one positive and one negative, may then be provided as inputs to a single instance of the aggregation function 544*a* to derive an overall degree of motivation for the option (OM). Again, the aggregation function 544*a* may be implemented with a table not unlike the one depicted in FIG. 3J to arrive at an aggregate degree of motivation for the option (OM) that may also be expressed as a percentage.

Looking back upon FIGS. 3K and 3L, as has been discussed, and as will be presented in greater detail in a more detailed example of use of the system 1000, a decision maker that has initially operated the system 1000 in the compact mode may be prompted to switch to operating the system in the expanded mode as part of eliciting more detailed input from the decision maker as part of causing further consideration of a current decision. As can be readily appreciated from a comparison of these two figures, such a transition from the compact mode to the expanded mode, causes the eliciting of more detailed input concerning intensities and likelihood associated with possible successful and unsuccessful outcomes for each option such that the number of IL frames 376 for each option is doubled. More specifically, and as depicted in FIG. 3L, still more input concerning degrees of intensity and likelihood is elicited from the decision maker for each of the possible successful outcome and the possible unsuccessful outcome for each option. In other words, the decision maker is guided through considering each of these two possible incomes separately to cause greater granularity of consideration for each, and accordingly, greater granularity in the input concerning each that is provided to the system 1000. Thus, in the expanded mode, the decision maker is caused to more fully consider both the positive and negative aspects of each of these two possible outcomes.

Also in looking back upon FIGS. 3K and 3L, it should be noted that the eliciting of either one set of a quantity of four pieces of information from a decision maker to fill a single IL frame 378, or two sets of a quantity of four pieces of information from a decision maker to file two IL frames 378*s* and 378*u*, may not represent accidental choices of how many pieces of information to request from a decision maker. As previously discussed, the short-term memory of a human brain typically has a capacity of four chunks of information. By requesting the provision of four pieces of information from a decision maker in considering either an option in the compact mode, or in separately considering each of two possible outcomes of an option in the expanded mode, advantage is being taken of the availability of storage space within the short-term memory for up to four chunks of information. More precisely, with the earlier-described repetitive presentation of descriptive texts to aid in relieving the short-term memory from being used to retain such information, the short-term memory is made more readily available for use in retaining other information associated with the current decision, including retaining up to four pieces of information concerning positive and negative degrees of intensity and likelihood corresponding to a single IL frame 378, 378*s* or 378*u*.

Also in looking back upon making such a transition from operation in the compact mode (as exemplified in FIG. 3K) and operation in the expanded mode (as exemplified in FIG. 3L), the depicted addition of sub-branches to a branch associated with a single option also illustrates a broader feature of the tree-like organization of information for a current decision in some embodiments of the system 1000. This broader feature may the provision of a feature in the user interface that allows a decision maker to manually add further sub-branching for each of one or more options as part of further decomposing aspects of the current decision to ever more granular parts to enable separate consideration to be given to each of those more granular parts. By way of example, instead of transitioning from the compact mode to the expanded mode, thereby causing the automated addition of sub-branches to each of the branches that are associated with a single option, it may be that the decision maker finds just one of the options to be in need of further consideration such that they view adding sub-branches thereto as useful in further decomposing that option to better enable such further consideration.

Also by way of example, it may be that a decision maker is already operating the system 1000 in the expanded mode such that there are already sub-branches for each option that lead to separate IL frames 378*s* and 378*u* to enable more granular consideration of each of the possible successful and unsuccessful outcomes, respectively, for each option. However, it may be that, for one of the options, one or both of the possible successful and unsuccessful outcomes is proving to be rather difficult to properly consider due to complexities of the advantages and/or disadvantages of each. To better enable still more thorough (i.e., granular) consideration of such outcomes, it may be that the decision maker employs a feature in the user interface that enables the addition of sub-sub-branching to the sub-branch of one or both of the possible outcomes to enable separate consideration each advantage and/or disadvantage associated with either or both of the possible outcomes.

To assist a decision maker in making the most effective use of the system 1000, the user interface may additionally include at least the optional presentation of explanatory texts (not to be confused with either of the descriptive texts or the scale texts) that serve to explain how best to understand the prompts to provide descriptive texts and/or the prompts to select scale texts indicative of degrees of intensity and likelihood. By way of example, for the expanded mode, explanatory texts may at least optionally be presented that explain the nature the relationships among a longer term goal, a shorter term goal and the current decision. As part of such explanatory texts for expanded mode, it may also be explained that the descriptive texts that describe each successful and unsuccessful outcome for each option should be associated with success and lack thereof in meeting the shorter term goal with which the current decision may be more closely associated, while in contrast, the scale texts indicating degrees of intensity and likelihood should be selected to specify degrees of intensity and likelihood, respectively, associated with success and lack thereof in meeting the longer term goal. Such explanatory text may make it clear that, in this way, both the longer term and shorter term goals are then considered for the current decision. This is based on insights into instrumental rationality of the inventor, Alexander Yemelyanov, into using instrumental rationality in decomposing a decision into smaller parts in a manner that leverages the shorter term goal and the longer term goal. More specifically, in the expanded mode, each option should be considered from the perspective of the shorter term goal, while the successful and unsuccessful outcomes of an option should be considered from the perspective of the longer term goal.

In some of such embodiments, at least some decision templates 331 may provide explanatory texts that may be at least optionally presented to provide explanations concerning the selecting of scale texts for degrees of intensity and/or likelihood that may be more specific to the particular type of decision that is being made. Where a decision template 331 is selected that provides such explanatory texts, it may be that such explanatory texts provided by the decision text 331 is automatically used in lieu of what may be more general explanatory texts that are otherwise normally presented by the system 1000 to explain making such selections.

Figure 3M:
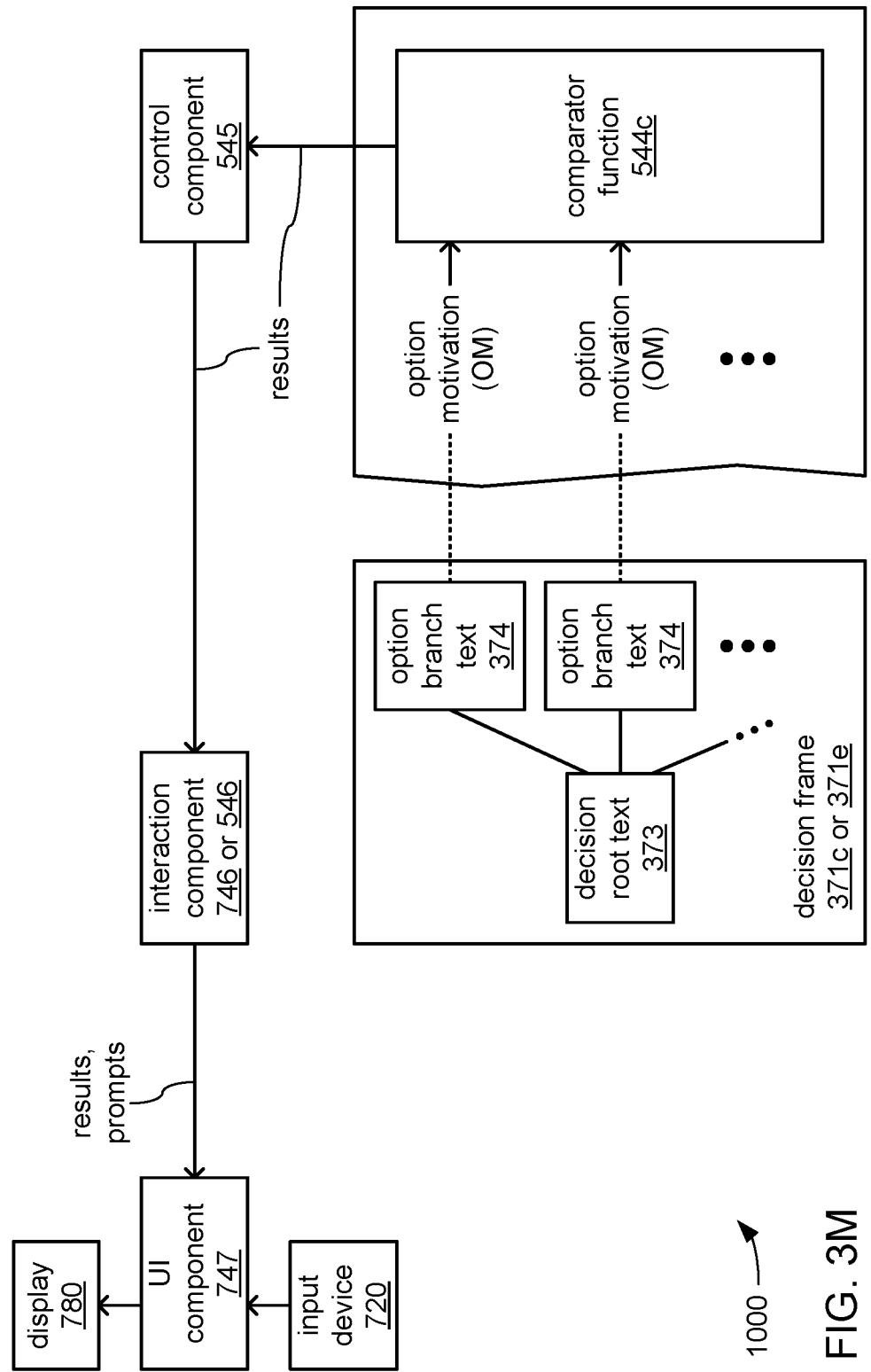

FIG. 3M depicts various aspects of using the overall degree of overall motivation (OM) derived for each option of a current decision to identify a best option from among multiple options of a current decision. As depicted, the comparator function 544c may accept the degree of overall motivation (OM) for each option as an input, and may simply compare these degrees of motivation to identify which option has the highest degree of overall motivation (OM), which may then be designated as the best option. As depicted, an indication of such a result may then be relayed to the interaction component 546 or 746, the execution of which may cause processor(s) 550 or 750, respectively, to generate a presentation of the results for being presented to a decision maker via the user interface provided by the operation of the display 780 and input device 720.

As previously discussed, in some embodiments, the decision maker may also be presented with an indication of the degree of overall motivation (OM) associated with the best option. As will shortly be explained, such an indication of degree of overall motivation (OM) may be accompanied by indications of the degrees of positive and negative motivation from which the degree of overall motivation (OM) was generated.

Alternatively or additionally, and as also previously discussed, the degrees of overall motivation (OM) for the multiple options of the current decision may be analyzed to determine whether the degree of overall motivation (OM) for the best option at least meets a threshold, and/or to determine whether the degree of overall motivation (OM) for the best option is higher than the degree of overall motivation (OM) for each of the other options by at least another threshold. Depending on the results of such analyses, the decision maker may also be presented with a prompt to further consider the current decision.

It should again be noted that, as an alternative to using the decision making augmentation system 1000 in making a current decision, the system 1000 may be used to review and evaluate a past decision that has already been made and acted upon. Again, by way of example, the system 1000 in a post-accident investigation to evaluate one or more decisions made by a crewmember of a jetliner, train, ship or other vehicle in response to an emergency situation that may have confronted that crewmember. In such a situation, there may have been no time or opportunity for any such crewmember to use any form of decision aid, etc., in making decisions concerning what action to take to address the emergency. However, after the emergency is over, it may be deemed valuable for purposes of an error analysis and investigation (and for determining error-provoking situations leading to recommendations) to use the system 1000 to evaluate each of the decisions made by such a crewmember to determine whether changes should be made to training procedures, normal operating procedures, the design of the jetliner, ship, train, etc.

It should also be noted that the system 1000 may be used in both the role of making a decision and in the role of reviewing that decision at a later time. By way of example, the system 1000 by a doctor and a patient in a cooperative manner to arrive at a decision concerning medical care to be provided by the doctor for the patient. As has been discussed, doing so may better enable a decision to be made that applies both instrumental rationality and value rationality based on the values of the patient. If, at a later time, a need should arise to evaluate the decision that was made (e.g., the filing of a medical malpractice suit against the doctor), the decision frame 371 in which at least the inputs of descriptive texts and selections of scale text associated with that decision are stored may be retrieved and reviewed to evaluate aspects of the manner in which that decision was made.

It should be understood that, in situations in which the system 1000 is used in reviewing/evaluating a past decision in whatever context, the operator of the system 1000 (i.e., the person who interacts with the processing device 700) may not be the decision maker who made that past decision. Instead, the operator of the system 1000 (again, the person who interacts with the processing device 700) may be a supervisor of the decision maker, an investigator of an incident with which the past decision is associated, or still another individual. Further, in such reviewing/evaluating of a past decision, it should then be understood that so-called "current decision" for which inputs are provided to the system 1000 may actually be a re-creation or "re-performance" of that past decision.

FIGS. 4A through 4L, together, depict aspects of an example use of the decision making augmentation functionality of the decision making augmentation system 1000 of either FIG. 1A or 1B in compact mode. FIGS. 5A through 5E, together, depict aspects of an example use of the decision making augmentation functionality of the decision making augmentation system 1000 of either FIG. 1A or 1B in expanded mode. Each of FIGS. 4A-L and 5A-E depicts an example of the visual portion of a user interface presented to a decision maker on the display 780 of the processing device 700 with which the decision maker interacts. Nearly all of these visual portions of the user interface include prompts to guide the decision maker through the provision of various inputs concerning a current decision, including the descriptive texts and scale texts, as has been discussed above.

Turning to FIG. 4A, as previously discussed in reference to FIG. 3B, in commencing the use of the system 1000 to assist in making a current decision, among the first prompts that may be presented to a decision maker on the display 780 of the processing device 700 may be a prompt to choose between operating the system 1000 in the compact mode or in the expanded mode. Also depicted is a prompt that may be presented in some embodiments to choose a decision template 331 for the current decision, as well as a prompt to specify the number of options to be considered in the current decision.

As previously discussed, in some embodiments, access to the depicted template database 330 in which numerous decision templates 331 may be stored may be restricted such that another prompt (not shown) may be presented on the display 780 that requests the provision of security credentials. As also previously discussed, the selection of a particular decision template 331 may dictate the number of options for the current decision.

As depicted, and regardless of whether a decision template 331 is chosen, the decision maker has selected the compact mode and a quantity of two options for the current decision.

Figure 4B:
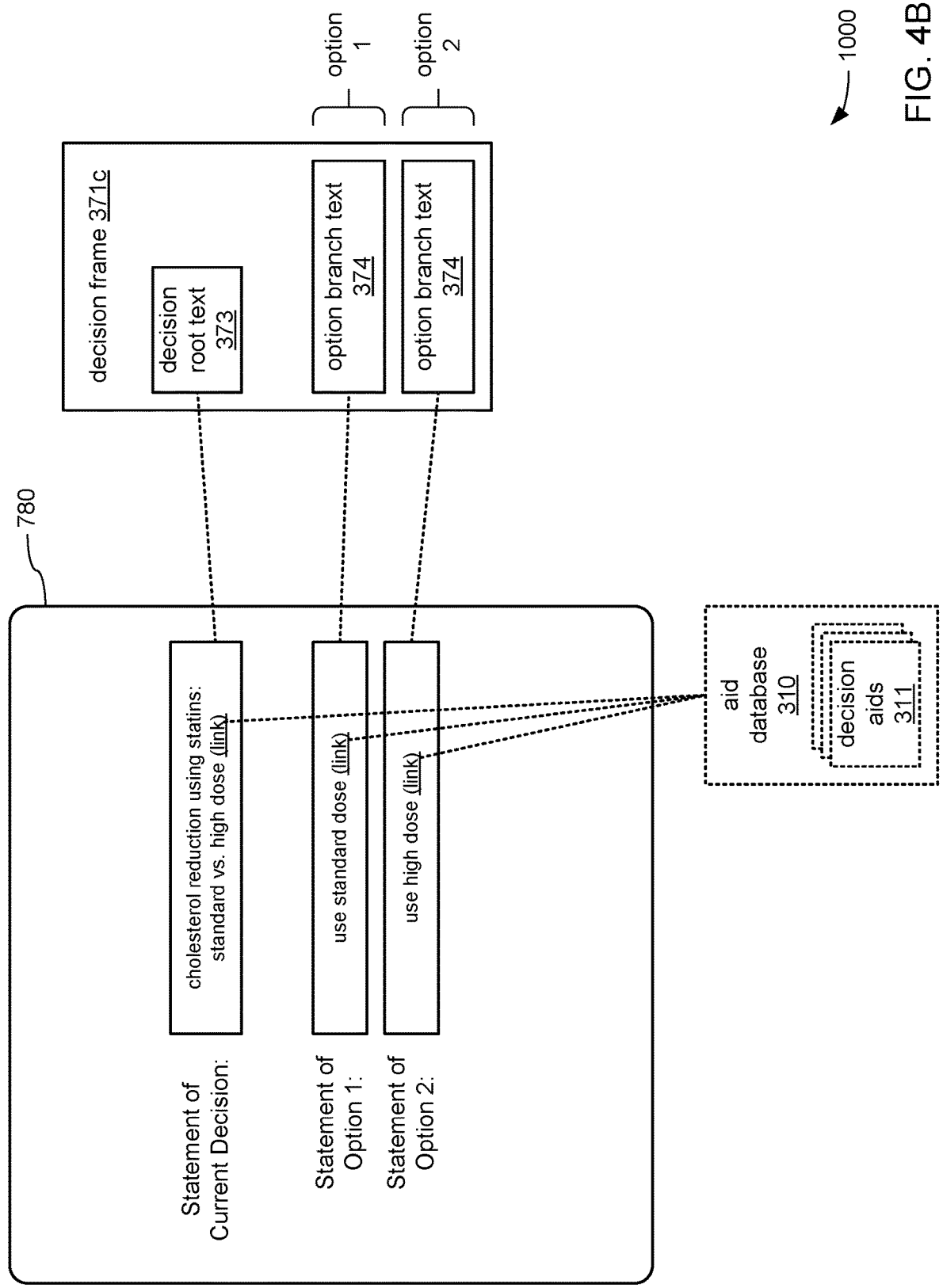

Turning to FIG. 4B, as previously discussed in reference to FIG. 3C, with the compact mode having been selected, a prompt is presented on the display 780 requesting entry of descriptive text that describes the current decision. Also, with the number of options having been set, more prompts are presented requesting entry of descriptive text that describes each option of the current decision. However, as previously discussed, if a decision template 331 was selected, then these depicted prompts may, instead, be prompts to edit default descriptive text provided by the selected decision template 331 that provides default descriptions of the current decision, and each of the options thereof.

Regardless of the exact origins of the descriptive text that describes the current decision and each of its options, as previously discussed, in some embodiments, one or more of such descriptive texts may include one or more references to decision aid(s) 311, such as the decision aids 311 stored within the depicted aid database 310. Again, it may be that descriptive texts for each option within a decision template 331 include such references as part of an approach to providing the decision maker with information concerning needed to better understand each option.

Figure 4C:
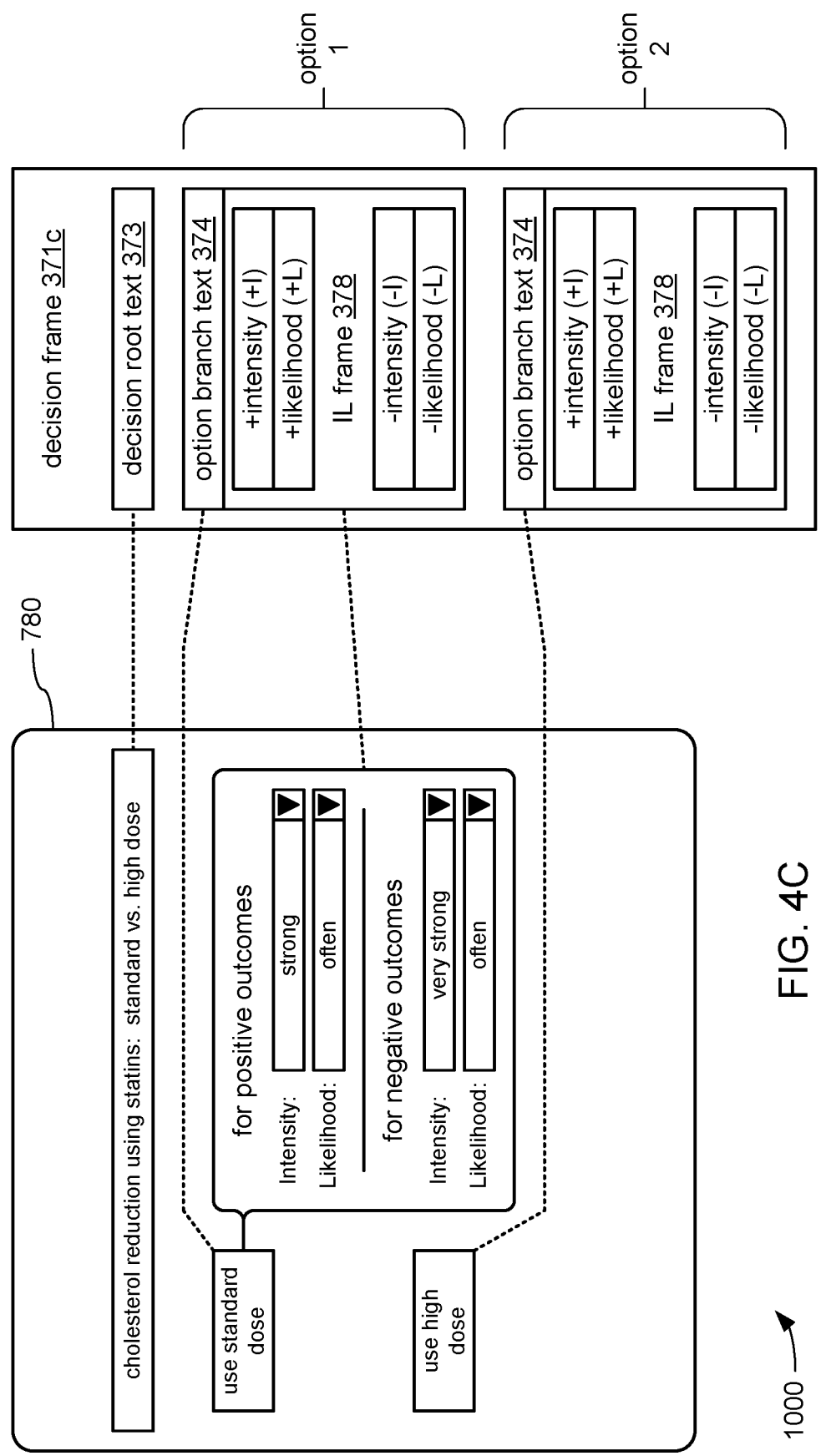

Turning to FIG. 4C, as previously discussed in reference to FIG. 3D, with the descriptive texts describing the current decision and each option having been provided by the decision maker, one or more of those descriptive texts may be repeatedly presented on the display 780 throughout the time the decision maker interacts with the system 1000. As previously discussed, this may be part of an approach to obviating the need to use the limited storage capacity of the short-term memory of the decision maker's brain to retain the content of these descriptive texts.

Also, with these descriptive texts having been provided by the decision maker, and now being repeatedly presented on the display 780, a prompt may also be presented on the display 780 that requests that the decision maker specify positive and negative degrees of intensity and likelihood for "Option 1" of the two options by selecting scale texts from each of multiple menus of selectable scale texts. As previously discussed, requiring the decision maker to specify a degree of intensity or outcome by selecting a scale text from a set of scale texts serves to avoid having the brain of the decision maker slipping out of measuring and into counting. As also previously discussed, the user interface may additionally provide at least the option of presenting explanatory text to provide an explanation to the decision maker of the meanings of each of these degrees of intensity and likelihood.

As depicted, the decision maker has selected the scale texts "strong", "often", "very strong" and "often" for degrees of positive intensity, positive likelihood, negative intensity and negative likelihood, respectively. Indications of these selections of scale text may then be stored within a single IL frame 378 allocated for "Option 1."

Figure 4D:
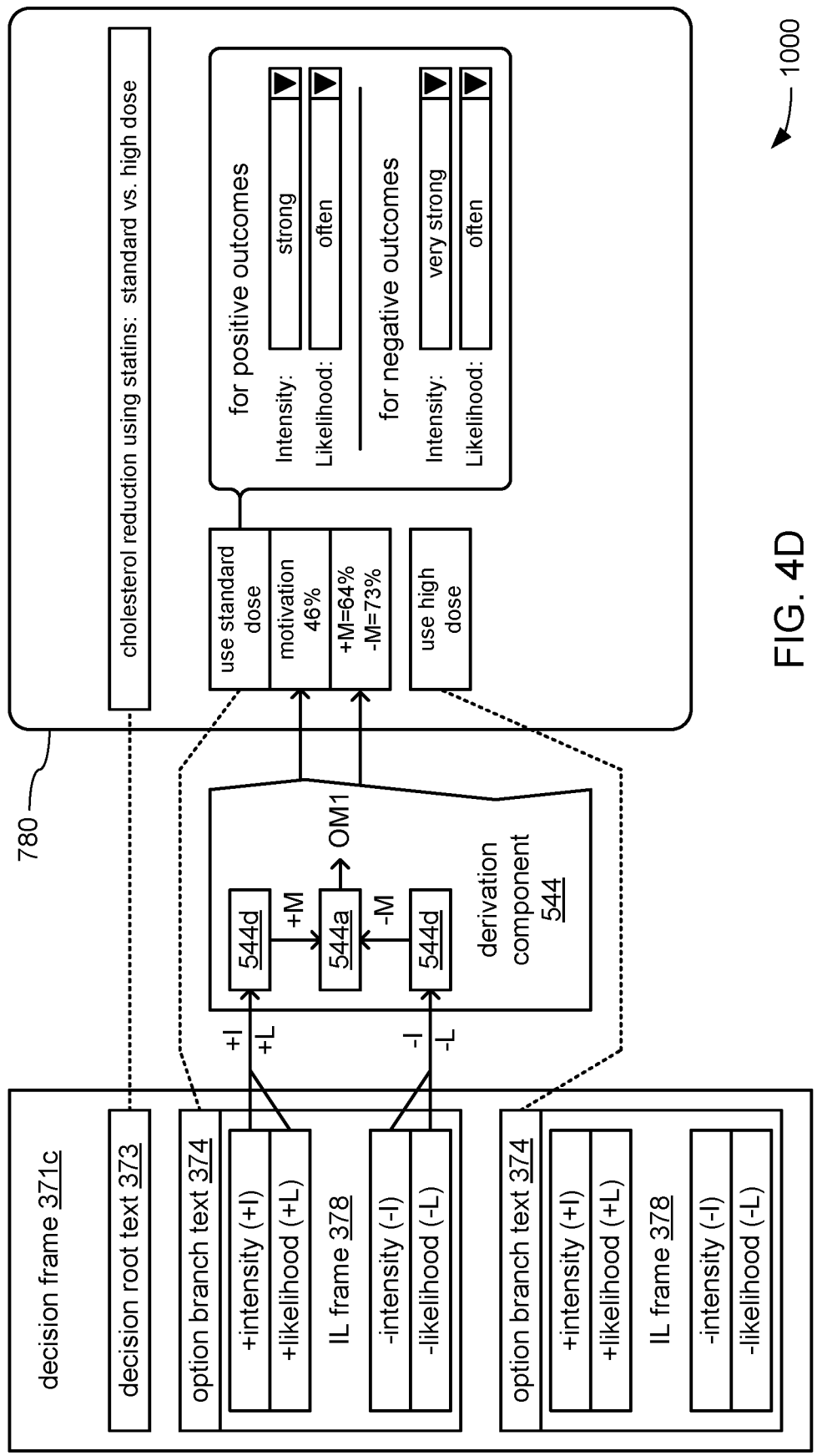

Turning to FIG. 4D, as previously discussed in reference to FIGS. 3F through 3K, with indications of scale texts selected for "Option 1" having been stored within the single IL frame 378 allocated for "Option 1", those indications of such selections may first be correlated to numeric values. Then, the ones of those numeric values indicative of degrees of positive intensity (+I) and positive likelihood (+L) may be provided as inputs to a first instance of the derivation function 544*d* to derive a degree of positive motivation (+M) for the option, and the ones of those numeric values indicative of degrees of negative intensity (−I) and negative likelihood (−L) may be provided as inputs to a second instance of the derivation function 544*d* to derive a degree of negative motivation (−M) for the option. The resulting degrees of positive motivation (+M) and negative motivation (−M) may then the be provided as inputs to an instance of the aggregation function 544*a* to derive the degree of overall motivation (OM) for the option.

With the degrees of overall motivation (OM), positive motivation (+M) and negative motivation (−M) having been derived for "Option 1", these degrees of motivation for this option may be presented on the display 780. As depicted, the degree of overall motivation (OM) for "Option 1" is 46%. As also depicted, the same descriptive texts as presented on the display 780 in FIG. 4C, continue to be presented on the display 780 in FIG. 4D.

Figure 4E:
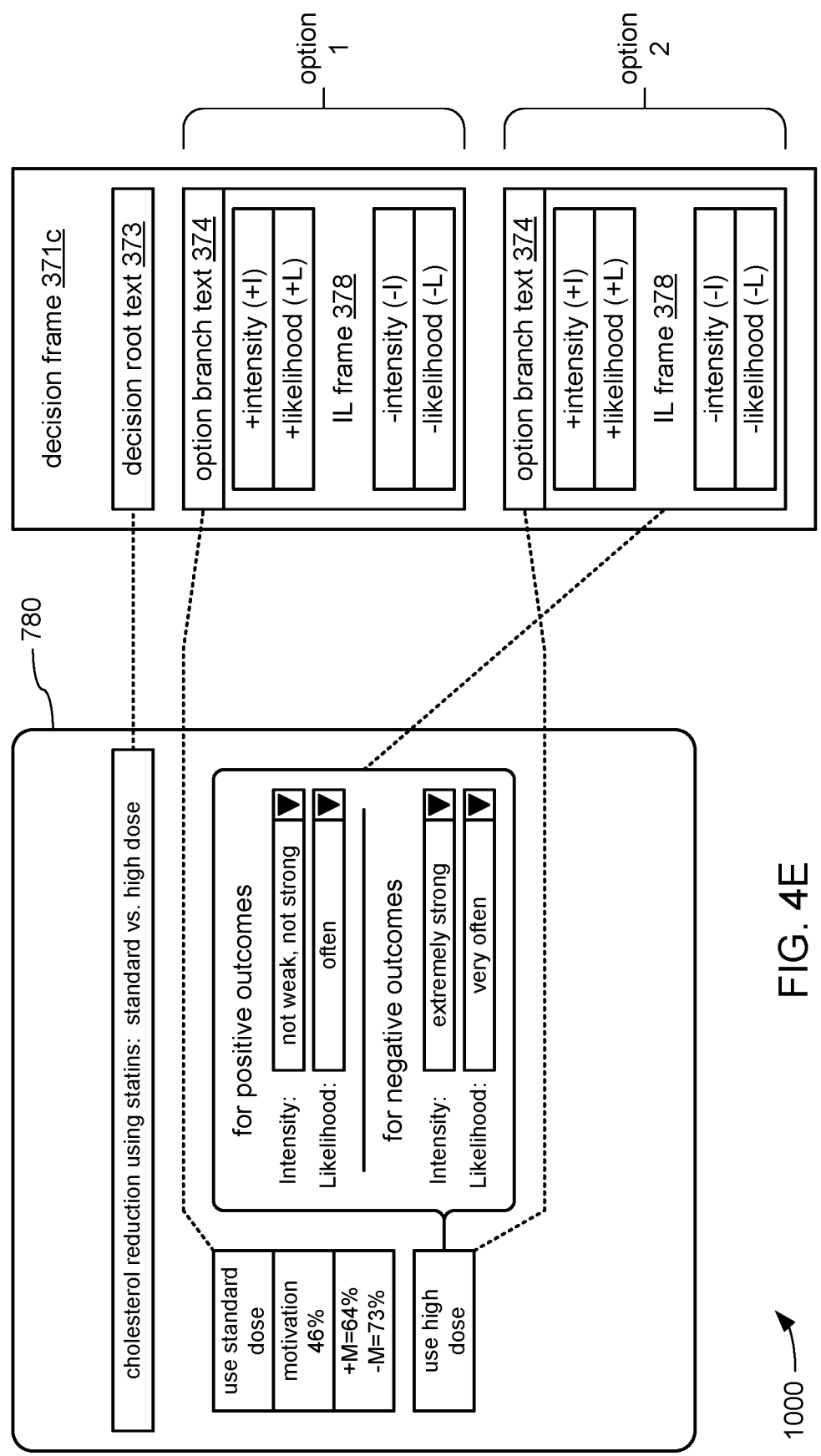
Figure 4F:
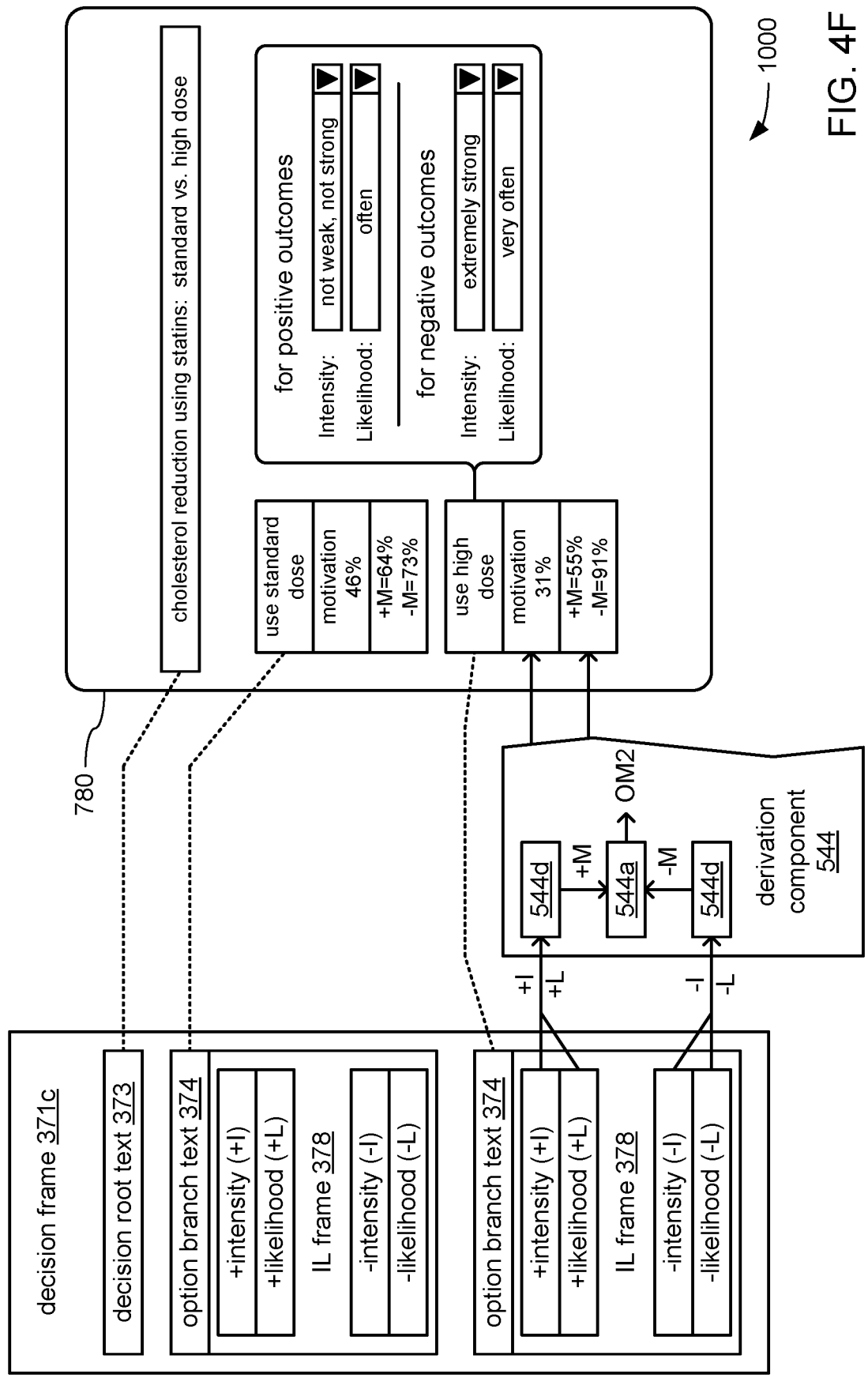

Turning to FIGS. 4E-F, in a manner very similar to what was just discussed in reference to FIGS. 4C-D, the decision maker may be prompted to provide degrees of positive and negative intensities and likelihood for "Option 2" through the selection of scale texts; degrees of positive, negative and overall motivation may be derived therefrom; and those degrees of motivation may also be presented on the display 780.

With the degrees of overall motivation (OM), positive motivation (+M) and negative motivation (−M) having been derived for "Option 2", these degrees of motivation for this option may be presented on the display 780, alongside those for "Option 1." As depicted, the degree of overall motivation (OM) for "Option 2" is 31%. Again, as also depicted, the same descriptive texts as presented on the display 780 in FIGS. 4C-D, continue to be presented on the display 780 in FIGS. 4E-F.

Figure 4G:
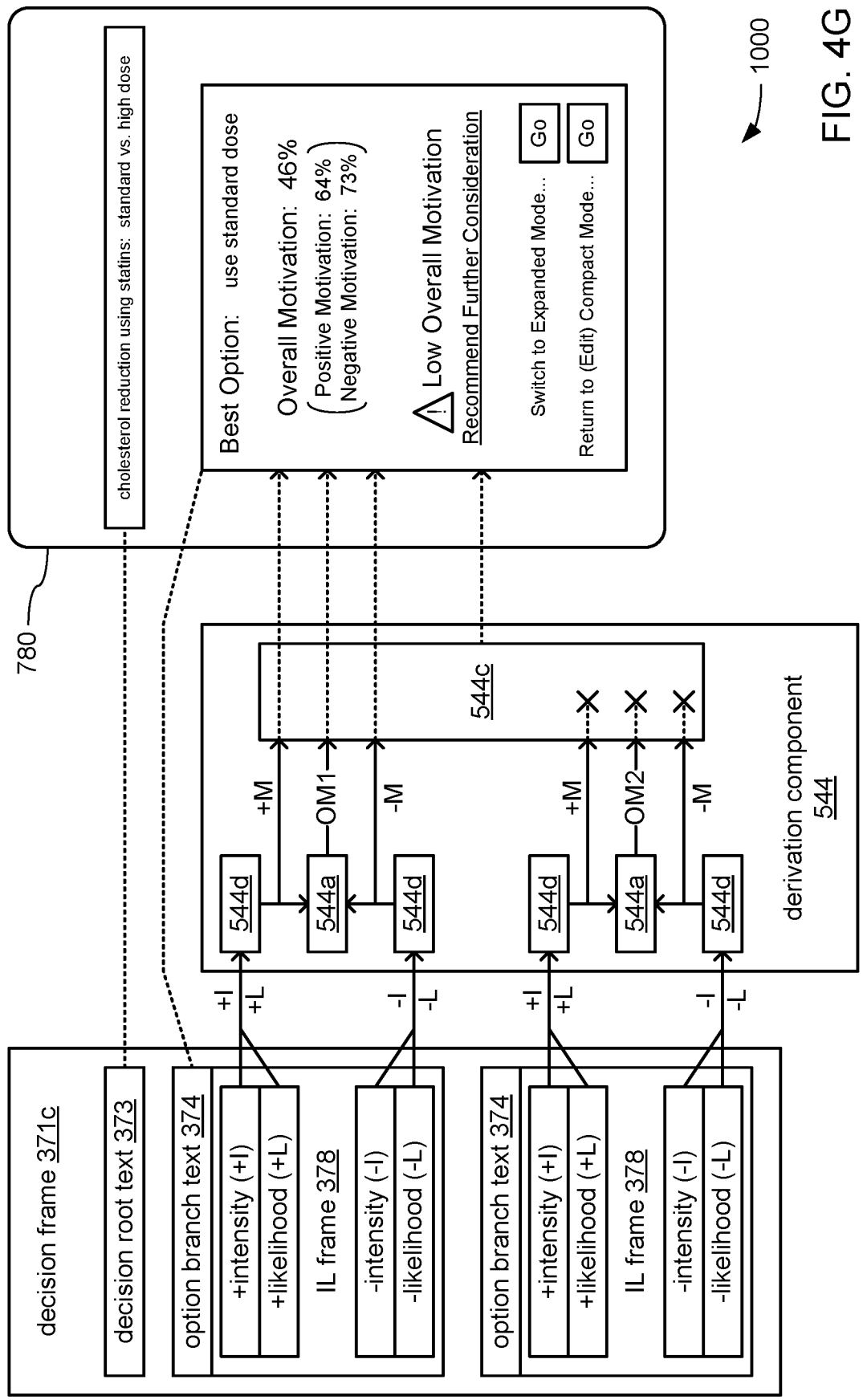

Turning to FIG. 4G, with at least the degrees of overall motivation (OM) having been derived for each of the two options, at least these two degrees of overall motivation (OM) may then be provided as inputs to an instance of the comparator function 544*c* for comparison therebetween to identify the best option from among these two options. As depicted, from among these two options, "Option 1" is identified as the best option, and an indication to that effect is presented on the display 780 alongside an indication of at least the degree of overall motivation (OM) for "Option 1."

As is also depicted, and as previously discussed in reference to FIG. 3M, the degree of overall motivation (OM) for "Option 1" may be compared to a threshold degree of overall motivation. If a degree of overall motivation (OM) for an identified best option does not meet that threshold, then a warning indication that the overall motivation (OM) for that option is low along with a prompt for the decision maker to further consider the current decision. As depicted, the degree of overall motivation (OM) for "Option 1" is indicated to be low, and accordingly, the decision maker is presented with prompts on the display 780 to further consider the current decision by either returning to the compact mode to edit its inputs, or switching to the expanded mode where the decision maker will be guided through providing more detailed inputs.

In some embodiments, it may be that a degree of overall motivation (OM) for an option that does not meet at a threshold of at least 50% is deemed to be low. Other embodiments are possible in which a different threshold value may be used, possibly as a result of being established by experimentation.

Turning to FIG. 4H, in response to the indication of a low degree of overall motivation for "Option 1" in FIG. 4G, and in response to the prompts to further reconsider the current decision, the decision maker has chosen to return to the compact mode to further consider the current decision. As also depicted, the decision maker has chosen to edit the inputs the inputs earlier provided in the compact mode in a manner that includes adding a third option.

It should be noted that, upon returning to the compact mode, the decision maker may be able to use the user interface to edit the inputs thereof in any of a variety of ways, either in lieu of or in addition to adding a third option. By way of example, the decision maker may choose to alter selections of scale text for either of "Option 1" or "Option 2" as part of experimenting with such changes to try an understand how slight variations in those inputs may or may not affect the identification of a best option and/or the degree of overall motivation (OM) of the identified best option. By way of another example, the decision maker may choose to alter the descriptive text that describes the current decision and/or the descriptive text for one or both of the original two options as part of re-framing the current decision.

It should also be noted that the decision maker could have also returned to the compact mode to make any or all of such changes to the inputs thereto, even if a best option had been identified and presented on the display 780 without such a warning or caveat as the degree of overall motivation (OM) being low.

Figure 4I:
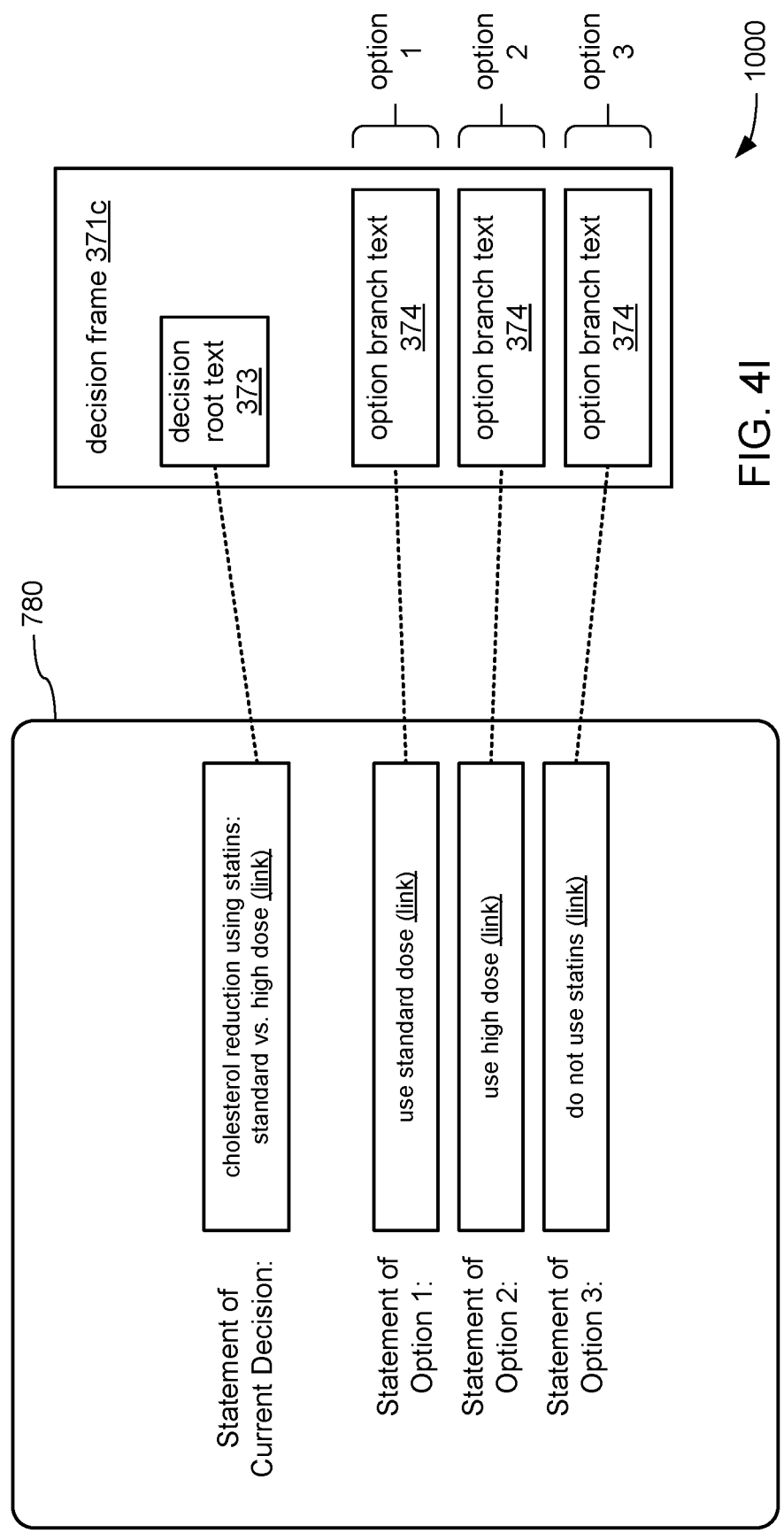

Turning to FIG. 4I, in a manner very similar to what was discussed in reference to FIG. 4B, with the compact mode continuing to be selected, and with the number of options now increased from two to three, a prompt is presented on the display 780 requesting entry of descriptive text that describes the third option.

Figure 4J:
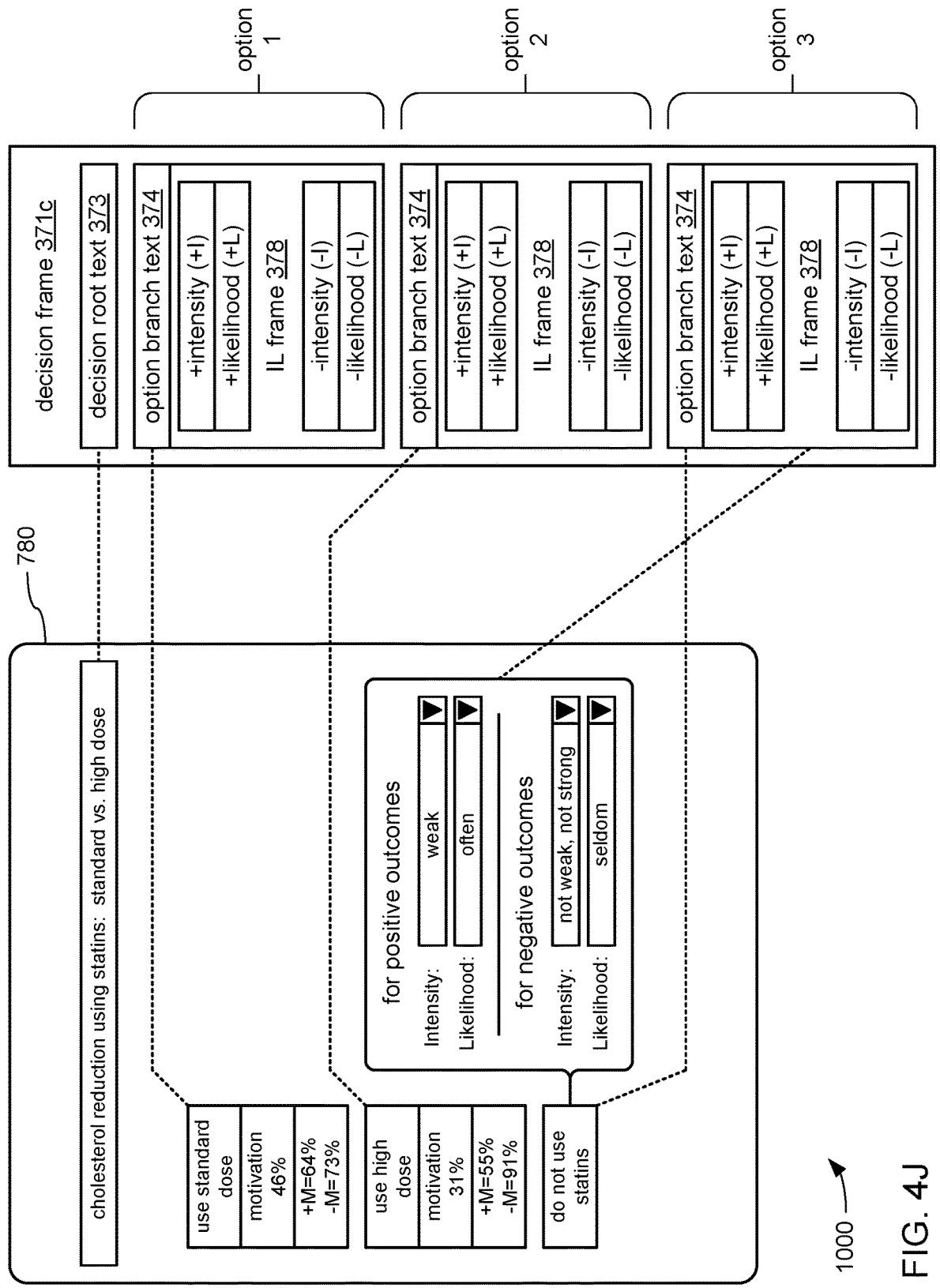
Figure 4K:
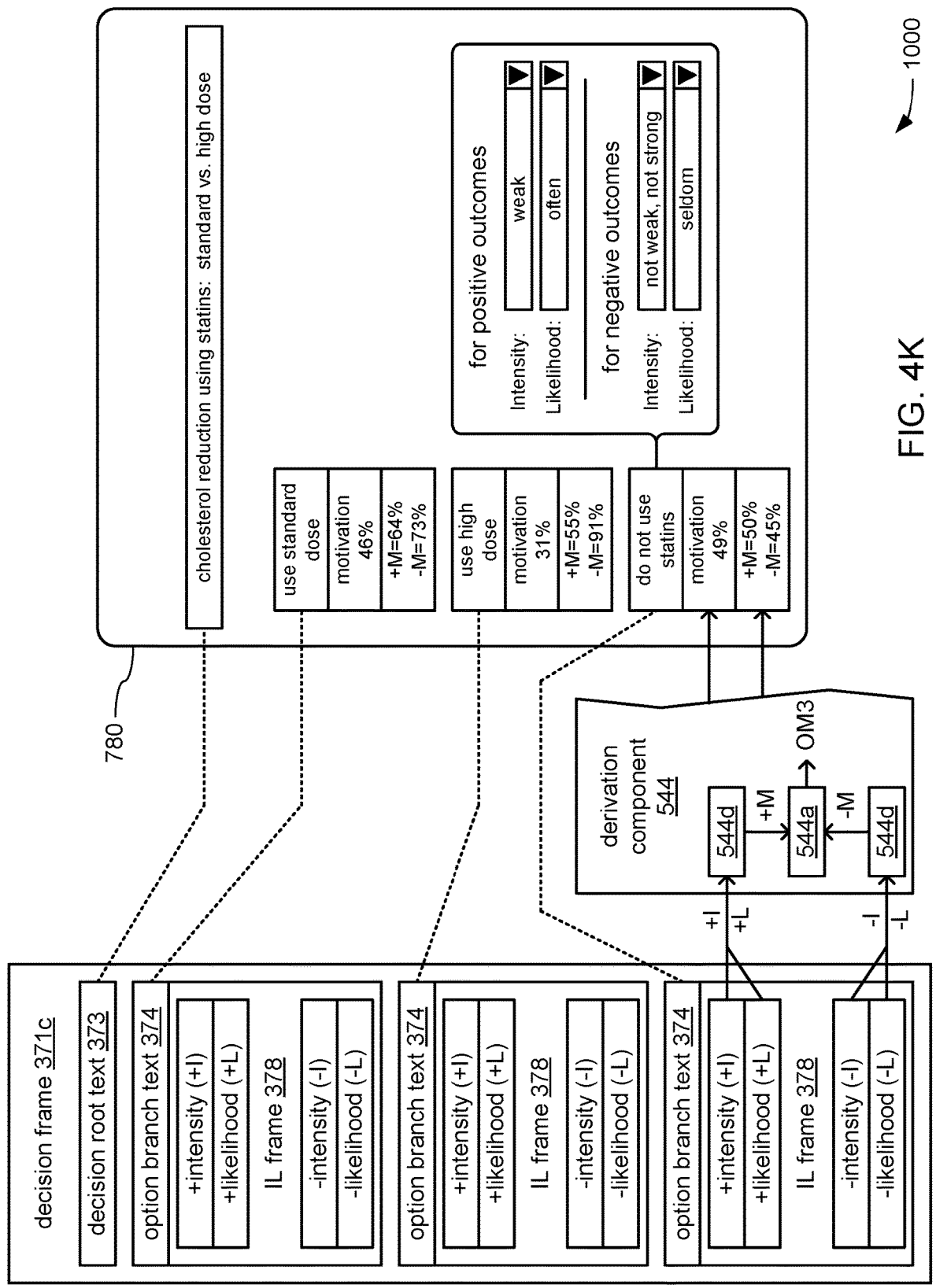

Turning to FIGS. 4J-K, in a manner very similar to what was discussed in reference to FIGS. 4C-D, and in reference to FIGS. 4E-F, the decision maker may be prompted to provide degrees of positive and negative intensities and likelihood for "Option 3" through the selection of scale texts; degrees of positive, negative and overall motivation may be derived therefrom; and those degrees of motivation may also be presented on the display 780.

With the degrees of overall motivation (OM), positive motivation (+M) and negative motivation (−M) having been derived for "Option 3", these degrees of motivation for this option may be presented on the display 780, alongside those for "Option 1" and "Option 2." As depicted, the degree of overall motivation (OM) for "Option 3" is 49%. Again, as also depicted, the same descriptive texts as presented on the display 780 in FIGS. 4C-D, and in 4E-F, continue to be presented on the display 780 in FIGS. 4J-K, but now accompanied by the descriptive text that describes "Option 3."

Figure 4L:
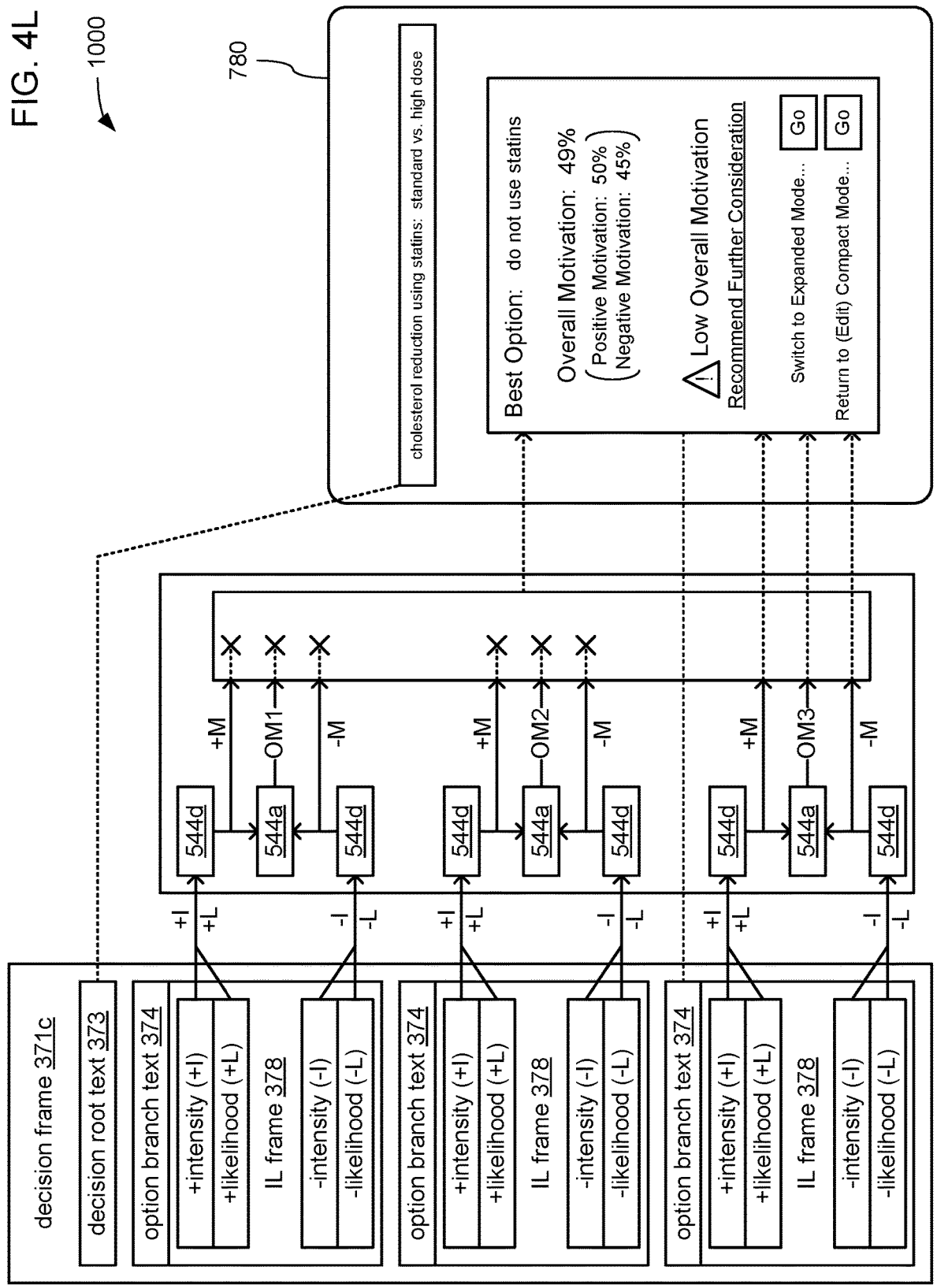

Turning to FIG. 4L, in a manner very similar to what was discussed in reference to FIG. 4G, with at least the degrees of overall motivation (OM) having now been derived for all three options, at least these three degrees of overall motivation (OM) may then be provided as inputs to an instance of the comparator function 544c for comparison thereamong to identify the best option from among these three options. As depicted, from among these three options, "Option 3" is now identified as the best option, and an indication to that effect is presented on the display 780 alongside an indication of at least the degree of overall motivation (OM) for "Option 3."

As is also depicted, the degree of overall motivation (OM) for "Option 3" may be compared to the same threshold degree of overall motivation as the degree of overall motivation (OM) for "Option 1" was in FIG. 4G. As depicted, the degree of overall motivation (OM) for "Option 3" is now indicated to be low, and accordingly, the decision maker is again presented with prompts on the display 780 to further consider the current decision by either returning to the compact mode to edit its inputs, or switching to the expanded mode where the decision maker will be guided through providing more detailed inputs.

Figure 5A:
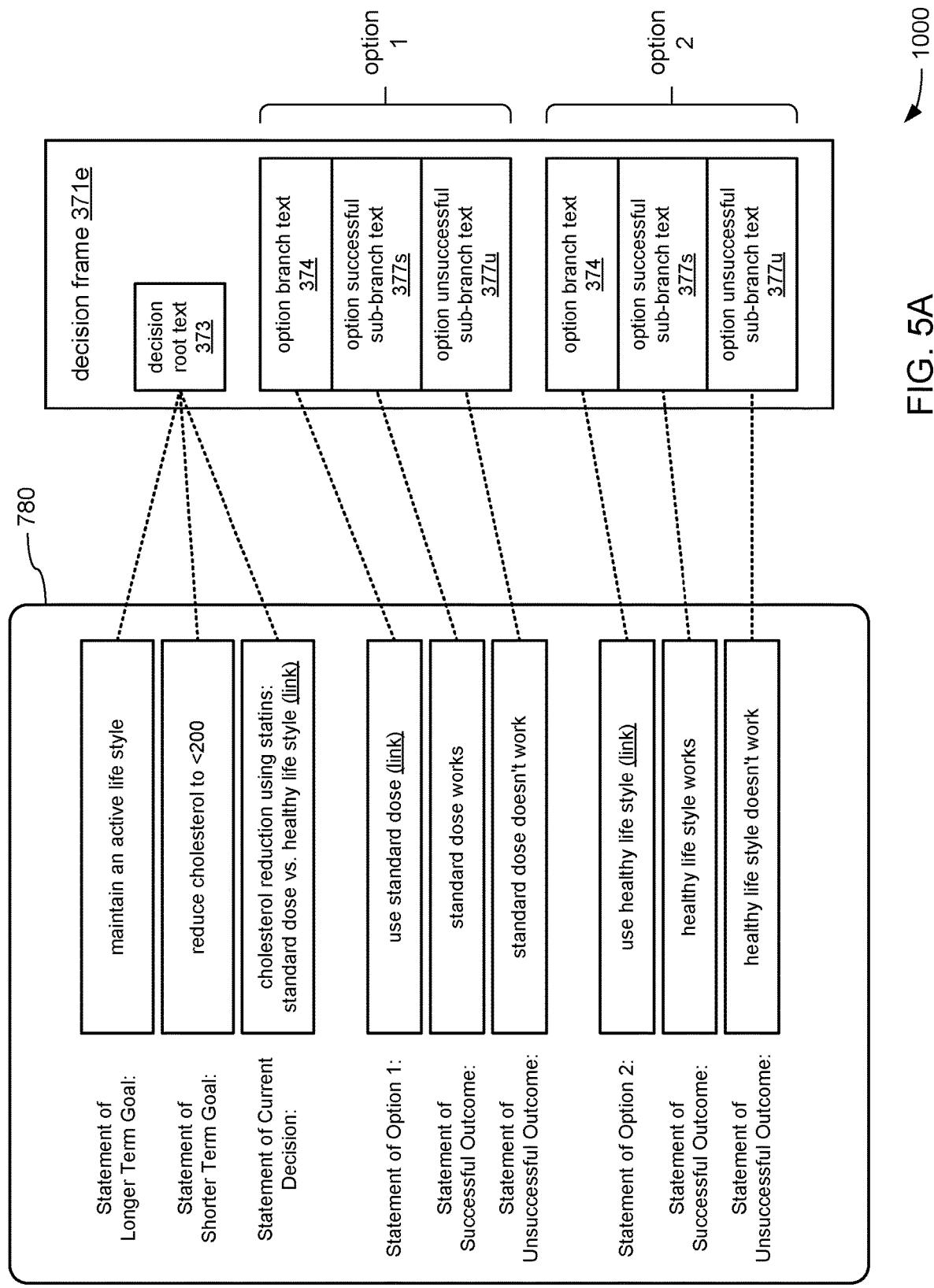
FIGS. 5A, 5B, 5C, 5D and 5E, together, show aspects of an example use of the decision making augmentation functionality of the decision making augmentation system of either FIG. 1A or 1B in expanded mode.

Turning to FIG. 5A, in response to the indication of a low degree of overall motivation for "Option 3" in FIG. 4L, and in response to the prompts to further reconsider the current decision, the decision maker has now chosen to switch to the expanded mode to further consider the current decision. As also depicted, the decision maker is now presented with a greater variety of prompts to provide (or edit) a greater overall quantity of descriptive texts.

More specifically, and in a manner very similar to what was discussed in reference to FIG. 4B, with the expanded mode having been selected, a prompt is presented on the display 780 requesting entry (or editing) of a descriptive text that describes the current decision, but now accompanied by addition prompts requesting entry of additional descriptive texts that describe an associated longer term goal and an associated shorter term goal. Also, with the number of options having been set, more prompts are presented requesting entry (or editing) of descriptive texts that describe each option of the current decision, but now accompanied by additional prompts requesting entry of additional descriptive texts that describe successful and unsuccessful outcomes for each option.

Figure 5B:
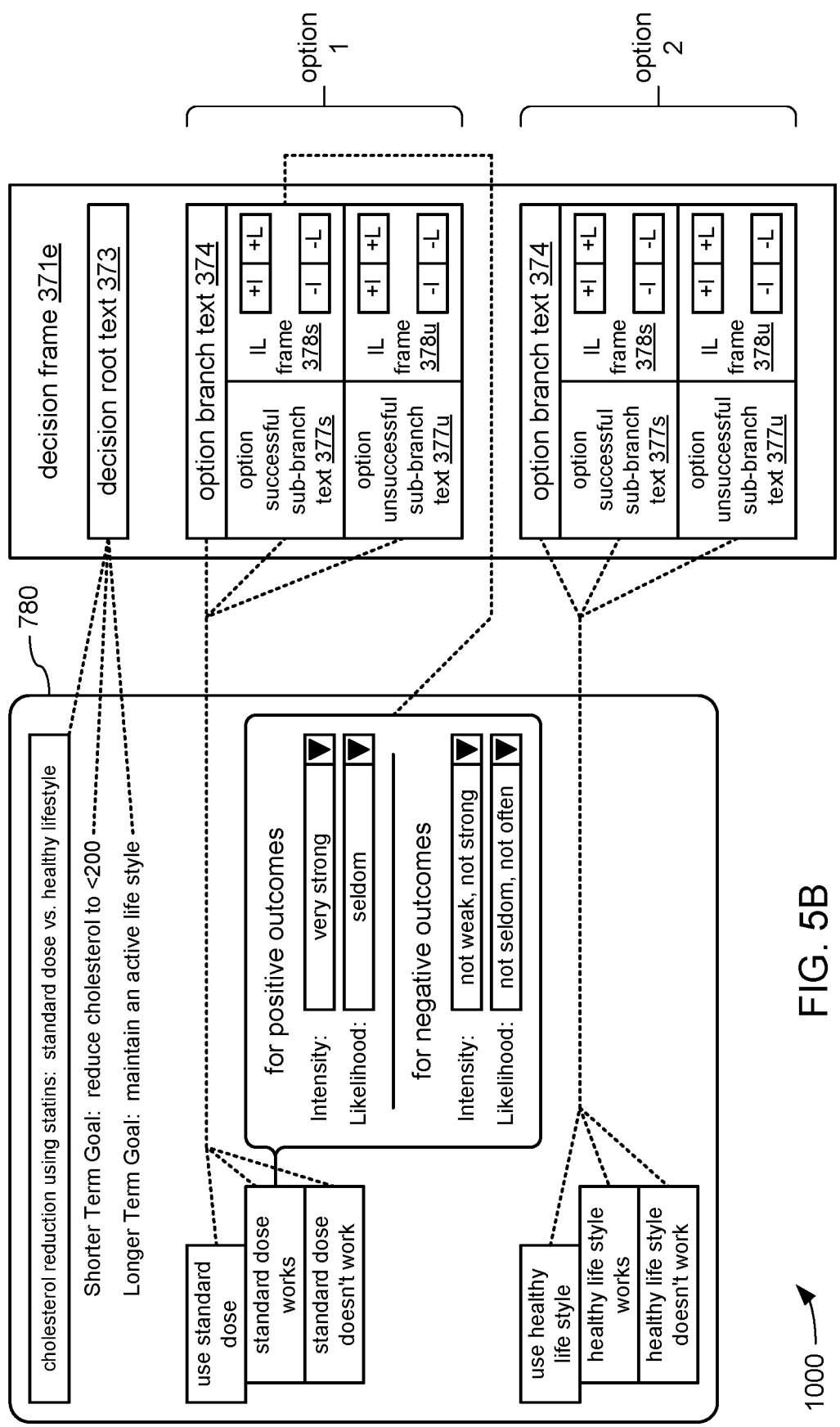

Turning to FIG. 5B, in a manner similar to what was discussed in reference to FIGS. 4C, 4E and 4J, with the descriptive texts describing the current decision, shorter and longer term goals, each option and each outcome of each option having been provided by the decision maker, one or more of those descriptive texts may be repeatedly presented on the display 780 throughout the time the decision maker interacts with the system 1000. Again, this may be part of an approach to obviating the need to use the limited storage capacity of the short-term memory of the decision maker's brain to retain the content of these descriptive texts.

Also, with these descriptive texts having been provided by the decision maker, and now being repeatedly presented on the display 780, a prompt may also be presented on the display 780 that requests that the decision maker specify positive and negative degrees of intensity and likelihood for the possible successful outcome of "Option 1" of the two options by selecting scale texts from each of multiple menus of selectable scale texts. Again, requiring the decision maker to specify a degree of intensity or outcome by selecting a scale text from a set of scale texts serves to avoid having the brain of the decision maker slipping out of measuring and into counting. And again, the user interface may additionally provide at least the option of presenting explanatory text to provide an explanation to the decision maker of the meanings of each of these degrees of intensity and likelihood.

As depicted, the decision maker has selected the scale texts "very strong", "seldom", "not weak, not strong" and "not seldom, not often" for degrees of positive intensity, positive likelihood, negative intensity and negative likelihood, respectively. Indications of these selections of scale text may then be stored within the IL frame 378s allocated for the possible successful outcome of "Option 1."

Figure 5C:
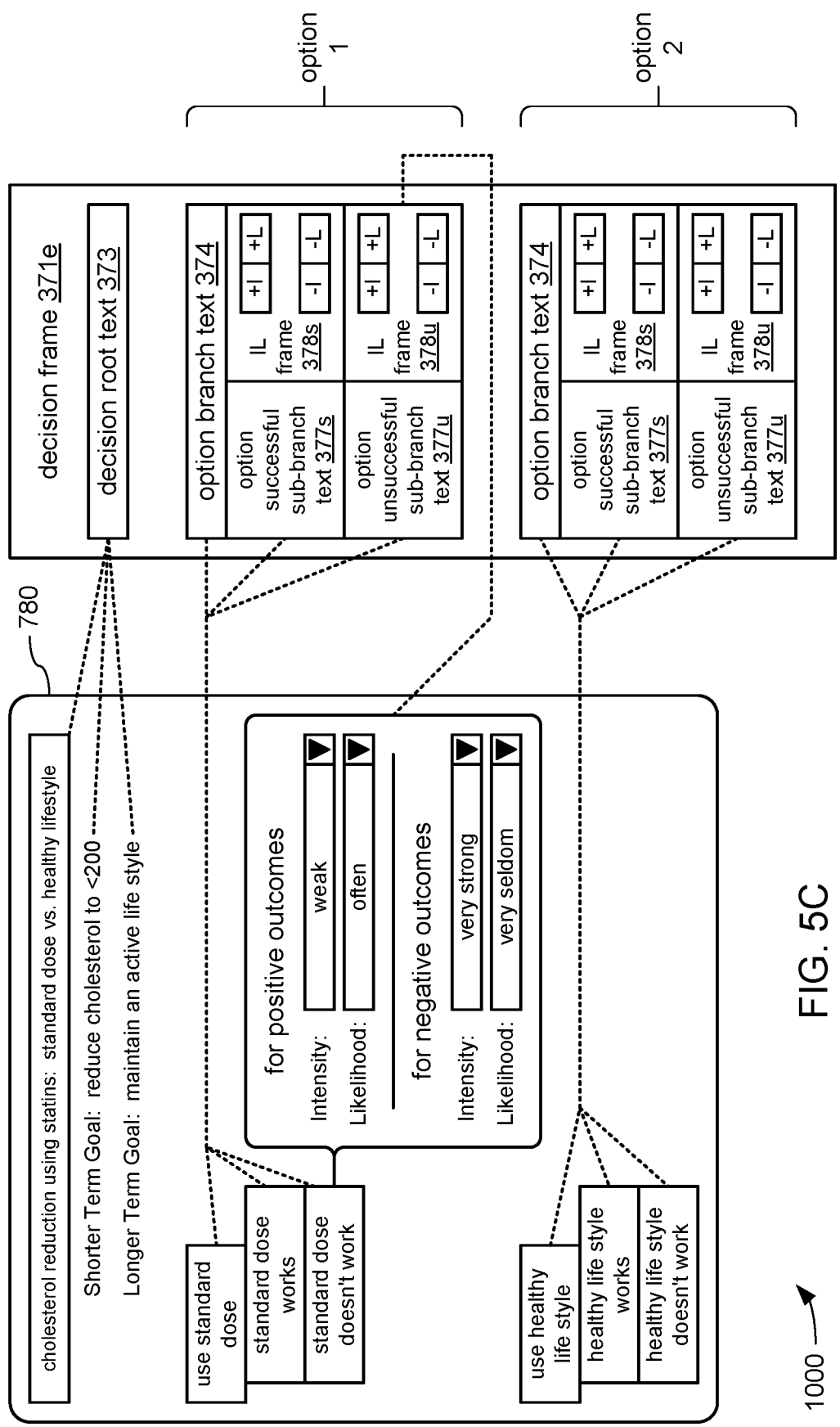

Turning to FIG. 5C, in a manner very similar to what was just discussed in reference to FIG. 5C, a prompt may also be presented on the display 780 that requests that the decision maker specify positive and negative degrees of intensity and likelihood for the possible unsuccessful outcome of "Option 1" of the two options, again by selecting scale texts from each of multiple menus of selectable scale texts.

As depicted, the decision maker has selected the scale texts "weak", "often", "very strong" and "very seldom" for degrees of positive intensity, positive likelihood, negative intensity and negative likelihood, respectively. Indications of these selections of scale text may then be stored within the IL frame 378u allocated for the possible unsuccessful outcome of "Option 1."

As also depicted, the same descriptive texts as presented on the display 780 in FIG. 5B, continue to be presented on the display 780 in FIG. 5C.

Moving on from FIG. 5C, similar prompts for the entry of degrees of intensity and likelihood for both of the possible successful and unsuccessful outcomes of "Option 2." However, for the sake of brevity by avoiding unnecessary repetitive clutter in these figures, specific figures depicting these operations are not included herein.

Figure 5D:
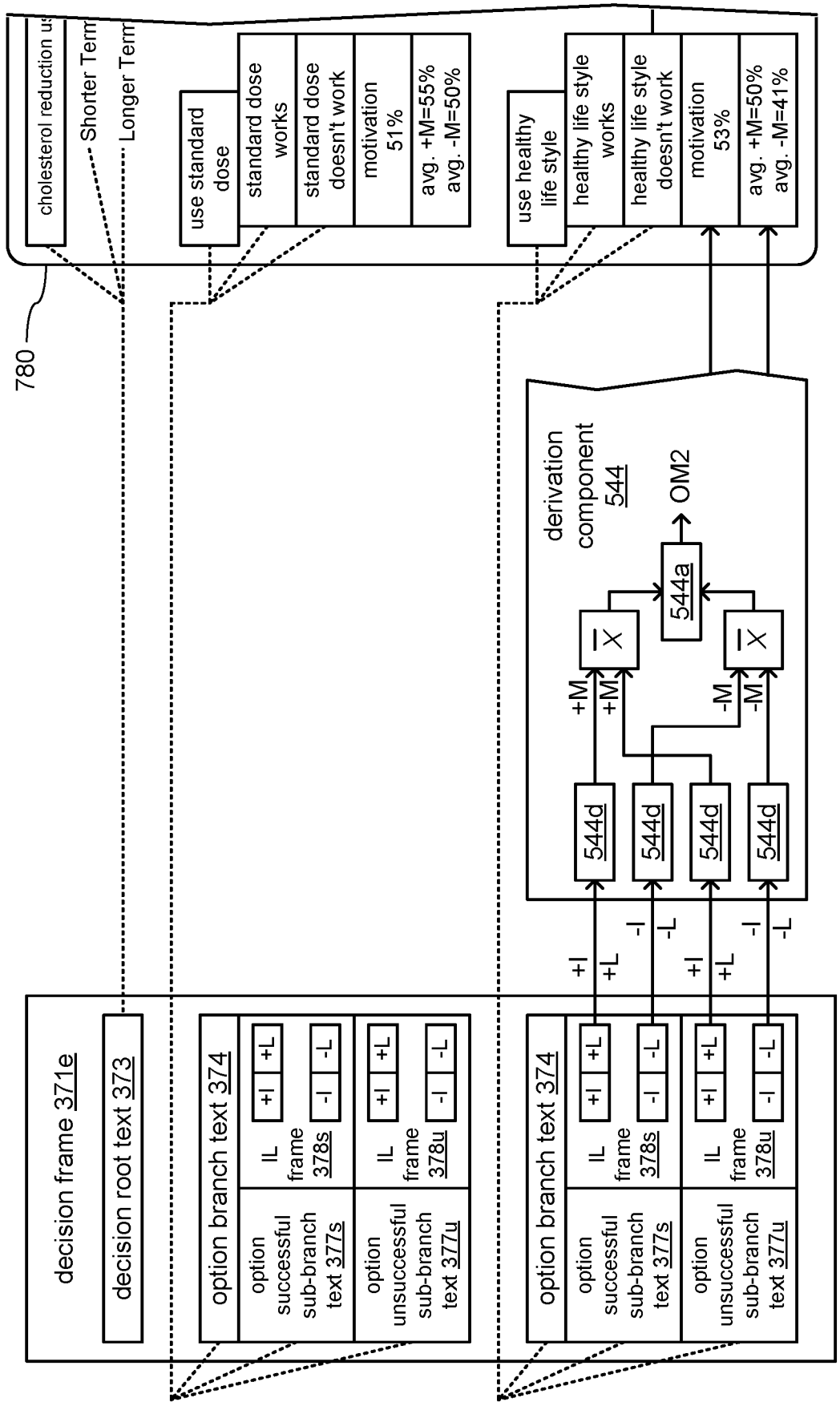

Turning to FIG. 5D, in a manner similar to what was discussed in reference to FIGS. 4D, 4F and 4K, with indications of scale texts selected for the possible successful and unsuccessful outcomes of "Option 2" having been stored within their respective IL frames 378s and 378u, those indications of such selections may first be correlated to numeric values.

Then, the ones of those numeric values indicative of degrees of positive intensity (+I) and positive likelihood (+L) for the possible successful outcome may be provided as inputs to a first instance of the derivation function 544d to derive a degree of positive motivation (+M) for the possible successful outcome, and the ones of those numeric values indicative of degrees of negative intensity (−I) and negative likelihood (−L) for the possible successful outcome may be provided as inputs to a second instance of the derivation function 544d to derive a degree of negative motivation (−M) for the possible successful outcome. Correspondingly, the ones of those numeric values indicative of degrees of positive intensity (+I) and positive likelihood (+L) for the possible unsuccessful outcome may be provided as inputs to a third instance of the derivation function 544d to derive a degree of positive motivation (+M) for the possible unsuccessful outcome, and the ones of those numeric values indicative of degrees of negative intensity (−I) and negative likelihood (−L) for the possible unsuccessful outcome may be provided as inputs to a fourth instance of the derivation function 544d to derive a degree of negative motivation (−M) for the possible unsuccessful outcome.

The resulting degrees of positive motivation (+M) for both of the possible successful and unsuccessful outcomes may then be averaged together before being provided as one of two inputs to an instance of the aggregation function 544a. Correspondingly, resulting degrees of negative motivation (−M) for both of the possible successful and unsuccessful outcomes may then be averaged together before being provided as the other of the two inputs to the instance of the aggregation function 544a. With these two inputs so provided, the instance of the aggregation function 544a may then be used to derive the degree of overall motivation (OM) for the option.

With the degrees of overall motivation (OM), positive motivation (+M) and negative motivation (−M) having been derived for "Option 2", these degrees of motivation for this option may be presented on the display 780. As depicted, the degree of overall motivation (OM) for "Option 2" is 53%.

As also depicted, the same descriptive texts as presented on the display 780 in FIGS. 5B-C, continue to be presented on the display 780 in FIG. 5D.

It should be noted that, for sake of brevity by avoiding unnecessary repetitive clutter in these figures, a specific figure depicting these operations also being performed to derive degrees of motivation for "Option 1" is not included herein. However, FIG. 5D does depict the results of such operations having been performed for "Option 1." Specifically, FIG. 5D additionally depicts the presentation of the degrees of motivation for "Option 1" on the display 780, with the degree of overall motivation (OM) for "Option 1" being 51%.

Figure 5E:
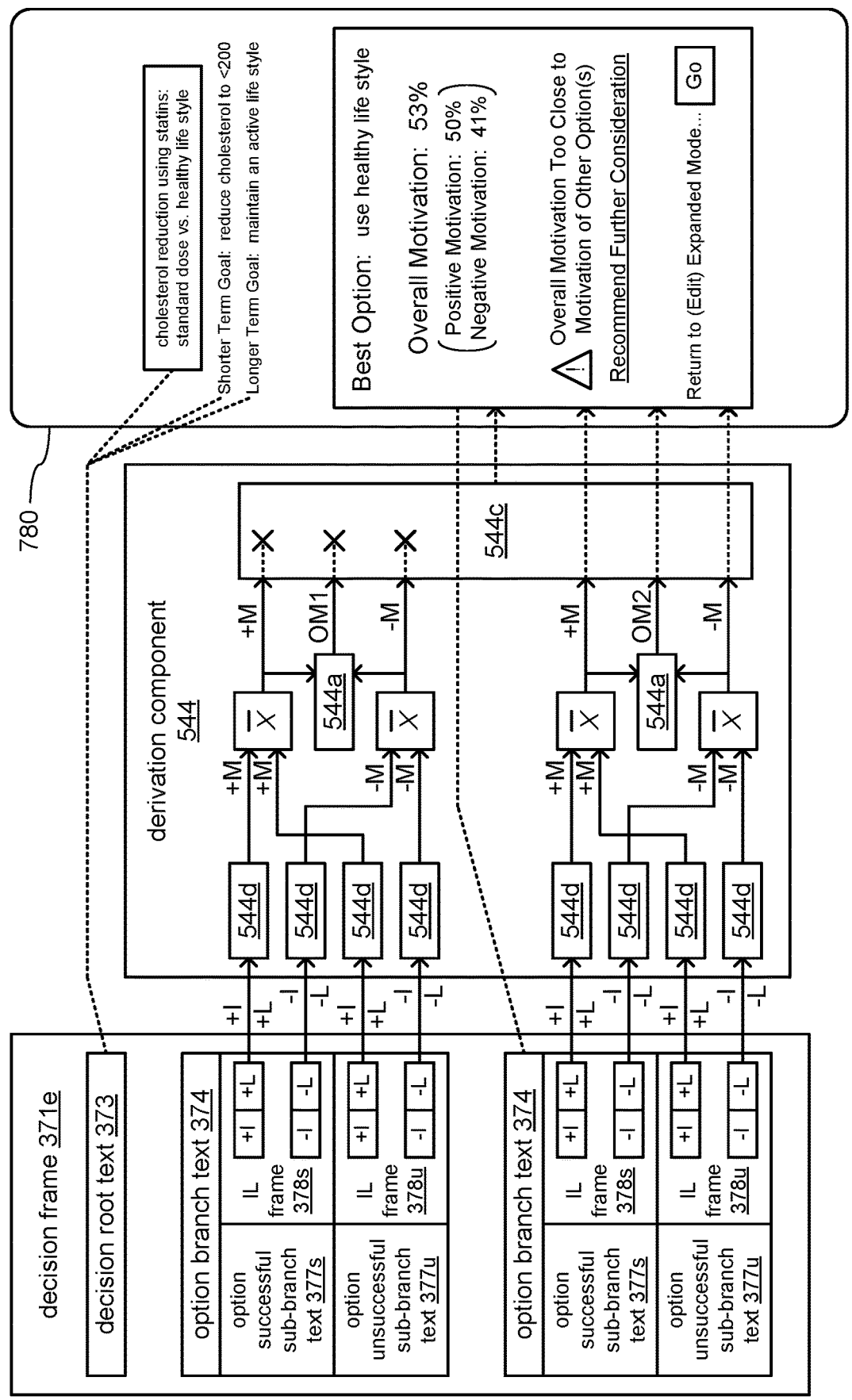

Turning to FIG. 5E, in a manner similar to what was discussed in reference to FIGS. 4G and 4L, with at least the degrees of overall motivation (OM) having been derived for each of the two options, at least these two degrees of overall motivation (OM) may then be provided as inputs to an instance of the comparator function 544c for comparison therebetween to identify the best option from among these two options. As depicted, from among these two options, "Option 2" is identified as the best option, and an indication to that effect is presented on the display 780 alongside an indication of at least the degree of overall motivation (OM) for "Option 2."

As is also depicted, and as also discussed in reference to FIG. 3M, the degree of overall motivation (OM) for "Option 2" may be compared to a threshold degree of overall motivation. Again, if a degree of overall motivation (OM) for an identified best option does not meet that threshold, then a warning indication that the overall motivation (OM) for that option is low along with a prompt for the decision maker to further consider the current decision. However, as depicted, the degree of overall motivation (OM) for "Option 2" has at least met that threshold as there is no indication provided that the degree of overall motivation (OM) for "Option 2" is low.

However, as discussed in reference to FIG. 3M, the degree of overall motivation (OM) for "Option 2" may be compared to the degree of overall motivation (OM) for "Option 1." If a degree of overall motivation (OM) for an identified best option does not exceed the degree of overall motivation (OM) of every other option by at least a pre-determined threshold difference in degree, then a proximity warning indication that the degree of overall motivation (OM) for that option is not sufficiently higher than the degree of overall motivation (OM) for at least one other option. Such an indication may also be accompanied by a prompt for the decision maker to further consider the current decision. As depicted, the decision maker is presented with a prompt on the display 780 to further consider the current decision by returning to the expanded mode to edit its inputs.

There is thus disclosed a decision making augmentation system of one or more devices that implements a method for both augmenting the short-term memory of the brain of a decision maker, and guiding the decision maker through considering positive and negative aspects ("pros and cons") of each option of a current decision in a manner that integrates both instrumental rationality and value rationality based on the values of the decision maker. The features set forth below may be combined in any of a variety of ways to create any of a variety of embodiments of such a system and/or of a method of decision making augmentation that may incorporate such a system.

A decision making augmentation system includes: a manual input device configured to enable entry of text input by an operator of the decision making augmentation system that describes aspects of a current decision including a selection of one option from among multiple options; a display configured to visually guide the operator through providing the text input; a storage configured to store indications of the text input, wherein the text input includes at least one of multiple descriptive texts and multiple selections of scale text; and a processor communicatively coupled to at least the storage. The processor is configured to perform operations including: receive a decision descriptive text of the multiple descriptive texts, wherein the decision descriptive text describes the current decision; and cause repeated presentation of the decision descriptive text on the display. The processor is also configured to, for each option of the multiple options, perform operations including: receive an indication of at least one selection of scale text of the multiple selections of scale text, wherein the at least one selection of scale text specifies either a degree of intensity of seeking to achieve or avoid a possible outcome of the option, or a degree of likelihood of achieving or avoiding the possible outcome of the option; and derive a degree of overall motivation associated with the option based on the at least one selection of scale text. The processor is further configured to: identify a best option from among the multiple options based on the degree of overall motivation associated with each option; cause a presentation of an indication of the best option on the display; and compare the degree of overall motivation associated with the best option to a threshold degree of overall motivation. The processor is still further configured to, in response to the degree of overall motivation associated with the best option being less than the threshold degree of overall motivation, cause a presentation, on the display, of: a warning that the degree of overall motivation associated with the best option is low; and a prompt for the operator to further consider the current decision. The processor is yet further configured to compare the degree of overall motivation associated with the best option to the degree of overall motivation associated with each other option of the multiple options. The processor is also yet further configured to, in response to the degree of overall motivation associated with the best option not exceeding, by at least a threshold degree of difference in overall motivation, the degree of overall motivation associated with at least one other option of the multiple options, cause a presentation, on the display of: a proximity warning that the difference in degree of the overall motivation associated with the best option from the overall motivation associated with at least one other option is low; and the prompt for the operator to further consider the current decision.

The processor may be further configured to cause a presentation, on the display, of a prompt for the operator to enter at least one of: the decision descriptive text; a longer term goal descriptive text of the multiple descriptive texts that describes a longer term goal associated with the current decision; and a shorter term goal descriptive text of the multiple descriptive texts that describes a shorter term goal associated with the current decision. The processor may also be further configured to, during each presentation, on the display, of a prompt for the operator to select scale text that specifies either a degree of intensity or a degree of likelihood associated with an option of the multiple options, cause a presentation, on the display, of at least one of the decision descriptive text, the longer term goal descriptive text, and the shorter term goal descriptive text.

The processor may be further configured to cause a presentation, on the display, of at least one prompt for the operator to enter, for each option of the multiple options, at least one of: a first option descriptive text of the multiple descriptive texts that describes the option; a second option descriptive text of the multiple descriptive texts that describes a possible successful outcome of the option; and a third option descriptive text of the multiple descriptive texts that describes a possible unsuccessful outcome of the option. The processor may also be further configured to, during each presentation, on the display, of a prompt for the operator to select scale text that specifies either a degree of intensity or a degree of likelihood associated with an option of the multiple options, cause a presentation, on the display, of at least one of the first option descriptive text, the longer term goal descriptive text, and the shorter term goal descriptive text.

Receiving the decision descriptive text may include receiving an indication of selection of a decision template by the operator, the selected decision template may include a default description of the current decision, and the processor may be further configured to: accept the default description of the current decision from the selected decision template as the decision descriptive text; and cause a presentation, on the display, of a prompt for the operator to edit the decision descriptive text.

The selected decision template may specify a quantity of the multiple options. The selected decision template, for each option of the multiple options, may include at least one of: a first option descriptive text of the multiple descriptive texts that describes the option; a second option descriptive text of the multiple descriptive texts that describes a possible successful outcome of the option; and a third option descriptive text of the multiple descriptive texts that describes a possible unsuccessful outcome of the option. At least one of the decision descriptive text, and the first option descriptive text associated with at least one option of the multiple options, may include a reference to a decision aid to provide the operator within information concerning a subject associated with the current decision. The processor may be further configured to cause a presentation, on the display and for each option, a prompt for the operator to edit at least one of the first option descriptive text, the second option descriptive text and the third option descriptive text.

For each option, receiving an indication of at least one selection of scale text may include: receiving an indication of a selection of scale text specifying a degree of positive intensity of seeking to achieve a possible positive outcome of the option; receiving an indication of a selection of scale text specifying a degree of positive likelihood of achieving the possible positive outcome; receiving an indication of a selection of scale text specifying a degree of negative intensity of seeking to avoid a possible negative outcome of the option; and receiving an indication of a selection of scale text specifying a degree of negative likelihood of avoiding the possible negative outcome. Also, for each option, deriving a degree of overall motivation associated with the option may include: deriving a degree of positive motivation associated with the option based on the degree of positive intensity and the degree of positive likelihood; deriving a degree of negative motivation associated with the option based on the degree of negative intensity and the degree of negative likelihood; and deriving the degree of overall motivation associated with the option based on the degree of positive motivation associated with the option and the degree of negative motivation associated with the option.

For each option, receiving an indication of at least one selection of scale text may include: receiving an indication of a selection of scale text specifying a first degree of positive intensity of seeking to achieve a possible successful outcome of the option; receiving an indication of a selection of scale text specifying a first degree of positive likelihood of achieving the possible successful outcome; receiving an indication of a selection of scale text specifying a first degree of negative intensity of seeking to avoid the possible successful outcome of the option; receiving an indication of a selection of scale text specifying a first degree of negative likelihood of avoiding the possible successful outcome; receiving an indication of a selection of scale text specifying a second degree of positive intensity of seeking to achieve a possible unsuccessful outcome of the option; receiving an indication of a selection of scale text specifying a second degree of positive likelihood of achieving the possible unsuccessful outcome; receiving an indication of a selection of scale text specifying a second degree of negative intensity of seeking to avoid the possible unsuccessful outcome of the option; and receiving an indication of a selection of scale text specifying a second degree of negative likelihood of avoiding the possible unsuccessful outcome. Also, for each option, deriving a degree of overall motivation associated with the option may include: deriving a first degree of positive motivation associated with the possible successful outcome based on the first degree of positive intensity and the first degree of positive likelihood; deriving a second degree of positive motivation associated with the possible unsuccessful outcome based on the second degree of positive intensity and the second degree of positive likelihood; deriving a first degree of negative motivation associated with the possible successful outcome based on the first degree of negative intensity and the first degree of negative likelihood; deriving a second degree of negative motivation associated with the possible unsuccessful outcome based on the second degree of negative intensity and the second degree of negative likelihood; and deriving the degree of overall motivation associated with the option based on an average of the first degree of positive motivation and the second degree of positive motivation, and an average of the first degree of negative motivation and the second degree of negative motivation.

Identifying the best option from among the multiple options may include selecting the option associated with highest degree of overall motivation among the multiple options.

The decision making augmentation system may be operable in either a compact mode or an expanded mode, and the decision making augmentation system may be initially operated in the compact mode, and the prompt for the operator to further consider the current decision may include a prompt for the operator to switch to operating the decision making augmentation system in the expanded mode. The processor may be configured to perform operations including, in the compact mode, for each option, cause a presentation, on the display, of at least one prompt for the operator to select scale texts specifying: a degree of positive intensity of seeking to achieve a possible positive outcome of the option; a degree of positive likelihood of achieving the possible positive outcome; a degree of negative intensity of seeking to avoid a possible negative outcome of the option; and a degree of negative likelihood of avoiding the possible negative outcome. The processor may also be configured to perform operations including, in the expanded mode, for each option, cause a presentation, on the display, of at least one prompt for the operator to select scale texts specifying: a first degree of positive intensity of seeking to achieve a possible successful outcome of the option; a first degree of positive likelihood of achieving the possible successful outcome; a first degree of negative intensity of seeking to avoid the possible successful outcome of the option; a first degree of negative likelihood of avoiding the possible successful outcome; a second degree of positive intensity of seeking to achieve a possible unsuccessful outcome of the option; a second degree of positive likelihood of achieving the possible unsuccessful outcome; a second degree of negative intensity of seeking to avoid the possible unsuccessful outcome of the option; and a second degree of negative likelihood of avoiding the possible unsuccessful outcome.

At least a portion of the decision making augmentation system may be incorporated into a control system of a vehicle configured to carry at least one of passengers and cargo; and the processor may be configured to cause a presentation, on the display, of a prompt to select a decision template that specifies aspects of a decision that closely resembles the current decision.

A method of decision making augmentation includes: receiving, at a processor of a decision making augmentation system, and via a manual input device configured to enable entry of text input by an operator, a decision descriptive text of multiple descriptive texts, wherein the decision descriptive text describes a current decision including a selection of one option from among multiple options; and causing repeated presentation of the decision descriptive text on a display configured to visually guide the operator through providing the text input, wherein the text input includes at least one of the multiple descriptive texts and multiple selections of scale text. The method also includes, for each option of the multiple options, performing operations including: receiving, at the processor, and via the manual input device, an indication of at least one selection of scale text of the multiple selections of scale text, wherein the at least one selection of scale text specifies either a degree of intensity of seeking to achieve or avoid a possible outcome of the option, or a degree of likelihood of achieving or avoiding the possible outcome of the option; and deriving, by the processor, a degree of overall motivation associated with the option based on the at least one selection of scale text. The method further includes: identifying, by the processor, a best option from among the multiple options based on the degree of overall motivation associated with each option; causing a presentation of an indication of the best option on the display; and comparing, by the processor, the degree of overall motivation associated with the best option to a threshold degree of overall motivation. The method still further includes, in response to the degree of overall motivation associated with the best option being less than the threshold degree of overall motivation, causing a presentation, on the display, of: a warning that the degree of overall motivation associated with the best option is low; and a prompt for the operator to further consider the current decision. The method yet further includes comparing, by the processor, the degree of overall motivation associated with the best option to the degree of overall motivation associated with each other option of the multiple options. The method also yet further includes, in response to the degree of overall motivation associated with the best option not exceeding, by at least a threshold degree of difference in overall motivation, the degree of overall motivation associated with at least one other option of the multiple options, causing a presentation, on the display of: a proximity warning that the difference in degree of the overall motivation associated with the best option from the overall motivation associated with at least one other option is low; and the prompt for the operator to further consider the current decision.

The method may further include causing a presentation, on the display, of a prompt for the operator to enter at least one of: the decision descriptive text; a longer term goal descriptive text of the multiple descriptive texts that describes a longer term goal associated with the current decision; and a shorter term goal descriptive text of the multiple descriptive texts that describes a shorter term goal associated with the current decision. The method may also further include, during each presentation, on the display, of a prompt for the operator to select scale text that specifies either a degree of intensity or a degree of likelihood associated with an option of the multiple options, causing a presentation, on the display, of at least one of the decision descriptive text, the longer term goal descriptive text, and the shorter term goal descriptive text.

The method may further include causing a presentation, on the display, of at least one prompt for the operator to enter, for each option of the multiple options, at least one of: a first option descriptive text of the multiple descriptive texts that describes the option; a second option descriptive text of the multiple descriptive texts that describes a possible successful outcome of the option; and a third option descriptive text of the multiple descriptive texts that describes a possible unsuccessful outcome of the option. The method may also further include, during each presentation, on the display, of a prompt for the operator to select scale text that specifies either a degree of intensity or a degree of likelihood associated with an option of the multiple options, causing a presentation, on the display, of at least one of the first option descriptive text, the longer term goal descriptive text, and the shorter term goal descriptive text.

Receiving the decision descriptive text may include receiving an indication of selection of a decision template by the operator, the selected decision template may include a default description of the current decision, and the method may further include: accepting the default description of the current decision from the selected decision template as the decision descriptive text; and causing a presentation, on the display, of a prompt for the operator to edit the decision descriptive text.

The selected decision template may specify a quantity of the multiple options. The selected decision template, for each option of the multiple options, may include at least one of: a first option descriptive text of the multiple descriptive texts that describes the option; a second option descriptive text of the multiple descriptive texts that describes a possible successful outcome of the option; and a third option descriptive text of the multiple descriptive texts that describes a possible unsuccessful outcome of the option. At least one of the decision descriptive text, and the first option descriptive text associated with at least one option of the multiple options, may include a reference to a decision aid to provide the operator within information concerning a subject associated with the current decision. The method may further include causing a presentation, on the display and for each option, a prompt for the operator to edit at least one of the first option descriptive text, the second option descriptive text and the third option descriptive text.

For each option, receiving an indication of at least one selection of scale text may include: receiving an indication of a selection of scale text specifying a degree of positive intensity of seeking to achieve a possible positive outcome of the option; receiving an indication of a selection of scale text specifying a degree of positive likelihood of achieving the possible positive outcome; receiving an indication of a selection of scale text specifying a degree of negative intensity of seeking to avoid a possible negative outcome of the option; and receiving an indication of a selection of scale text specifying a degree of negative likelihood of avoiding the possible negative outcome. Also, for each option, deriving a degree of overall motivation associated with the option may include: deriving a degree of positive motivation associated with the option based on the degree of positive intensity and the degree of positive likelihood; deriving a degree of negative motivation associated with the option based on the degree of negative intensity and the degree of negative likelihood; and deriving the degree of overall motivation associated with the option based on the degree of positive motivation associated with the option and the degree of negative motivation associated with the option.

For each option, receiving an indication of at least one selection of scale text may include: receiving an indication of a selection of scale text specifying a first degree of positive intensity of seeking to achieve a possible successful outcome of the option; receiving an indication of a selection of scale text specifying a first degree of positive likelihood of achieving the possible successful outcome; receiving an indication of a selection of scale text specifying a first degree of negative intensity of seeking to avoid the possible successful outcome of the option; receiving an indication of a selection of scale text specifying a first degree of negative likelihood of avoiding the possible successful outcome; receiving an indication of a selection of scale text specifying a second degree of positive intensity of seeking to achieve a possible unsuccessful outcome of the option; receiving an indication of a selection of scale text specifying a second degree of positive likelihood of achieving the possible unsuccessful outcome; receiving an indication of a selection of scale text specifying a second degree of negative intensity of seeking to avoid the possible unsuccessful outcome of the option; and receiving an indication of a selection of scale text specifying a second degree of negative likelihood of avoiding the possible unsuccessful outcome. Also, for each option, deriving a degree of overall motivation associated with the option may include: deriving a first degree of positive motivation associated with the possible successful outcome based on the first degree of positive intensity and the first degree of positive likelihood; deriving a second degree of positive motivation associated with the possible unsuccessful outcome based on the second degree of positive intensity and the second degree of positive likelihood; deriving a first degree of negative motivation associated with the possible successful outcome based on the first degree of negative intensity and the first degree of negative likelihood; deriving a second degree of negative motivation associated with the possible unsuccessful outcome based on the second degree of negative intensity and the second degree of negative likelihood; and deriving the degree of overall motivation associated with the option based on an average of the first degree of positive motivation and the second degree of positive motivation, and an average of the first degree of negative motivation and the second degree of negative motivation.

Identifying the best option from among the multiple options may include selecting the option associated with highest degree of overall motivation among the multiple options.

The decision making augmentation system may be operable in either a compact mode or an expanded mode, and the decision making augmentation system may be initially operated in the compact mode, and the prompt for the operator to further consider the current decision may include a prompt for the operator to switch to operating the decision making augmentation system in the expanded mode. The method may further include, in the compact mode, for each option, causing a presentation, on the display, of at least one prompt for the operator to select scale texts specifying: a degree of positive intensity of seeking to achieve a possible positive outcome of the option; a degree of positive likelihood of achieving the possible positive outcome; a degree of negative intensity of seeking to avoid a possible negative outcome of the option; and a degree of negative likelihood of avoiding the possible negative outcome. The method may also further include, in the expanded mode, for each option, causing a presentation, on the display, of at least one prompt for the operator to select scale texts specifying: a first degree of positive intensity of seeking to achieve a possible successful outcome of the option; a first degree of positive likelihood of achieving the possible successful outcome; a first degree of negative intensity of seeking to avoid the possible successful outcome of the option; a first degree of negative likelihood of avoiding the possible successful outcome; a second degree of positive intensity of seeking to achieve a possible unsuccessful outcome of the option; a second degree of positive likelihood of achieving the possible unsuccessful outcome; a second degree of negative intensity of seeking to avoid the possible unsuccessful outcome of the option; and a second degree of negative likelihood of avoiding the possible unsuccessful outcome.

At least a portion of the decision making augmentation system may be incorporated into a control system of a vehicle configured to carry at least one of passengers and cargo; and the method may further include causing a presentation, on the display, of a prompt to select a decision template that specifies aspects of a decision that closely resembles the current decision.

Various other components may be included and called upon for providing for aspects of the teachings herein. For example, additional materials, combinations of materials, and/or omission of materials may be used to provide for added embodiments that are within the scope of the teachings herein.

Standards for performance, selection of materials, functionality, and other discretionary aspects are to be determined by a user, designer, manufacturer, or other similarly interested party. Any standards expressed herein are merely illustrative and are not limiting of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to illustrative embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A decision making augmentation system comprising:
   a manual input device configured to enable entry of text input by an operator of the decision making augmentation system that describes aspects of a current decision comprising a selection of one option from among multiple options;
   a display configured to visually guide the operator through providing the text input;
   a storage configured to store indications of the text input, wherein the text input comprises at least one of multiple descriptive texts and multiple selections of scale text; and
   a processor communicatively coupled to at least the storage, the processor configured to perform operations comprising:
      receive a decision descriptive text of the multiple descriptive texts, wherein the decision descriptive text describes the current decision;
      cause repeated presentation of the decision descriptive text on the display;
      for each option of the multiple options, perform operations comprising:
         receive an indication of at least one selection of scale text of the multiple selections of scale text, wherein the at least one selection of scale text specifies either a degree of intensity of seeking to achieve or avoid a possible outcome of the option, or a degree of likelihood of achieving or avoiding the possible outcome of the option; and
         derive a degree of overall motivation associated with the option based on the at least one selection of scale text;
      identify a best option from among the multiple options based on the degree of overall motivation associated with each option;
      cause a presentation of an indication of the best option on the display;
      compare the degree of overall motivation associated with the best option to a threshold degree of overall motivation;
      in response to the degree of overall motivation associated with the best option being less than the threshold degree of overall motivation, cause a presentation, on the display, of:
         a warning that the degree of overall motivation associated with the best option is low; and
         a prompt for the operator to further consider the current decision;
      compare the degree of overall motivation associated with the best option to the degree of overall motivation associated with each other option of the multiple options; and
      in response to the degree of overall motivation associated with the best option not exceeding, by at least a threshold degree of difference in overall motivation, the degree of overall motivation associated with at least one other option of the multiple options, cause a presentation, on the display of:
         a proximity warning that the difference in degree of the overall motivation associated with the best option from the overall motivation associated with at least one other option is low; and
         the prompt for the operator to further consider the current decision.

2. The decision making augmentation system of claim 1, wherein the processor is further configured to:
cause a presentation, on the display, of a prompt for the operator to enter at least one of:
the decision descriptive text;
a longer term goal descriptive text of the multiple descriptive texts that describes a longer term goal associated with the current decision; and
a shorter term goal descriptive text of the multiple descriptive texts that describes a shorter term goal associated with the current decision; and
during each presentation, on the display, of a prompt for the operator to select scale text that specifies either a degree of intensity or a degree of likelihood associated with an option of the multiple options, cause a presentation, on the display, of at least one of the decision descriptive text, the longer term goal descriptive text, and the shorter term goal descriptive text.

3. The decision making augmentation system of claim 2, wherein the processor is further configured to:
cause a presentation, on the display, of at least one prompt for the operator to enter, for each option of the multiple options, at least one of:
a first option descriptive text of the multiple descriptive texts that describes the option;
a second option descriptive text of the multiple descriptive texts that describes a possible successful outcome of the option; and
a third option descriptive text of the multiple descriptive texts that describes a possible unsuccessful outcome of the option;
during each presentation, on the display, of a prompt for the operator to select scale text that specifies either a degree of intensity or a degree of likelihood associated with an option of the multiple options, cause a presentation, on the display, of at least one of the first option descriptive text, the longer term goal descriptive text, and the shorter term goal descriptive text.

4. The decision making augmentation system of claim 1, wherein:
receiving the decision descriptive text comprises receiving an indication of selection of a decision template by the operator;
the selected decision template comprises a default description of the current decision; and
the processor is further configured to:
accept the default description of the current decision from the selected decision template as the decision descriptive text; and
cause a presentation, on the display, of a prompt for the operator to edit the decision descriptive text.

5. The decision making augmentation system of claim 4, wherein:
the selected decision template specifies a quantity of the multiple options;
the selected decision template, for each option of the multiple options, comprises at least one of:
a first option descriptive text of the multiple descriptive texts that describes the option;
a second option descriptive text of the multiple descriptive texts that describes a possible successful outcome of the option; and
a third option descriptive text of the multiple descriptive texts that describes a possible unsuccessful outcome of the option;
at least one of the decision descriptive text, and the first option descriptive text associated with at least one option of the multiple options, comprises a reference to a decision aid to provide the operator within information concerning a subject associated with the current decision; and
the processor is further configured to cause a presentation, on the display and for each option, a prompt for the operator to edit at least one of the first option descriptive text, the second option descriptive text and the third option descriptive text.

6. The decision making augmentation system of claim 1, wherein:
for each option, receiving an indication of at least one selection of scale text comprises:
receiving an indication of a selection of scale text specifying a degree of positive intensity of seeking to achieve a possible positive outcome of the option;
receiving an indication of a selection of scale text specifying a degree of positive likelihood of achieving the possible positive outcome;
receiving an indication of a selection of scale text specifying a degree of negative intensity of seeking to avoid a possible negative outcome of the option; and
receiving an indication of a selection of scale text specifying a degree of negative likelihood of avoiding the possible negative outcome; and
for each option, deriving a degree of overall motivation associated with the option comprises:
deriving a degree of positive motivation associated with the option based on the degree of positive intensity and the degree of positive likelihood;
deriving a degree of negative motivation associated with the option based on the degree of negative intensity and the degree of negative likelihood; and
deriving the degree of overall motivation associated with the option based on the degree of positive motivation associated with the option and the degree of negative motivation associated with the option.

7. The decision making augmentation system of claim 1, wherein:
for each option, receiving an indication of at least one selection of scale text comprises:
receiving an indication of a selection of scale text specifying a first degree of positive intensity of seeking to achieve a possible successful outcome of the option;
receiving an indication of a selection of scale text specifying a first degree of positive likelihood of achieving the possible successful outcome;
receiving an indication of a selection of scale text specifying a first degree of negative intensity of seeking to avoid the possible successful outcome of the option;
receiving an indication of a selection of scale text specifying a first degree of negative likelihood of avoiding the possible successful outcome;
receiving an indication of a selection of scale text specifying a second degree of positive intensity of seeking to achieve a possible unsuccessful outcome of the option;
receiving an indication of a selection of scale text specifying a second degree of positive likelihood of achieving the possible unsuccessful outcome;
receiving an indication of a selection of scale text specifying a second degree of negative intensity of seeking to avoid the possible unsuccessful outcome of the option; and receiving an indication of a selection of scale text specifying a second degree of negative likelihood of avoiding the possible unsuccessful outcome; and for each option, deriving a degree of overall motivation associated with the option comprises:

deriving a first degree of positive motivation associated with the possible successful outcome based on the first degree of positive intensity and the first degree of positive likelihood;

deriving a second degree of positive motivation associated with the possible unsuccessful outcome based on the second degree of positive intensity and the second degree of positive likelihood;

deriving a first degree of negative motivation associated with the possible successful outcome based on the first degree of negative intensity and the first degree of negative likelihood;

deriving a second degree of negative motivation associated with the possible unsuccessful outcome based on the second degree of negative intensity and the second degree of negative likelihood; and deriving the degree of overall motivation associated with the option based on an average of the first degree of positive motivation and the second degree of positive motivation, and an average of the first degree of negative motivation and the second degree of negative motivation.

8. The decision making augmentation system of claim 1, wherein identifying the best option from among the multiple options comprises selecting the option associated with highest degree of overall motivation among the multiple options.

9. The decision making augmentation system of claim 1, wherein:

the decision making augmentation system is operable in either a compact mode or an expanded mode;

the decision making augmentation system is initially operated in the compact mode, and the prompt for the operator to further consider the current decision comprises a prompt for the operator to switch to operating the decision making augmentation system in the expanded mode; and the processor is configured to perform operations comprising:

in the compact mode, for each option, cause a presentation, on the display, of at least one prompt for the operator to select scale texts specifying:

a degree of positive intensity of seeking to achieve a possible positive outcome of the option;

a degree of positive likelihood of achieving the possible positive outcome;

a degree of negative intensity of seeking to avoid a possible negative outcome of the option; and a degree of negative likelihood of avoiding the possible negative outcome;

in the expanded mode, for each option, cause a presentation, on the display, of at least one prompt for the operator to select scale texts specifying:

a first degree of positive intensity of seeking to achieve a possible successful outcome of the option;

a first degree of positive likelihood of achieving the possible successful outcome;

a first degree of negative intensity of seeking to avoid the possible successful outcome of the option;

a first degree of negative likelihood of avoiding the possible successful outcome;

a second degree of positive intensity of seeking to achieve a possible unsuccessful outcome of the option;

a second degree of positive likelihood of achieving the possible unsuccessful outcome;

a second degree of negative intensity of seeking to avoid the possible unsuccessful outcome of the option; and a second degree of negative likelihood of avoiding the possible unsuccessful outcome.

10. The decision making augmentation system of claim 1, wherein:

at least a portion of the decision making augmentation system is incorporated into a control system of a vehicle configured to carry at least one of passengers and cargo; and the processor is configured to cause a presentation, on the display, of a prompt to select a decision template that specifies aspects of a decision that closely resembles the current decision.

11. A method of decision making augmentation comprising:

receiving, at a processor of a decision making augmentation system, and via a manual input device configured to enable entry of text input by an operator, a decision descriptive text of multiple descriptive texts, wherein the decision descriptive text describes a current decision comprising a selection of one option from among multiple options;

causing repeated presentation of the decision descriptive text on a display configured to visually guide the operator through providing the text input, wherein the text input comprises at least one of the multiple descriptive texts and multiple selections of scale text;

for each option of the multiple options, performing operations comprising:

receiving, at the processor, and via the manual input device, an indication of at least one selection of scale text of the multiple selections of scale text, wherein the at least one selection of scale text specifies either a degree of intensity of seeking to achieve or avoid a possible outcome of the option, or a degree of likelihood of achieving or avoiding the possible outcome of the option; and deriving, by the processor, a degree of overall motivation associated with the option based on the at least one selection of scale text;

identifying, by the processor, a best option from among the multiple options based on the degree of overall motivation associated with each option;

causing a presentation of an indication of the best option on the display;

comparing, by the processor, the degree of overall motivation associated with the best option to a threshold degree of overall motivation;

in response to the degree of overall motivation associated with the best option being less than the threshold degree of overall motivation, causing a presentation, on the display, of:

a warning that the degree of overall motivation associated with the best option is low; and a prompt for the operator to further consider the current decision;

comparing, by the processor, the degree of overall motivation associated with the best option to the degree of overall motivation associated with each other option of the multiple options; and in response to the degree of overall motivation associated with the best option not exceeding, by at least a threshold degree of difference in overall motivation, the degree of overall motivation associated with at least one other option of the multiple options, causing a presentation, on the display of:
- a proximity warning that the difference in degree of the overall motivation associated with the best option from the overall motivation associated with at least one other option is low; and
- the prompt for the operator to further consider the current decision.

12. The method of claim 11, further comprising:
causing a presentation, on the display, of a prompt for the operator to enter at least one of:
- the decision descriptive text;
- a longer term goal descriptive text of the multiple descriptive texts that describes a longer term goal associated with the current decision; and
- a shorter term goal descriptive text of the multiple descriptive texts that describes a shorter term goal associated with the current decision; and during each presentation, on the display, of a prompt for the operator to select scale text that specifies either a degree of intensity or a degree of likelihood associated with an option of the multiple options, causing a presentation, on the display, of at least one of the decision descriptive text, the longer term goal descriptive text, and the shorter term goal descriptive text.

13. The method of claim 12, further comprising:
causing a presentation, on the display, of at least one prompt for the operator to enter, for each option of the multiple options, at least one of:
- a first option descriptive text of the multiple descriptive texts that describes the option;
- a second option descriptive text of the multiple descriptive texts that describes a possible successful outcome of the option; and
- a third option descriptive text of the multiple descriptive texts that describes a possible unsuccessful outcome of the option;

during each presentation, on the display, of a prompt for the operator to select scale text that specifies either a degree of intensity or a degree of likelihood associated with an option of the multiple options, causing a presentation, on the display, of at least one of the first option descriptive text, the longer term goal descriptive text, and the shorter term goal descriptive text.

14. The method of claim 11, wherein:
receiving the decision descriptive text comprises receiving an indication of selection of a decision template by the operator;
the selected decision template comprises a default description of the current decision; and
the method further comprises:
- accepting the default description of the current decision from the selected decision template as the decision descriptive text; and
- causing a presentation, on the display, of a prompt for the operator to edit the decision descriptive text.

15. The method of claim 14, wherein:
the selected decision template specifies a quantity of the multiple options;
the selected decision template, for each option of the multiple options, comprises at least one of:
- a first option descriptive text of the multiple descriptive texts that describes the option;
- a second option descriptive text of the multiple descriptive texts that describes a possible successful outcome of the option; and
- a third option descriptive text of the multiple descriptive texts that describes a possible unsuccessful outcome of the option;

at least one of the decision descriptive text, and the first option descriptive text associated with at least one option of the multiple options, comprises a reference to a decision aid to provide the operator within information concerning a subject associated with the current decision; and the method further comprises causing a presentation, on the display and for each option, a prompt for the operator to edit at least one of the first option descriptive text, the second option descriptive text and the third option descriptive text.

16. The method of claim 11, wherein:
for each option, receiving an indication of at least one selection of scale text comprises:
- receiving an indication of a selection of scale text specifying a degree of positive intensity of seeking to achieve a possible positive outcome of the option;
- receiving an indication of a selection of scale text specifying a degree of positive likelihood of achieving the possible positive outcome;
- receiving an indication of a selection of scale text specifying a degree of negative intensity of seeking to avoid a possible negative outcome of the option; and
- receiving an indication of a selection of scale text specifying a degree of negative likelihood of avoiding the possible negative outcome; and for each option, deriving a degree of overall motivation associated with the option comprises:
- deriving a degree of positive motivation associated with the option based on the degree of positive intensity and the degree of positive likelihood;
- deriving a degree of negative motivation associated with the option based on the degree of negative intensity and the degree of negative likelihood; and
- deriving the degree of overall motivation associated with the option based on the degree of positive motivation associated with the option and the degree of negative motivation associated with the option.

17. The method of claim 11, wherein:
for each option, receiving an indication of at least one selection of scale text comprises:
- receiving an indication of a selection of scale text specifying a first degree of positive intensity of seeking to achieve a possible successful outcome of the option;
- receiving an indication of a selection of scale text specifying a first degree of positive likelihood of achieving the possible successful outcome;
- receiving an indication of a selection of scale text specifying a first degree of negative intensity of seeking to avoid the possible successful outcome of the option;
- receiving an indication of a selection of scale text specifying a first degree of negative likelihood of avoiding the possible successful outcome;
- receiving an indication of a selection of scale text specifying a second degree of positive intensity of seeking to achieve a possible unsuccessful outcome of the option;

receiving an indication of a selection of scale text specifying a second degree of positive likelihood of achieving the possible unsuccessful outcome;

receiving an indication of a selection of scale text specifying a second degree of negative intensity of seeking to avoid the possible unsuccessful outcome of the option; and receiving an indication of a selection of scale text specifying a second degree of negative likelihood of avoiding the possible unsuccessful outcome; and for each option, deriving a degree of overall motivation associated with the option comprises:

deriving a first degree of positive motivation associated with the possible successful outcome based on the first degree of positive intensity and the first degree of positive likelihood;

deriving a second degree of positive motivation associated with the possible unsuccessful outcome based on the second degree of positive intensity and the second degree of positive likelihood;

deriving a first degree of negative motivation associated with the possible successful outcome based on the first degree of negative intensity and the first degree of negative likelihood;

deriving a second degree of negative motivation associated with the possible unsuccessful outcome based on the second degree of negative intensity and the second degree of negative likelihood; and deriving the degree of overall motivation associated with the option based on an average of the first degree of positive motivation and the second degree of positive motivation, and an average of the first degree of negative motivation and the second degree of negative motivation.

18. The method of claim 11, wherein identifying the best option from among the multiple options comprises selecting the option associated with highest degree of overall motivation among the multiple options.

19. The method of claim 11, wherein:

the decision making augmentation system is operable in either a compact mode or an expanded mode;

the decision making augmentation system is initially operated in the compact mode, and the prompt for the operator to further consider the current decision comprises a prompt for the operator to switch to operating the decision making augmentation system in the expanded mode; and the method comprises:

in the compact mode, for each option, causing a presentation, on the display, of at least one prompt for the operator to select scale texts specifying:

a degree of positive intensity of seeking to achieve a possible positive outcome of the option;

a degree of positive likelihood of achieving the possible positive outcome;

a degree of negative intensity of seeking to avoid a possible negative outcome of the option; and a degree of negative likelihood of avoiding the possible negative outcome;

in the expanded mode, for each option, causing a presentation, on the display, of at least one prompt for the operator to select scale texts specifying:

a first degree of positive intensity of seeking to achieve a possible successful outcome of the option;

a first degree of positive likelihood of achieving the possible successful outcome;

a first degree of negative intensity of seeking to avoid the possible successful outcome of the option;

a first degree of negative likelihood of avoiding the possible successful outcome;

a second degree of positive intensity of seeking to achieve a possible unsuccessful outcome of the option;

a second degree of positive likelihood of achieving the possible unsuccessful outcome;

a second degree of negative intensity of seeking to avoid the possible unsuccessful outcome of the option; and a second degree of negative likelihood of avoiding the possible unsuccessful outcome.

20. The method of claim 11, wherein:

at least a portion of the decision making augmentation system is incorporated into a control system of a vehicle configured to carry at least one of passengers and cargo; and the method comprises causing a presentation, on the display, of a prompt to select a decision template that specifies aspects of a decision that closely resembles the current decision.

* * * * *